US012700006B2

(12) United States Patent (10) Patent No.: US 12,700,006 B2
Breitenstein et al. (45) Date of Patent: Aug. 4, 2026

(54) SYSTEM AND METHOD FOR KWH HARVESTING AND CARBON FOOTPRINT MANAGEMENT

(71) Applicant: Emacx Systems Inc., West Orange, NJ (US)

(72) Inventors: Theo Breitenstein, Verona, NJ (US); Bruno Decaudin, Whispering Pines, NC (US)

(73) Assignee: Emacx Systems Inc., West Orange, NJ (US)

( * ) Notice: Subject to any disclaimer, the term of this patent is extended or adjusted under 35 U.S.C. 154(b) by 622 days.

(21) Appl. No.: 18/046,931

(22) Filed: Oct. 16, 2022

(65) Prior Publication Data

US 2023/0162205 A1 May 25, 2023

Related U.S. Application Data

(60) Provisional application No. 63/256,682, filed on Oct. 18, 2021.

(51) Int. Cl.
*G05B 15/00* (2006.01)
*G06Q 30/018* (2023.01)
*G06Q 50/06* (2012.01)

(52) U.S. Cl.
CPC .......... *G06Q 30/018* (2013.01); *G05B 15/00* (2013.01); *G06Q 50/06* (2013.01)

(58) Field of Classification Search
None
See application file for complete search history.

(56) References Cited

U.S. PATENT DOCUMENTS

| | | | | |
|---|---|---|---|---|
| 2003/0171851 A1* | 9/2003 | Brickfield | ............... | H02J 3/003 |
| | | | | 700/286 |
| 2010/0249955 A1* | 9/2010 | Sitton | ...................... | F24F 11/64 |
| | | | | 700/33 |
| 2011/0119112 A1* | 5/2011 | Waibel | ................. | G06Q 30/018 |
| | | | | 707/E17.084 |
| 2011/0184581 A1* | 7/2011 | Storch | .................... | G06Q 10/06 |
| | | | | 700/295 |
| 2022/0302701 A1* | 9/2022 | Sun | .................... | G06Q 30/0284 |

* cited by examiner

*Primary Examiner* — Bernard G Lindsay
(74) *Attorney, Agent, or Firm* — Doster Greene, LLC

(57) ABSTRACT

A system, method and software, in various embodiments, provides for kilowatt hours (kWhs) harvesting and carbon footprint management. A method includes the steps of receiving sensor data from sensors of a plurality of load asset equipment connected to a building management system of a building; determining a carbon footprint for the building; prioritizing and organizing the plurality of load asset equipment into groups; and performing kWh-harvesting by rotating activation of each group to implement load shedding.

3 Claims, 84 Drawing Sheets

112B

142

(120VAC MAIN)     POWER SECTION UPS

WIRING DUCT 15A     10A     3A

CBM (MAIN)     N     G N D     CBU (UPS)     CBU (UPS)     N     G N D

DUPLEX RECEPTACLE 120VAC, 20A

UNINTERRUPTIBLE POWER SUPPLY 128

WIRING DUCT

140

LOW VOLTAGE DISTRIBUTION TERMINALS

138

POWER SUPPLY (1) 24VDC 60W

24VDC     G N D     G N D     G N D

ETHERNET HUB (5 PORT)

WEB RELAY

WAGO     750-862 CONTROLLER MODBUS TCP     750-602 POWER SUPPLY     750-430 8DI MODULE     750-430 8DI MODULE     750-430 8DI MODULE     750-600 END MODULE

WIRING DUCT

| (206A) (201C) Use Groups / Types of Occupancy | (201A) 2024-2029 GHG Target Metric Tons/SqFt | (201B) 2030-2034 GHG Target Metric Tons/SqFt |
|---|---|---|
| Group A - Assembly | 0.010740 | 0.004200 |
| Group B - Laboratories | 0.023810 | 0.011930 |
| Group B - Civic Emergencies | 0.023810 | 0.011930 |
| Group B - Business | 0.008460 | 0.004530 |
| Group E - Education | 0.007580 | 0.003440 |
| Group F – Factory & Industrial | 0.005740 | 0.001670 |
| Group H – High Hazard | 0.023810 | 0.011930 |
| Group I1 – Senior Assisted Living | 0.011380 | 0.005980 |
| Group I2 – Hospital | 0.023810 | 0.011930 |
| Group I4 – Daycare | 0.007580 | 0.003440 |
| Group M – Mercantile | 0.011810 | 0.004030 |
| Group R-1 – Hotels & Dormitories | 0.009870 | 0.005260 |
| Group R-2 – Residential & Multifamily | 0.006750 | 0.004070 |
| Group S - Storage | 0.004260 | 0.001100 |
| Group U - Parking | 0.004260 | 0.001100 |

FIG. 4C

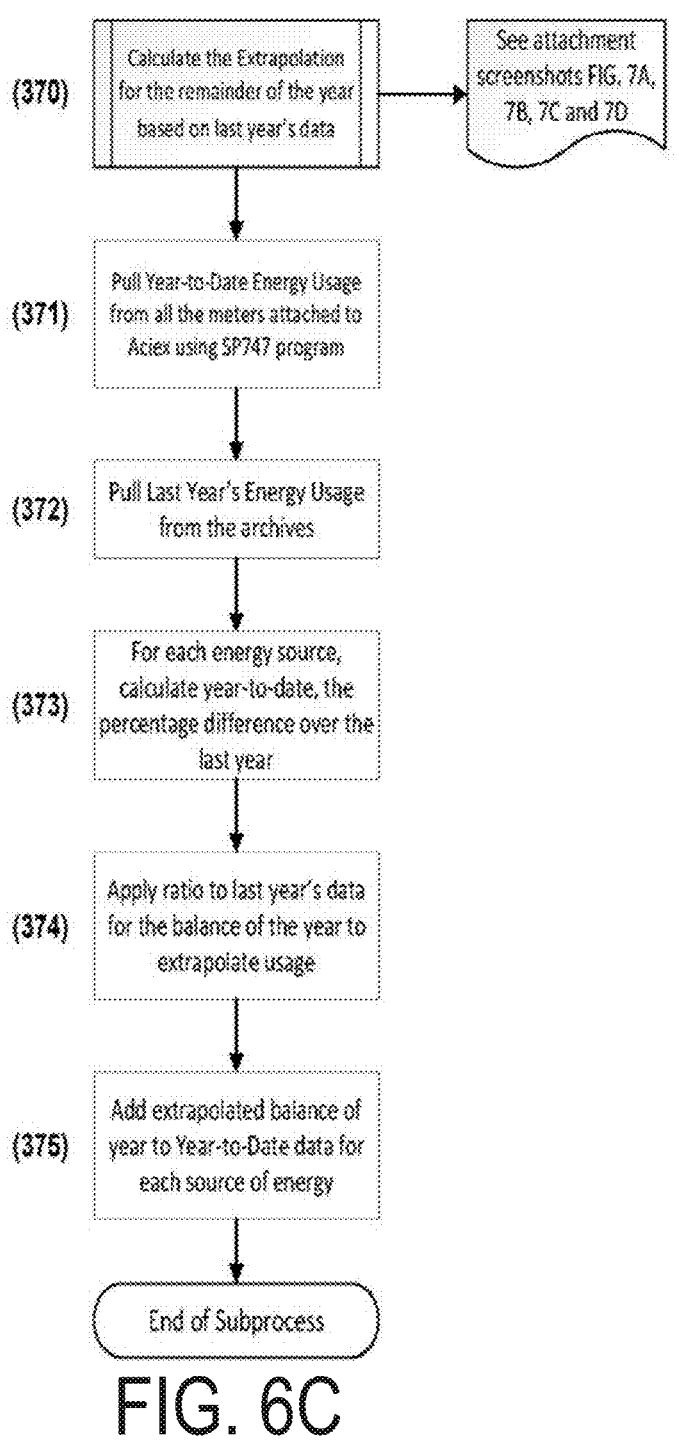

Aciex Pulse
CO2 Emissions Limit vs. CO2 Tonnage Emissions (Part 3)

(370) Calculate the Extrapolation for the remainder of the year based on last year's data See attachment screenshots FIG. 7A, 7B, 7C and 7D (371) Pull Year-to-Date Energy Usage from all the meters attached to Aciex using SP747 program (372) Pull Last Year's Energy Usage from the archives (373) For each energy source, calculate year-to-date, the percentage difference over the last year (374) Apply ratio to last year's data for the balance of the year to extrapolate usage (375) Add extrapolated balance of year to Year-to-Date data for each source of energy End of Subprocess

FIG. 6C

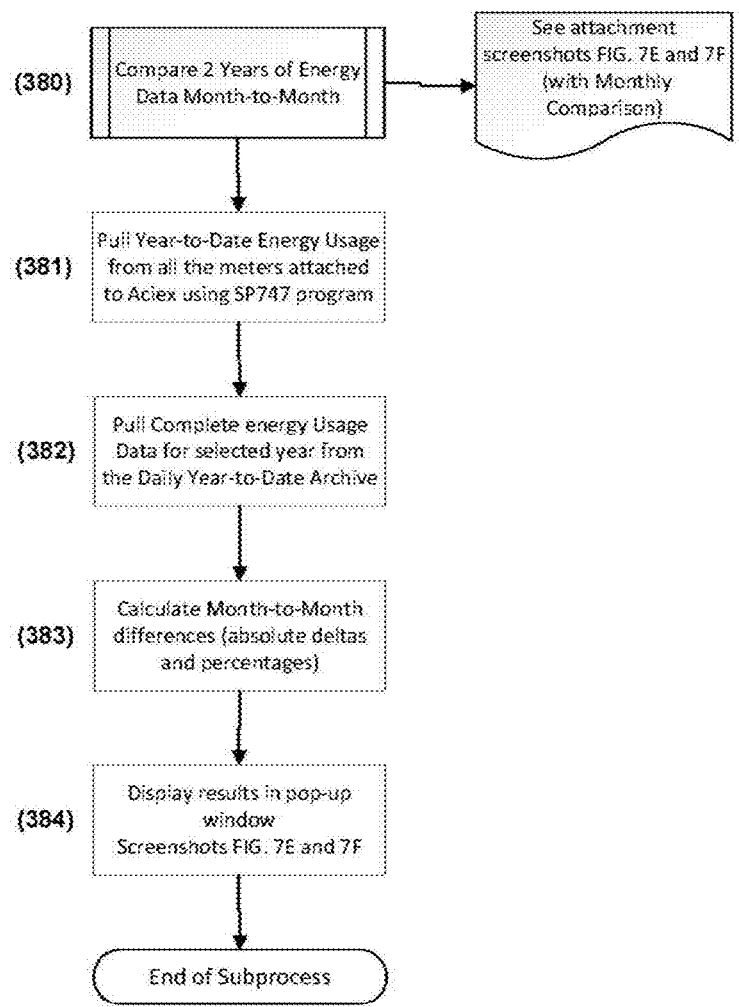

Aciex Pulse
CO2 Emissions Limit vs. CO2 Tonnage Emissions (Part 4)

(380) Compare 2 Years of Energy Data Month-to-Month

See attachment screenshots FIG. 7E and 7F (with Monthly Comparison)

(381) Pull Year-to-Date Energy Usage from all the meters attached to Aciex using SP747 program (382) Pull Complete energy Usage Data for selected year from the Daily Year-to-Date Archive (383) Calculate Month-to-Month differences (absolute deltas and percentages)

(384) Display results in pop-up window Screenshots FIG. 7E and 7F

End of Subprocess

FIG. 6D

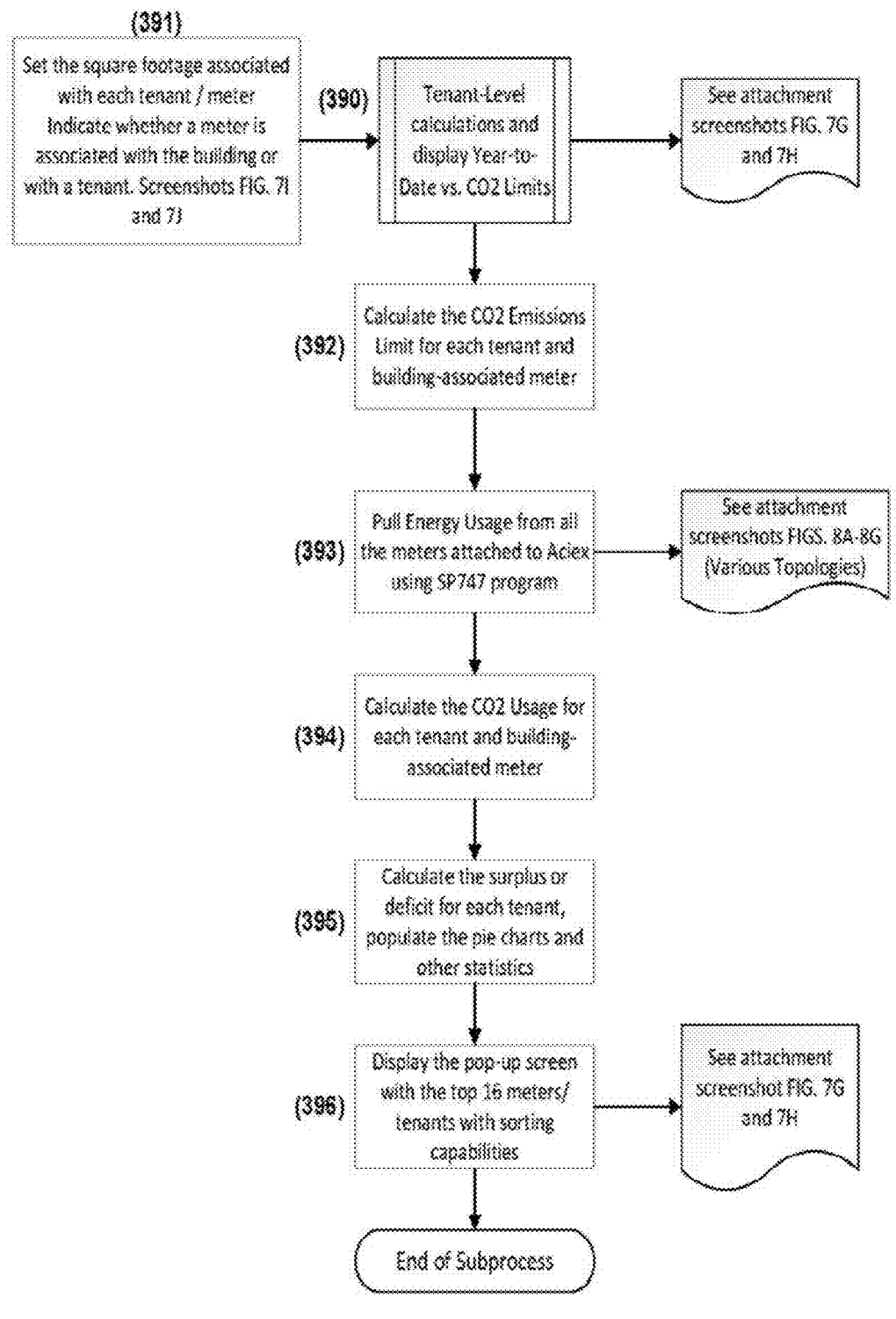

Aciex Pulse
CO2 Emissions Limit vs. CO2 Tonnage Emissions (Part 5)

(391) Set the square footage associated with each tenant / meter Indicate whether a meter is associated with the building or with a tenant. Screenshots FIG. 7I and 7J

(390) Tenant-Level calculations and display Year-to-Date vs. CO2 Limits

See attachment screenshots FIG. 7G and 7H

(392) Calculate the CO2 Emissions Limit for each tenant and building-associated meter

(393) Pull Energy Usage from all the meters attached to Aciex using SP747 program See attachment screenshots FIGS. 8A-8G (Various Topologies)

(394) Calculate the CO2 Usage for each tenant and building-associated meter

(395) Calculate the surplus or deficit for each tenant, populate the pie charts and other statistics

(396) Display the pop-up screen with the top 16 meters/ tenants with sorting capabilities See attachment screenshot FIG. 7G and 7H End of Subprocess

FIG. 6E

Calculated CO2 Emissions Limit

| Use Groups | | Square Footage | 2024 - 2029 GHG Target Tons CO2 Emission | 2030 - 2034 GHG Target Tons CO2 Emission |
|---|---|---|---|---|
| Total Square Footage (341A) | | 600,397 (342A) | Reference Square Footage 855,085 (343A) | |
| #1 | Group I2 - Hospital | 600,397 | 14,295 | 7,163 |
| #2 | | 0 | 0.0 | 0.0 |
| #3 | | 0 | 0.0 | 0.0 |
| #4 | | 0 | 0.0 | 0.0 |
| #5 | | 0 | 0.0 | 0.0 |
| Total CO2 Emissions Limit in Metric Tons | | | 14,295 Tons | 7,163 Tons |

FIG. 7B

Actual CO2 Tonnage Emissions *
\* Based on Billing Cycles (352A)

| Energy Sources | | Last Year's Data (354A)<br>Actual<br>Consumption | Year-to-Date (355A)<br>2024 - 2029<br>Tons CO2 Emission | Year-to-Date + Forecast (356A)<br>2030 - 2034<br>Tons CO2 Emission | Compare Years (357A)<br>% Total |
|---|---|---|---|---|---|
| Utility Electricity | kWh | 22,657,844 | 6,548 | 6,548 | 99.59 % |
| Natural Gas combusted on-site | Therms | 4,471 | 23.74 | 23.74 | 0.36 % |
| #2 Fuel oil combusted on-site | Gallons | 0 | 0.0 | 0.0 | 0.00 % |
| #4 Fuel oil combusted on-site | Gallons | 0 | 0.0 | 0.0 | 0.00 % |
| District Steam | Mlbs | 54,880 | 2.944 | 2.944 | 0.04 % |
| Others TBD | TBD | 0 | 0.0 | 0.0 | 0.00 % |
| Total CO2 Emissions in Metric Tons | | | 6,575 Tons | 6,575 Tons | |
| Water Comsumption | Gallons | 0 | | | |

Figure 7H:
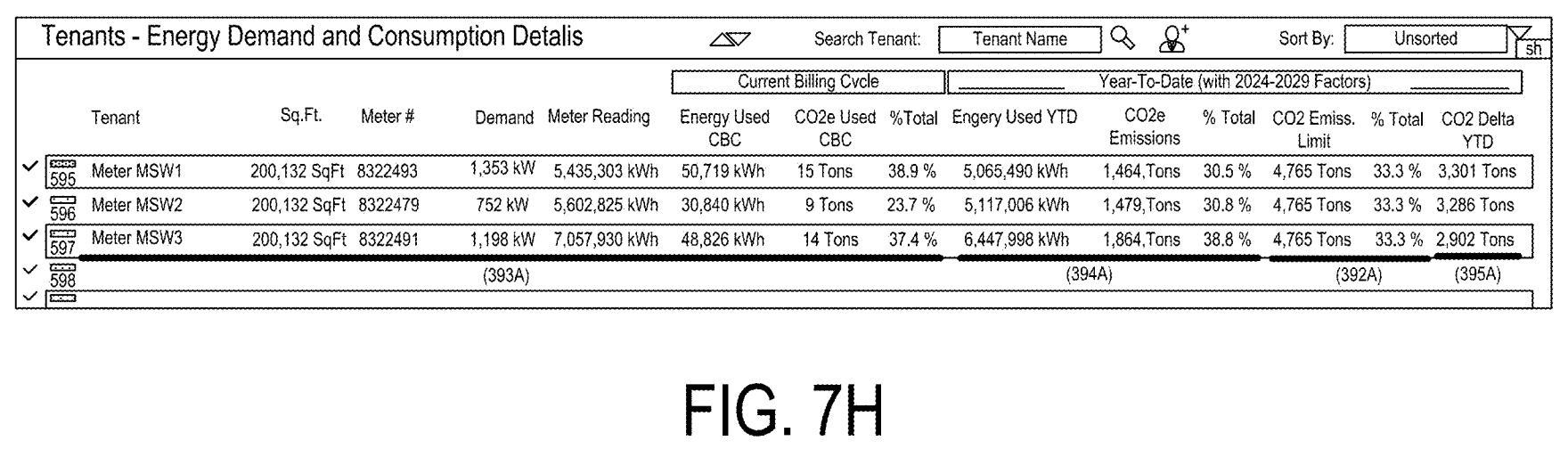

Tenants - Energy Demand and Consumption Details

Search Tenant: [ Tenant Name ]   Sort By: [ Unsorted ]

Current Billing Cycle | Year-To-Date (with 2024-2029 Factors)

| Tenant | Sq.Ft. | Meter # | Demand | Meter Reading | Energy Used CBC | CO2e Used CBC | %Total | Engery Used YTD | CO2e Emissions | % Total | CO2 Emiss. Limit | % Total | CO2 Delta YTD |
|---|---|---|---|---|---|---|---|---|---|---|---|---|---|
| Meter MSW1 | 200,132 SqFt | 8322493 | 1,353 kW | 5,435,303 kWh | 50,719 kWh | 15 Tons | 38.9 % | 5,065,490 kWh | 1,464 Tons | 30.5 % | 4,765 Tons | 33.3 % | 3,301 Tons |
| Meter MSW2 | 200,132 SqFt | 8322479 | 752 kW | 5,602,825 kWh | 30,840 kWh | 9 Tons | 23.7 % | 5,117,006 kWh | 1,479 Tons | 30.8 % | 4,765 Tons | 33.3 % | 3,286 Tons |
| Meter MSW3 | 200,132 SqFt | 8322491 | 1,198 kW | 7,057,930 kWh | 48,826 kWh | 14 Tons | 37.4 % | 6,447,998 kWh | 1,864 Tons | 38.8 % | 4,765 Tons | 33.3 % | 2,902 Tons |
| | | (393A) | | | | | | (394A) | | | (392A) | | (395A) |

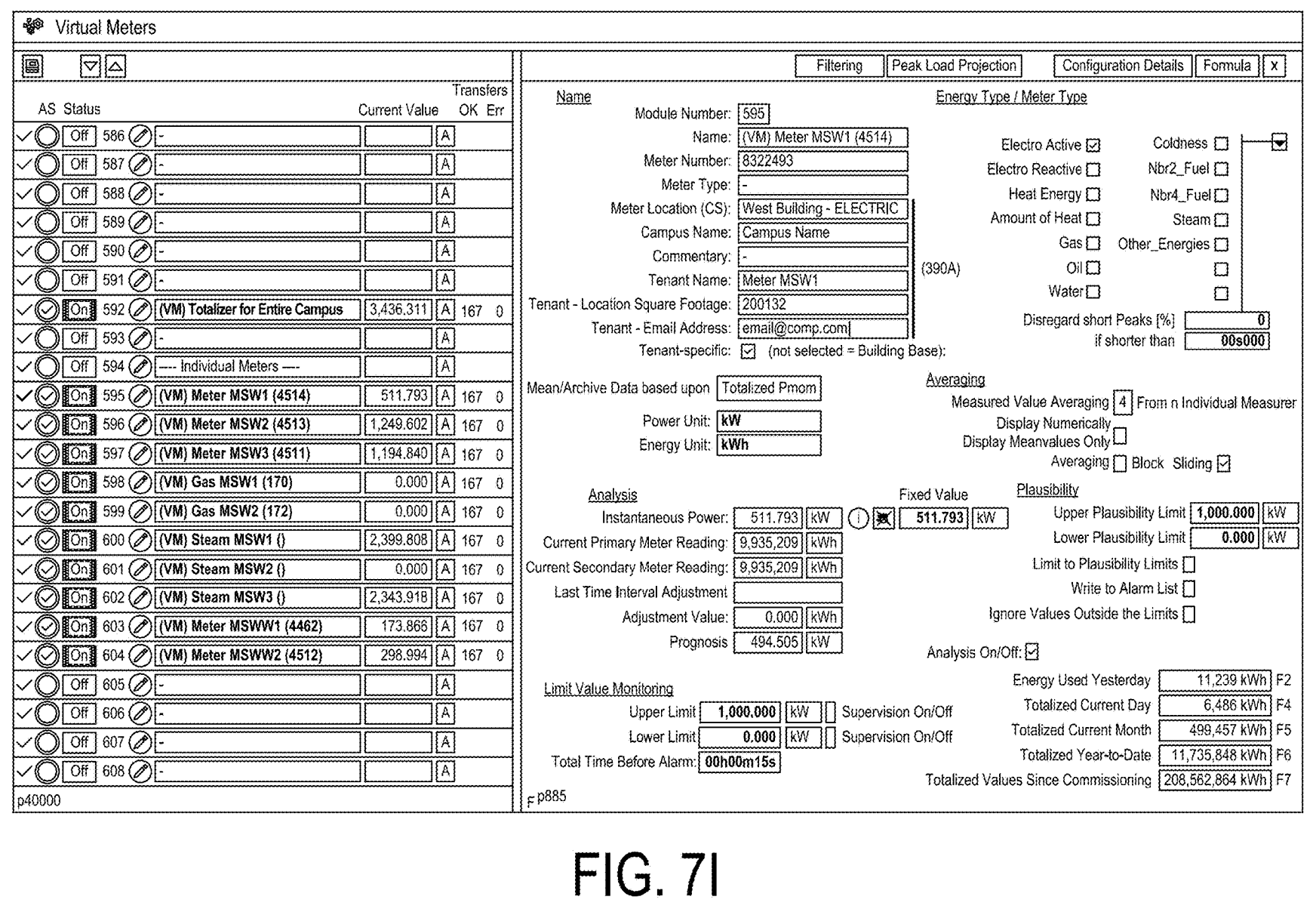

Actual CO2 Tonnage Emissions *

| Last Year's Data | Year-to-Date | Year-to-Date + Forecast | Compare Years |

* Based on Billing Cycles

| Energy Sources | | Actual Consumption | 2024 - 2029 Tons CO2 Emission | 2030 - 2034 Tons CO2 Emission | % Total |
|---|---|---|---|---|---|
| Utility Electricity [Show Tenants Details] (345A) | kWh | 12,365,865 | 3,574 | 3,574 | 99.36 % |
| Natural Gas combusted on-site | Therms | 3,847 | 20.43 | 20.43 | 0.57 % |
| #2 Fuel oil combusted on-site | Gallons | 0 | 0.0 | 0.0 | 0.00 % |
| #4 Fuel oil combusted on-site | Gallons | 0 | 0.0 | 0.0 | 0.00 % |
| District Steam | Mlbs | 50,643 | 2.717 | 2.717 | 0.08 % |

FIG. 7M

◈ Aciex Pulse - Mitigation Measures and Strategies

Delta between Calculated Emissions Limit and Actual Tonnage *

| Based on Year-to-Date + Forecast Data | 2024 - 2029 | 2030 - 2034 |
|---|---|---|
| (402A) Metric Tons below the GHG target | 7,720 Tons CO2 | 588 Tons CO2 |
| (406A) Mitigation Measures (in Metric Tons CO2e) | 492 tons CO2e | 492 tons CO2e |
| (410A) Total Metric Tons below the GHG target | 8,212 tons CO2e | 1,079 tons CO2e |
| (402A) CO2 Tonnage Surplus | $2,069,084 | $157,516 |
| (406A) Mitigation Measures ($) | $131,784 | $131,784 |
| (410A) Total Surplus (or Deficit) with Mitigations | $2,200,868 | $289,300 |
| Value on the Carbon Credit Exchange | $1,642,439 | $215,896 |

* Based on Billing Cycles

FIG. 11B

Mitigation Measures - Contributions (403A)

| Measure Description | kWh Contribution (404B) | Metric Tons CO2e (405A) | Cost Reduction | CapEx (k$) (404A) | ROI (yr) |
|---|---|---|---|---|---|
| Measure 1 - Lighting Upgrade | 0 kWh | 0 tons CO2e | $0 | $0 | 0.00 |
| Measure 2 - Variable Speed Drives | 0 kWh | 0 tons CO2e | $0 | $0 | 0.00 |
| Measure 3 - High Efficiency Motors | 0 kWh | 0 tons CO2e | $0 | $0 | 0.00 |
| Measure 4 - Building Envelope | 0 kWh | 0 tons CO2e | $0 | $0 | 0.00 |
| Measure 5 - Other Mitigation Strategy... | 0 kWh | 0 tons CO2e | $0 | $0 | 0.00 |
| Measure 6 - BMS Upgrade | 1,500,000 kWh | 434 tons CO2e | $142,875 | $0 | 0.00 |
| Measure 7 - Emacx kWh Harvesting | 201,441 kWh | 58 tons CO2e | $19,187 | $0 | 0.00 |
| Measure 8 - Emacx DC plus DR | | (409A) | $45,322 | | |
| Total Mitigation Measures (kWh) | 1,701,441 kWh | 492 tons CO2e | $207,384 | $0 | |

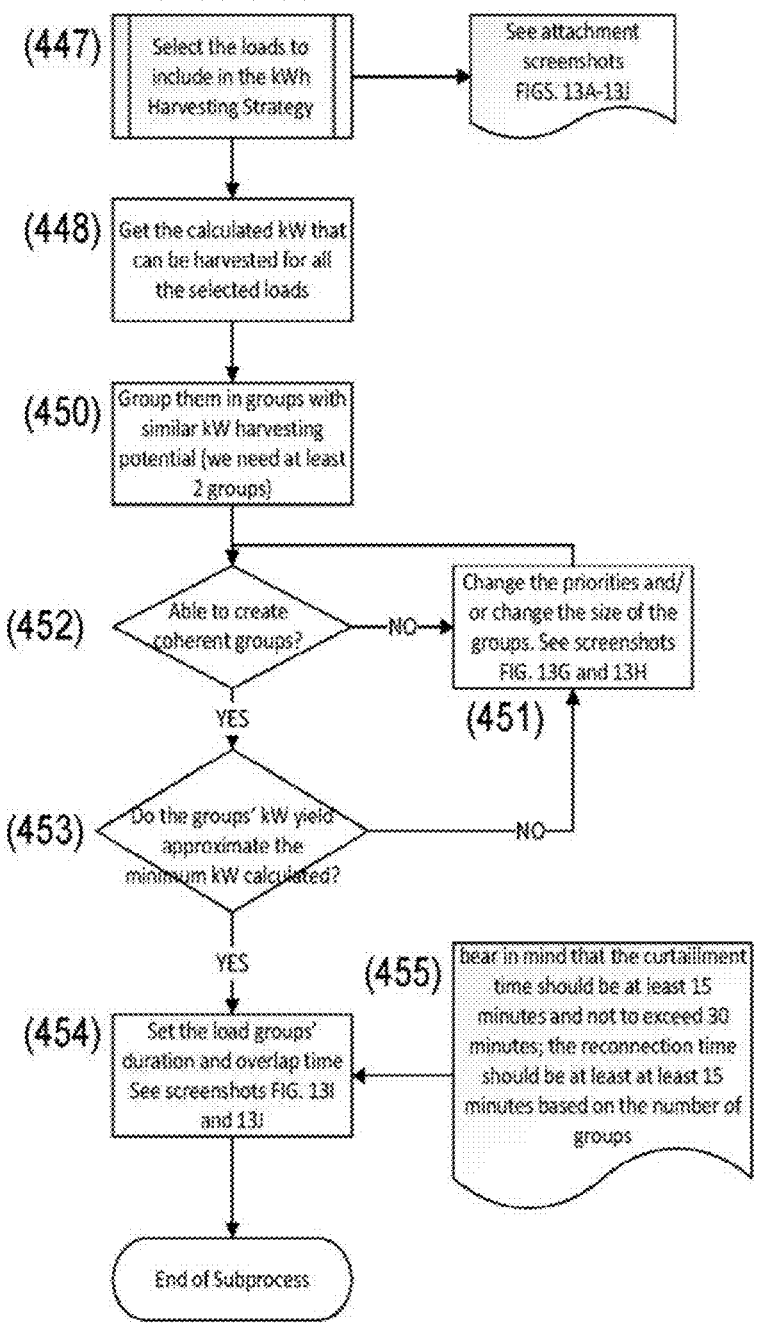

Aciex Pulse
KWh Harvesting (Part 2 – Setup [CONT.])

(447) Select the loads to include in the kWh Harvesting Strategy

See attachment screenshots FIGS. 13A-13I (448) Get the calculated kW that can be harvested for all the selected loads (450) Group them in groups with similar kW harvesting potential (we need at least 2 groups)

(452) Able to create coherent groups?

NO → Change the priorities and/or change the size of the groups. See screenshots FIG. 13G and 13H (451)

YES (453) Do the groups' kW yield approximate the minimum kW calculated?

NO

YES (454) Set the load groups' duration and overlap time See screenshots FIG. 13I and 13J (455) bear in mind that the curtailment time should be at least 15 minutes and not to exceed 30 minutes; the reconnection time should be at least at least 15 minutes based on the number of groups End of Subprocess

FIG. 12C

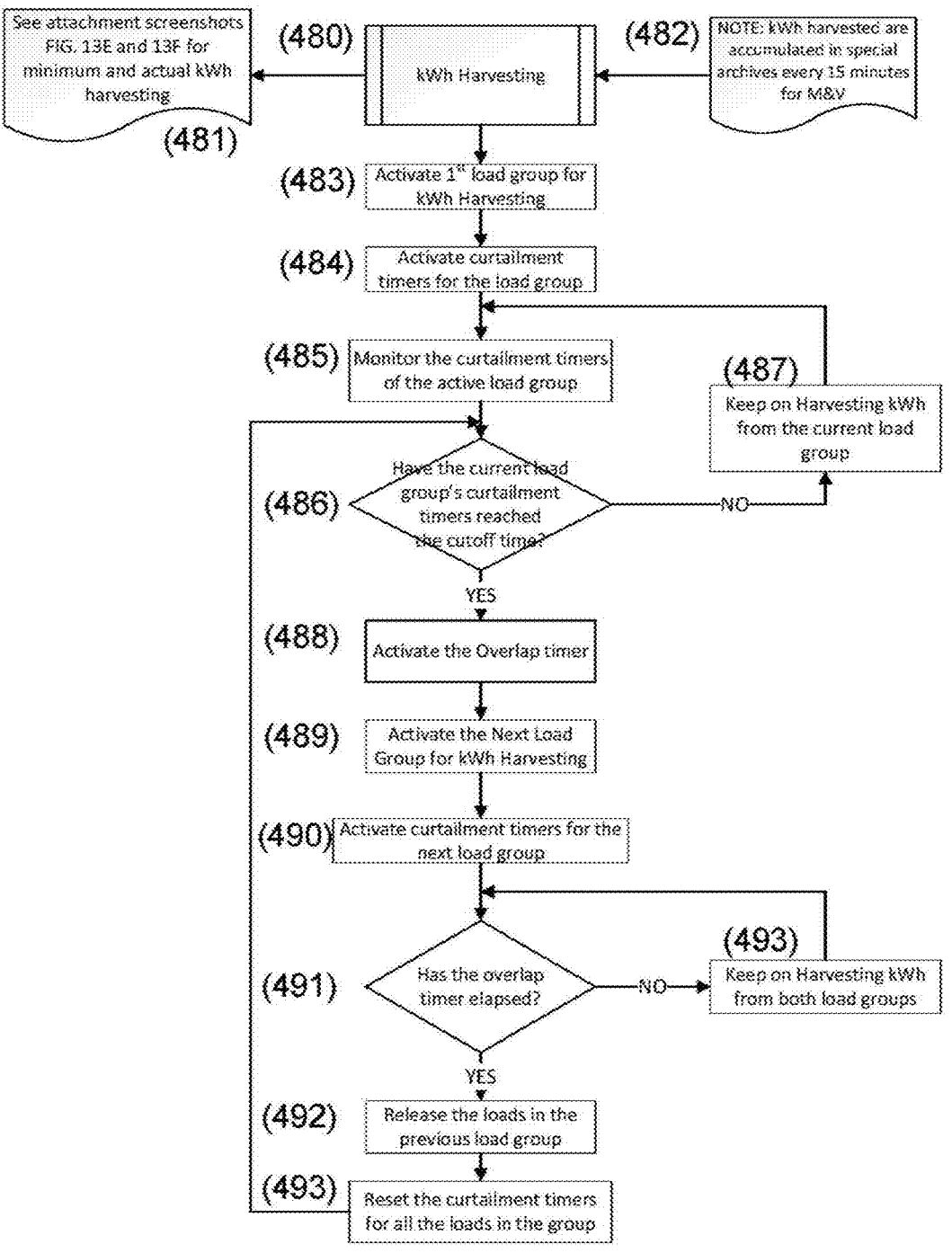

Aciex Pulse
KWh Harvesting (Part 3 – kWh Harvesting)

See attachment screenshots FIG. 13E and 13F for minimum and actual kWh harvesting (481)

(480) kWh Harvesting (482) NOTE: kWh harvested are accumulated in special archives every 15 minutes for M&V (483) Activate 1ˢᵗ load group for kWh Harvesting (484) Activate curtailment timers for the load group (485) Monitor the curtailment timers of the active load group (487) Keep on Harvesting kWh from the current load group (486) Have the current load group's curtailment timers reached the cutoff time?

NO

YES (488) Activate the Overlap timer (489) Activate the Next Load Group for kWh Harvesting (490) Activate curtailment timers for the next load group (493) Keep on Harvesting kWh from both load groups (491) Has the overlap timer elapsed?

NO

YES (492) Release the loads in the previous load group (493) Reset the curtailment timers for all the loads in the group

FIG. 12E

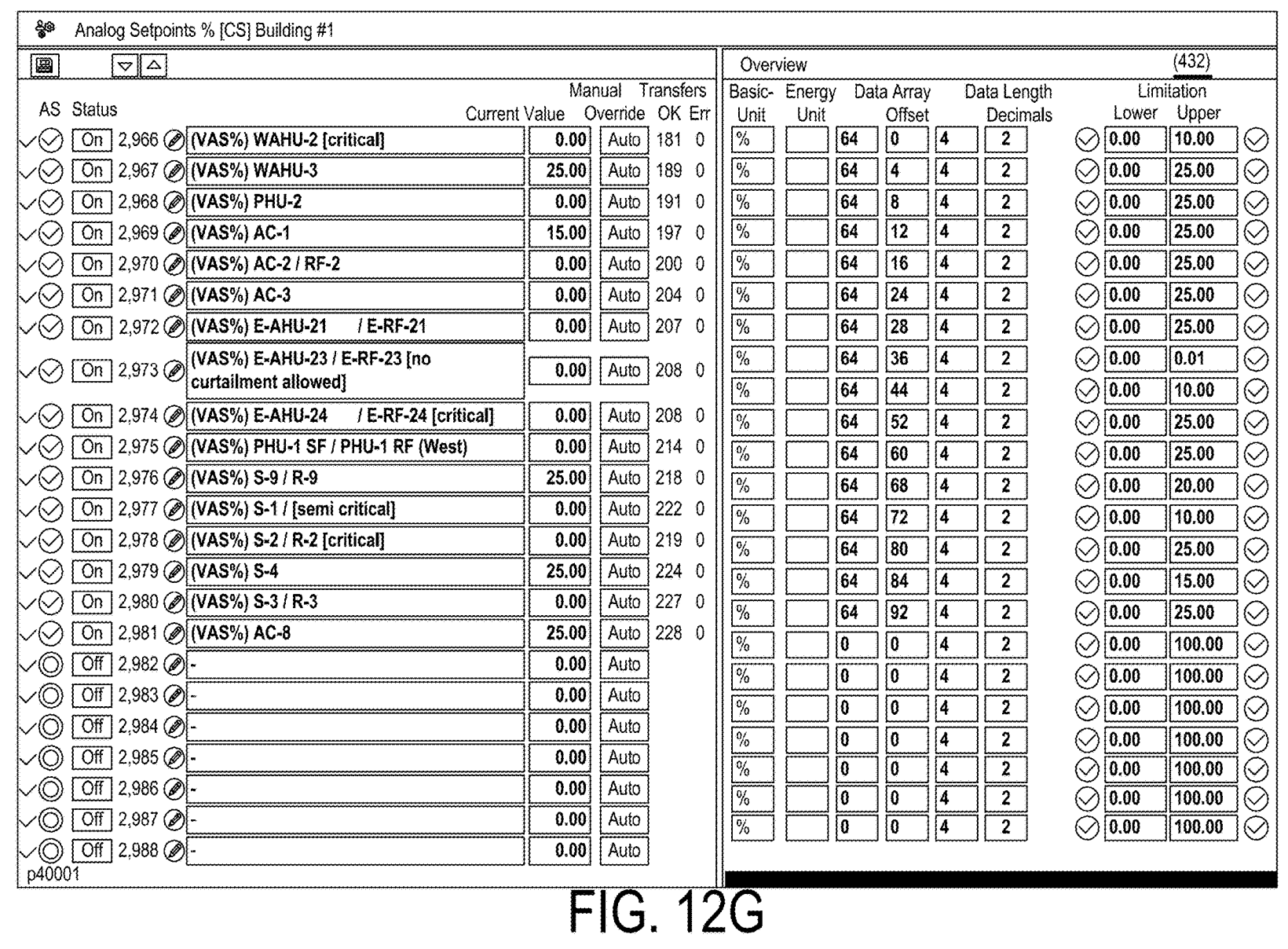

Analog Setpoints % [CS] Building #1

Overview (432)

| AS | | Status | Current Value | Manual Override | Transfers OK | Err | Basic-Unit | Energy Unit | Data Array Offset | | Data Length Decimals | Limitation Lower | Upper |
|---|---|---|---|---|---|---|---|---|---|---|---|---|---|
| 2,966 | On | (VAS%) WAHU-2 [critical] | 0.00 | Auto | 181 | 0 | % | | 64 | 0 | 4 | 2 | 0.00 | 10.00 |
| 2,967 | On | (VAS%) WAHU-3 | 25.00 | Auto | 189 | 0 | % | | 64 | 4 | 4 | 2 | 0.00 | 25.00 |
| 2,968 | On | (VAS%) PHU-2 | 0.00 | Auto | 191 | 0 | % | | 64 | 8 | 4 | 2 | 0.00 | 25.00 |
| 2,969 | On | (VAS%) AC-1 | 15.00 | Auto | 197 | 0 | % | | 64 | 12 | 4 | 2 | 0.00 | 25.00 |
| 2,970 | On | (VAS%) AC-2 / RF-2 | 0.00 | Auto | 200 | 0 | % | | 64 | 16 | 4 | 2 | 0.00 | 25.00 |
| 2,971 | On | (VAS%) AC-3 | 0.00 | Auto | 204 | 0 | % | | 64 | 24 | 4 | 2 | 0.00 | 25.00 |
| 2,972 | On | (VAS%) E-AHU-21 / E-RF-21 | 0.00 | Auto | 207 | 0 | % | | 64 | 28 | 4 | 2 | 0.00 | 0.01 |
| 2,973 | On | (VAS%) E-AHU-23 / E-RF-23 [no curtailment allowed] | 0.00 | Auto | 208 | 0 | % | | 64 | 36 | 4 | 2 | 0.00 | 10.00 |
| 2,974 | On | (VAS%) E-AHU-24 / E-RF-24 [critical] | 0.00 | Auto | 208 | 0 | % | | 64 | 44 | 4 | 2 | 0.00 | 25.00 |
| 2,975 | On | (VAS%) PHU-1 SF / PHU-1 RF (West) | 0.00 | Auto | 214 | 0 | % | | 64 | 52 | 4 | 2 | 0.00 | 25.00 |
| 2,976 | On | (VAS%) S-9 / R-9 | 25.00 | Auto | 218 | 0 | % | | 64 | 60 | 4 | 2 | 0.00 | 20.00 |
| 2,977 | On | (VAS%) S-1 / [semi critical] | 0.00 | Auto | 222 | 0 | % | | 64 | 68 | 4 | 2 | 0.00 | 10.00 |
| 2,978 | On | (VAS%) S-2 / R-2 [critical] | 0.00 | Auto | 219 | 0 | % | | 64 | 72 | 4 | 2 | 0.00 | 25.00 |
| 2,979 | On | (VAS%) S-4 | 25.00 | Auto | 224 | 0 | % | | 64 | 80 | 4 | 2 | 0.00 | 15.00 |
| 2,980 | On | (VAS%) S-3 / R-3 | 0.00 | Auto | 227 | 0 | % | | 64 | 84 | 4 | 2 | 0.00 | 25.00 |
| 2,981 | On | (VAS%) AC-8 | 25.00 | Auto | 228 | 0 | % | | 64 | 92 | 4 | 2 | 0.00 | 100.00 |
| 2,982 | Off | - | 0.00 | Auto | | | % | | 0 | 0 | 4 | 2 | 0.00 | 100.00 |
| 2,983 | Off | - | 0.00 | Auto | | | % | | 0 | 0 | 4 | 2 | 0.00 | 100.00 |
| 2,984 | Off | - | 0.00 | Auto | | | % | | 0 | 0 | 4 | 2 | 0.00 | 100.00 |
| 2,985 | Off | - | 0.00 | Auto | | | % | | 0 | 0 | 4 | 2 | 0.00 | 100.00 |
| 2,986 | Off | - | 0.00 | Auto | | | % | | 0 | 0 | 4 | 2 | 0.00 | 100.00 |
| 2,987 | Off | - | 0.00 | Auto | | | % | | 0 | 0 | 4 | 2 | 0.00 | 100.00 |
| 2,988 | Off | - | 0.00 | Auto | | | % | | 0 | 0 | 4 | 2 | 0.00 | 100.00 | p40001

FIG. 12G

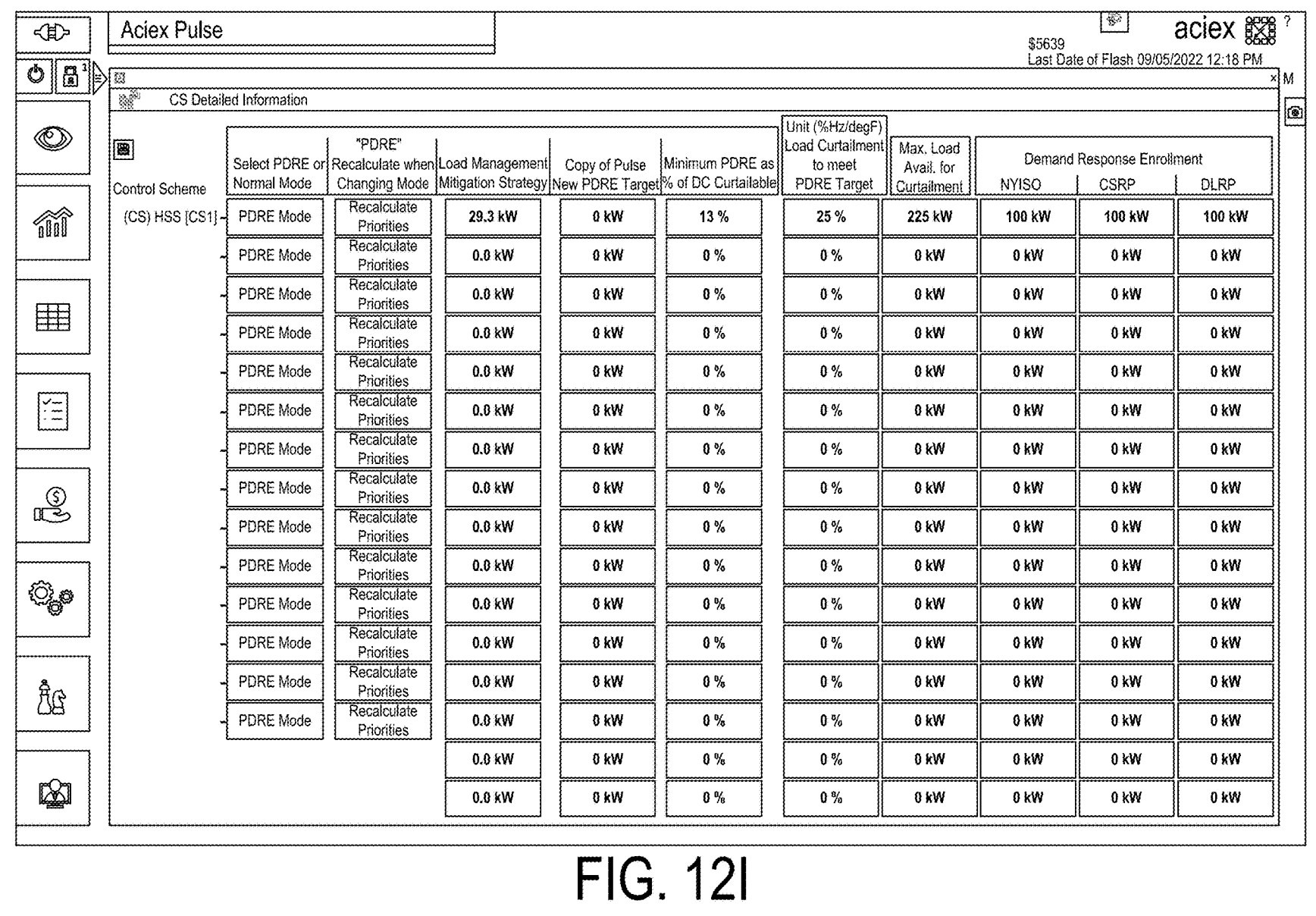

Aciex Pulse aciex $5639
Last Date of Flash 09/05/2022 12:18 PM

CS Detailed Information

| Control Scheme | Select PDRE or Normal Mode | "PDRE" Recalculate when Changing Mode | Load Management Mitigation Strategy | Copy of Pulse New PDRE Target | Minimum PDRE as % of DC Curtailable | Unit (%Hz/degF) Load Curtailment to meet PDRE Target | Max. Load Avail. for Curtailment | NYISO | CSRP | DLRP |
|---|---|---|---|---|---|---|---|---|---|---|
| (CS) HSS [CS1] | PDRE Mode | Recalculate Priorities | 29.3 kW | 0 kW | 13 % | 25 % | 225 kW | 100 kW | 100 kW | 100 kW |
| | PDRE Mode | Recalculate Priorities | 0.0 kW | 0 kW | 0 % | 0 % | 0 kW | 0 kW | 0 kW | 0 kW |
| | PDRE Mode | Recalculate Priorities | 0.0 kW | 0 kW | 0 % | 0 % | 0 kW | 0 kW | 0 kW | 0 kW |
| | PDRE Mode | Recalculate Priorities | 0.0 kW | 0 kW | 0 % | 0 % | 0 kW | 0 kW | 0 kW | 0 kW |
| | PDRE Mode | Recalculate Priorities | 0.0 kW | 0 kW | 0 % | 0 % | 0 kW | 0 kW | 0 kW | 0 kW |
| | PDRE Mode | Recalculate Priorities | 0.0 kW | 0 kW | 0 % | 0 % | 0 kW | 0 kW | 0 kW | 0 kW |
| | PDRE Mode | Recalculate Priorities | 0.0 kW | 0 kW | 0 % | 0 % | 0 kW | 0 kW | 0 kW | 0 kW |
| | PDRE Mode | Recalculate Priorities | 0.0 kW | 0 kW | 0 % | 0 % | 0 kW | 0 kW | 0 kW | 0 kW |
| | PDRE Mode | Recalculate Priorities | 0.0 kW | 0 kW | 0 % | 0 % | 0 kW | 0 kW | 0 kW | 0 kW |
| | PDRE Mode | Recalculate Priorities | 0.0 kW | 0 kW | 0 % | 0 % | 0 kW | 0 kW | 0 kW | 0 kW |
| | PDRE Mode | Recalculate Priorities | 0.0 kW | 0 kW | 0 % | 0 % | 0 kW | 0 kW | 0 kW | 0 kW |
| | PDRE Mode | Recalculate Priorities | 0.0 kW | 0 kW | 0 % | 0 % | 0 kW | 0 kW | 0 kW | 0 kW |
| | PDRE Mode | Recalculate Priorities | 0.0 kW | 0 kW | 0 % | 0 % | 0 kW | 0 kW | 0 kW | 0 kW |
| | PDRE Mode | Recalculate Priorities | 0.0 kW | 0 kW | 0 % | 0 % | 0 kW | 0 kW | 0 kW | 0 kW |
| | PDRE Mode | Recalculate Priorities | 0.0 kW | 0 kW | 0 % | 0 % | 0 kW | 0 kW | 0 kW | 0 kW |

Demand Response Enrollment

FIG. 12I

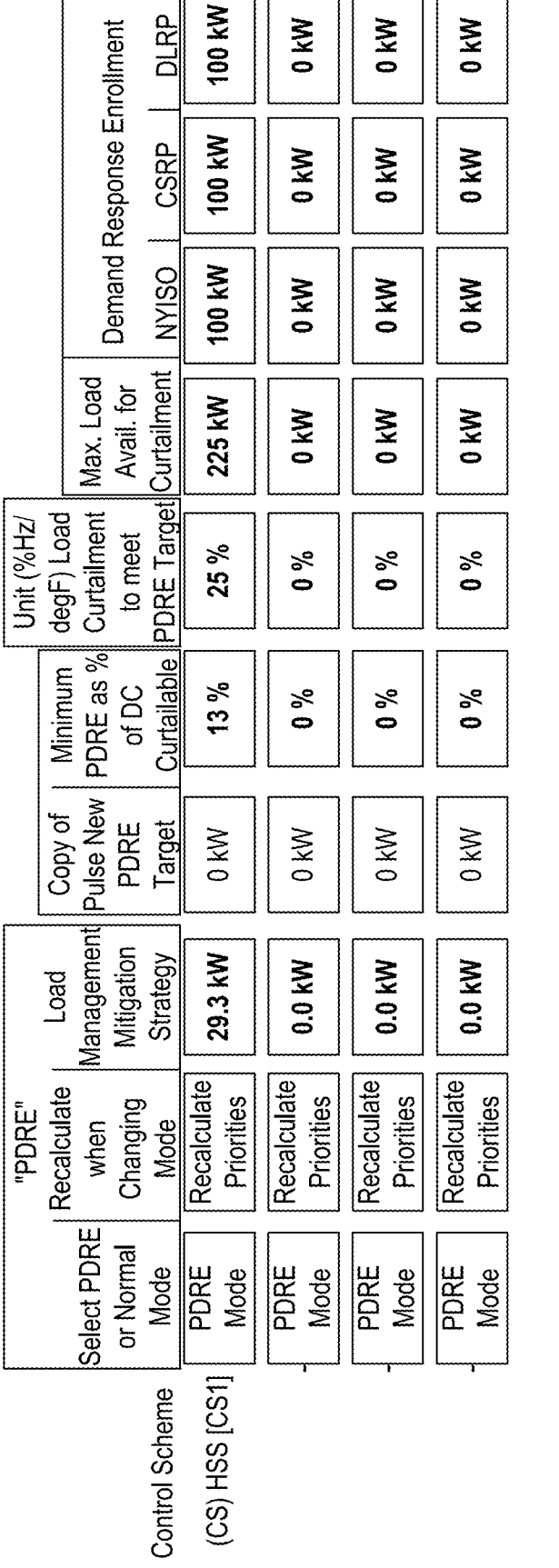

| Control Scheme | "PDRE" | | | Copy of Pulse New PDRE Target | Minimum PDRE as % of DC Curtailable | Unit (%Hz/ degF) Load Curtailment to meet PDRE Target | Max. Load Avail. for Curtailment | Demand Response Enrollment | | |
| --- | --- | --- | --- | --- | --- | --- | --- | --- | --- | --- |
| | Select PDRE or Normal Mode | Recalculate when Changing Mode | Load Management Mitigation Strategy | | | | | NYISO | CSRP | DLRP |
| (CS) HSS [CS1] | PDRE Mode | Recalculate Priorities | 29.3 kW | 0 kW | 13 % | 25 % | 225 kW | 100 kW | 100 kW | 100 kW |
| | PDRE Mode | Recalculate Priorities | 0.0 kW | 0 kW | 0 % | 0 % | 0 kW | 0 kW | 0 kW | 0 kW |
| | PDRE Mode | Recalculate Priorities | 0.0 kW | 0 kW | 0 % | 0 % | 0 kW | 0 kW | 0 kW | 0 kW |
| | PDRE Mode | Recalculate Priorities | 0.0 kW | 0 kW | 0 % | 0 % | 0 kW | 0 kW | 0 kW | 0 kW |

FIG. 12J

Buildings Detailed Information

336

| | used |
|---|---|
| Name of Building | Hospital for Special Surgery |
| Street Address | 535 East 70th Street |
| City | New York |
| State | NY |
| Postal or ZIP Code | 10021 |
| Borough | Manhattan |
| NYC BBL (10 digits) | 10148220020 |
| NYC BIN | 1046256 |
| Total Square Footage of Building | 519,029 SqFt |
| Pointer to Totalizer - Electricity | (VM) Totalizer HSS - Electric |
| Pointer to Totalizer - Gas | - |
| Pointer to Totalizer – Fuel #2 | |
| Pointer to Totalizer – Fuel #4 | |
| Pointer to Totalizer – Steam | (VM) Totalizer HSS - Steam |
| Pointer to Totalizer – Others | |
| Water Consumption | 0 |
| Pointer to CS | (CS) HSS [CS1] |
| Pointer to 1st Text Variable | 7,000 |
| # of ELECTRIC VM/Tenants | 5 |
| Pointer to 1st ELECTRIC VM/Tenant | (VM)  HSS Electric (194) |
| # of GAS VM | 0 |
| Pointer to 1st GAS VM | - |
| # of STEAM VM | 1 |
| Pointer to 1st STEAM VM | (VM)  HSS Steam 1 () |
| # of #2 Fuel VM | 0 |
| Pointer to 1st #2 Fuel VM | |
| # of #4 Fuel VM | 0 |
| Pointer to 1st #4 Fuel VM | | p5334

FIG. 12L

Figure 13B:
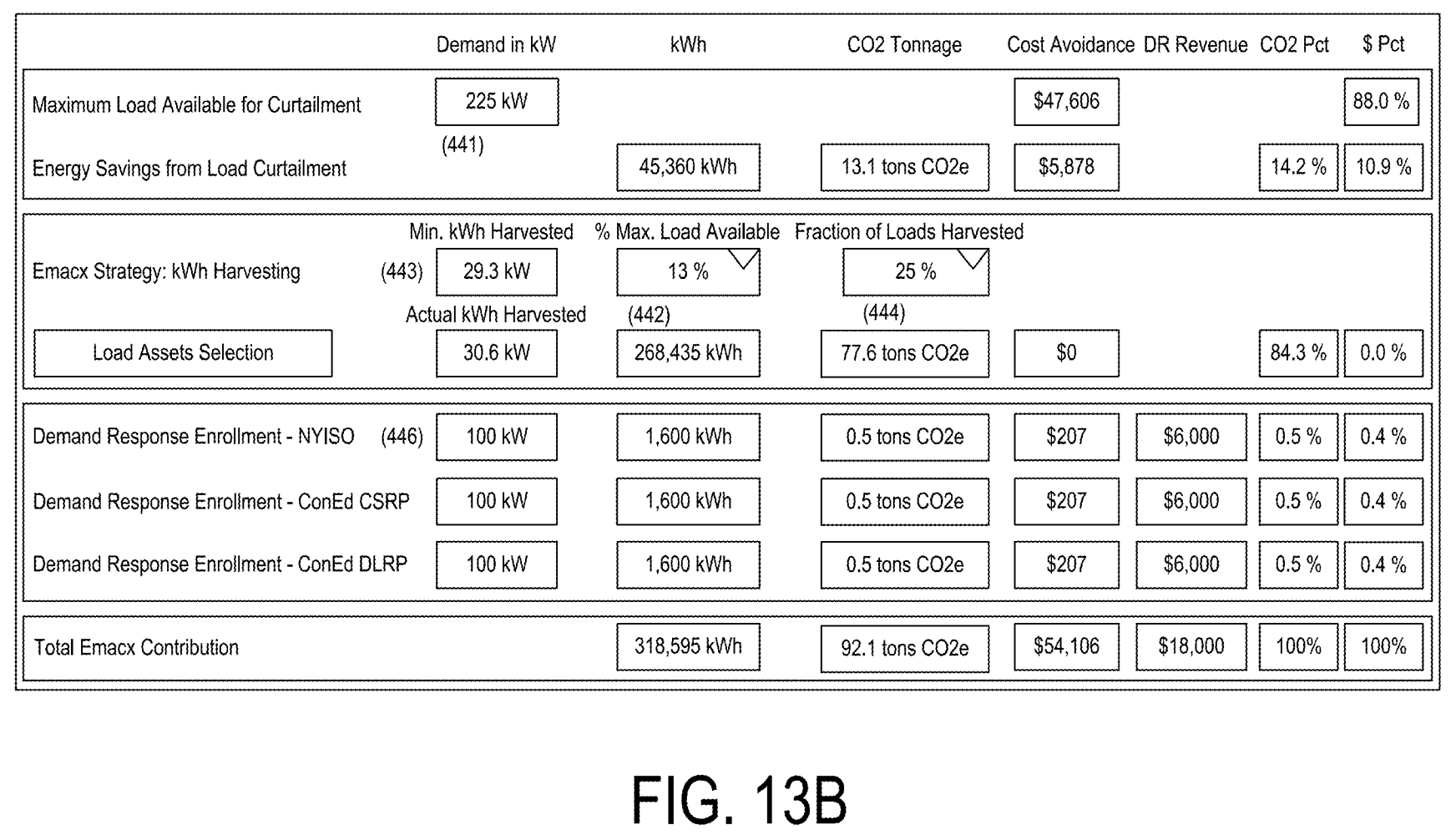

| | Demand in kW | kWh | CO2 Tonnage | Cost Avoidance | DR Revenue | CO2 Pct | $ Pct |
|---|---|---|---|---|---|---|---|
| Maximum Load Available for Curtailment | 225 kW (441) | | | $47,606 | | | 88.0 % |
| Energy Savings from Load Curtailment | | 45,360 kWh | 13.1 tons CO2e | $5,878 | | 14.2 % | 10.9 % |
| | | % Max. Load Available | Fraction of Loads Harvested | | | | |
| Emacx Strategy: kWh Harvesting | Min. kWh Harvested 29.3 kW (443) | 13 % (442) | 25 % (444) | | | | |
| Load Assets Selection | Actual kWh Harvested 30.6 kW | 268,435 kWh | 77.6 tons CO2e | $0 | | 84.3 % | 0.0 % |
| Demand Response Enrollment - NYISO (446) | 100 kW | 1,600 kWh | 0.5 tons CO2e | $207 | $6,000 | 0.5 % | 0.4 % |
| Demand Response Enrollment - ConEd CSRP | 100 kW | 1,600 kWh | 0.5 tons CO2e | $207 | $6,000 | 0.5 % | 0.4 % |
| Demand Response Enrollment - ConEd DLRP | 100 kW | 1,600 kWh | 0.5 tons CO2e | $207 | $6,000 | 0.5 % | 0.4 % |
| Total Emacx Contribution | | 318,595 kWh | 92.1 tons CO2e | $54,106 | $18,000 | 100% | 100% |

FIG. 13B 93.1 kW | Total Available : 93.1 kW / : Max kWh Harvesting          Building [CS1] ▽ △ ▷ X (447)                                                                          (448)

| (447) Load | Priority | C | S | B | M | Curt | Feedback | DC Curtailable | Harvesting kWh |
|---|---|---|---|---|---|---|---|---|---|
| Included (LG3C) WAHU-2 [critical] | 15.0 | | | | | 0.00 % | 12.86 kW | 3.5 kW | 3.5 kW |
| Included (LG1) WAHU-3 | 4.0 | | | | | 0.00 % | 4.97 kW | 2.8 kW | 2.8 kW |
| Included (LG2) PHU-2 | 8.0 | | | | | 15.00 % | 10.80 kW | 3.7 kW | 7.5 kW |
| Included (LG1) AC-1 | 1.0 | | | | | 0.00 % | 11.94 kW | 5.5 kW | 8.0 kW |
| Included (LG2) AC-2 / RF-2 | 9.0 | | | | | 25.00 % | 7.111 kW | 5.6 kW | 5.6 kW |
| Included (LG2) AC-3 | 7.0 | | | | | 25.00 % | 1.59 kW | 1.1 kW | 1.1 kW |
| Included (LG3) E-AHU-21 / E-RF-21 | 11.0 | | | | | 0.00 % | 1.961 kW | 19.1 kW | 19.1 kW |
| Not Included (L) E-AHU-23 / E-RF-23 [NO CURT.] | 6.0 | | | | | 0.00 % | 2.539 kW | 0.0 kW | 0.0 kW |
| Included (LG3C) E-AHU-24 / E-RF-24 [critical] | 14.0 | | | | | 0.00 % | 8.220 kW | 10.1 kW | 10.1 kW |
| Included (LG2) PHU-1 SF / PHU-1 RF | 10.0 | | | | | 25.00 % | 6.478 kW | 4.5 kW | 4.5 kW |
| Included (LG1) S-9 / R-9 | 5.0 | | | | | 0.00 % | 1.743 kW | 8.0 kW | 8.0 kW |
| Included (LG3) S-1 [semi critical] | 13.0 | | | | | 0.00 % | 9.57 kW | 2.5 kW | 4.6 kW |
| Included (LG3C) S-2 / R-2 [critical] | 16.0 | | | | | 0.00 % | 1.851 kW | 6.1 kW | 6.1 kW |
| Included (LG1) S4 | 2.0 | | | | | 0.00 % | 5.36 kW | 3.3 kW | 3.3 kW |
| Included (LG3) S-3 / R-3 | 12.0 | | | | | 0.00 % | 5.030 kW | 5.6 kW | 5.6 kW |
| Included (LG1) AC-8 | 3.0 | | | | | 0.00 % | 5.44 kW | 3.3 kW | 3.3 kW |

| Load | Priority | C | S | B | M | Curt | Feedback |
|------|----------|---|---|---|---|------|----------|
| (LG1) AC-1 | 1.0 | | | | | 0.00 % | 11.9 kW |
| (LG1) S4 | 2.0 | | | | | 0.00 % | 5.4 kW |
| (LG1) AC-8 | 3.0 | | | | | 0.00 % | 5.4 kW |
| (LG1) WAHU-3 | 4.0 | | | | | 0.00 % | 5.0 kW |
| (LG1) S-9 / R-9 | 5.0 | | | | | 0.00 % | 11.7 kW |
| (L) E-AHU-23 / E-RF-23 [NO CURT.] | 6.0 | | | | | 0.00 % | 3.6 kW |
| (LG2) AC-3 | 7.0 | | | | | 25.00 % | 1.6 kW |
| (LG2) PHU-2 | 8.0 | | | | | 15.00 % | 10.8 kW |
| (LG2) AC-2 / RF-2 | 9.0 | | | | | 25.00 % | 7.1 kW |
| (LG2) PHU-1 SF / PHU-1 RF | 10.0 | | | | | 25.00 % | 6.5 kW |
| (LG3) E-AHU-21 / E-RF-21 | 11.0 | | | | | 0.00 % | 32.4 kW |
| (LG3) S-3 / R-3 | 12.0 | | | | | 0.00 % | 15.0 kW |
| (LG3) S-1 [semi critical] | 13.0 | | | | | 0.00 % | 9.6 kW |
| (LG3C) E-AHU-24 / E-RF-24 [critical] | 14.0 | | | | | 0.00 % | 38.2 kW |
| (LG3C) WAHU-2 [critical] | 15.0 | | | | | 0.00 % | 12.9 kW |
| (LG3C) S-2 / R-2 [critical] | 16.0 | | | | | 0.00 % | 21.9 kW |

Status

Demand OK

Real Time Demand 3,640 kW Instant 3,603 kW Trend 4,7__ kW PDRE [29.3 PDRE]

5,000 kW Target

0 DC Curt. / 4 PDRE Curt.

30.6 kW Curtailed Load

Previous Utility Interval 3,078 kW Demand

FIG. 13F

ACIEX Pulse $5639
Last Date of Flash 09/05/2022 12:18 PM aciex

Load Groups Information and Setup (454)

Control Scheme (CS) Building#1 [CS1]

| Internal Flags Mod. | #Load Groups Used | Overlap Time Between Load Groups | Current Load Group Duration | kWh Harvesting Duration Load Group 1 | kWh Harvesting Duration Load Group 2 | kWh Harvesting Duration Load Group 3 | kWh Harvesting Duration Load Group 4 | kWh Harvesting Duration Load Group 5 | kWh Harvesting Duration Load Group 6 | kWh Harvesting Duration Load Group 7 | kWh Harvesting Duration Load Group 8 |
|---|---|---|---|---|---|---|---|---|---|---|---|
| 1,801 | 3 | 05m00s | 00h20m00s | 00h15m00s | 00h30m00s | 00h20m00s | 00h00m00s | 00h00m00s | 00h00m00s | 00h00m00s | 00h00m00s |
| 1,802 | 0 | 00m00s | 00h00m00s | 00h00m00s | 00h00m00s | 00h00m00s | 00h00m00s | 00h00m00s | 00h00m00s | 00h00m00s | 00h00m00s |
| 1,803 | 0 | 00m00s | 00h00m00s | 00h00m00s | 00h00m00s | 00h00m00s | 00h00m00s | 00h00m00s | 00h00m00s | 00h00m00s | 00h00m00s |
| 1,804 | 0 | 00m00s | 00h00m00s | 00h00m00s | 00h00m00s | 00h00m00s | 00h00m00s | 00h00m00s | 00h00m00s | 00h00m00s | 00h00m00s |
| 1,805 | 0 | 00m00s | 00h00m00s | 00h00m00s | 00h00m00s | 00h00m00s | 00h00m00s | 00h00m00s | 00h00m00s | 00h00m00s | 00h00m00s |
| 1,806 | 0 | 00m00s | 00h00m00s | 00h00m00s | 00h00m00s | 00h00m00s | 00h00m00s | 00h00m00s | 00h00m00s | 00h00m00s | 00h00m00s |
| 1,807 | 0 | 00m00s | 00h00m00s | 00h00m00s | 00h00m00s | 00h00m00s | 00h00m00s | 00h00m00s | 00h00m00s | 00h00m00s | 00h00m00s |
| 1,808 | 0 | 00m00s | 00h00m00s | 00h00m00s | 00h00m00s | 00h00m00s | 00h00m00s | 00h00m00s | 00h00m00s | 00h00m00s | 00h00m00s |
| 1,809 | 0 | 00m00s | 00h00m00s | 00h00m00s | 00h00m00s | 00h00m00s | 00h00m00s | 00h00m00s | 00h00m00s | 00h00m00s | 00h00m00s |
| 1,810 | 0 | 00m00s | 00h00m00s | 00h00m00s | 00h00m00s | 00h00m00s | 00h00m00s | 00h00m00s | 00h00m00s | 00h00m00s | 00h00m00s |
| 1,811 | 0 | 00m00s | 00h00m00s | 00h00m00s | 00h00m00s | 00h00m00s | 00h00m00s | 00h00m00s | 00h00m00s | 00h00m00s | 00h00m00s |
| 1,812 | 0 | 00m00s | 00h00m00s | 00h00m00s | 00h00m00s | 00h00m00s | 00h00m00s | 00h00m00s | 00h00m00s | 00h00m00s | 00h00m00s |
| 1,813 | 0 | 00m00s | 00h00m00s | 00h00m00s | 00h00m00s | 00h00m00s | 00h00m00s | 00h00m00s | 00h00m00s | 00h00m00s | 00h00m00s |
| 1,814 | 0 | 00m00s | 00h00m00s | 00h00m00s | 00h00m00s | 00h00m00s | 00h00m00s | 00h00m00s | 00h00m00s | 00h00m00s | 00h00m00s |
| 1,815 | 0 | 00m00s | 00h00m00s | 00h00m00s | 00h00m00s | 00h00m00s | 00h00m00s | 00h00m00s | 00h00m00s | 00h00m00s | 00h00m00s |
| 1,816 | 0 | 00m00s | 00h00m00s | 00h00m00s | 00h00m00s | 00h00m00s | 00h00m00s | 00h00m00s | 00h00m00s | 00h00m00s | 00h00m00s | p5333

FIG. 13I

Load Groups Information and Setup (454)

| Control Scheme | Internal Flags Mod. | #Load Groups Used | Overlap Time Between Load Groups | Current Load Group Duration | kWh Harvesting Duration Load Group 1 | kWh Harvesting Duration Load Group 2 | kWh Harvesting Duration Load Group 3 | kWh Harvesting Duration Load Group 4 | kWh Harvesting Duration Load Group 5 | kWh Harvesting Duration Load Group 6 | kWh Harvesting Duration Load Group 7 | kWh Harvesting Duration Load Group 8 |
|---|---|---|---|---|---|---|---|---|---|---|---|---|
| (CS) Building#1 [CS1] | 1,801 | 3 | 05m00s | 00h20m00s | 00h15m00s | 00h30m00s | 00h20m00s | 00h00m00s | 00h00m00s | 00h00m00s | 00h00m00s | 00h00m00s |
| - | 1,802 | 0 | 00m00s | 00h00m00s | 00h00m00s | 00h00m00s | 00h00m00s | 00h00m00s | 00h00m00s | 00h00m00s | 00h00m00s | 00h00m00s |

FIG. 13J

| Entire Campus | | Totalized Electric Meters |
|---|---|---|
| Demand Target | 5,000 kW | |
| Current Instant Demand | 2,936 kW | |
| Energy Used Today | 34,503 kWh | |
| Curtailed Energy | 17,349 kWh | |
| Curtailed Demand | 36 kW | |
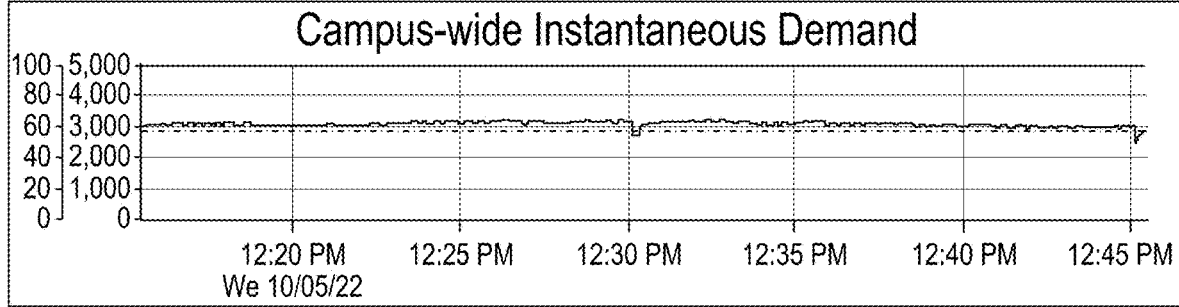
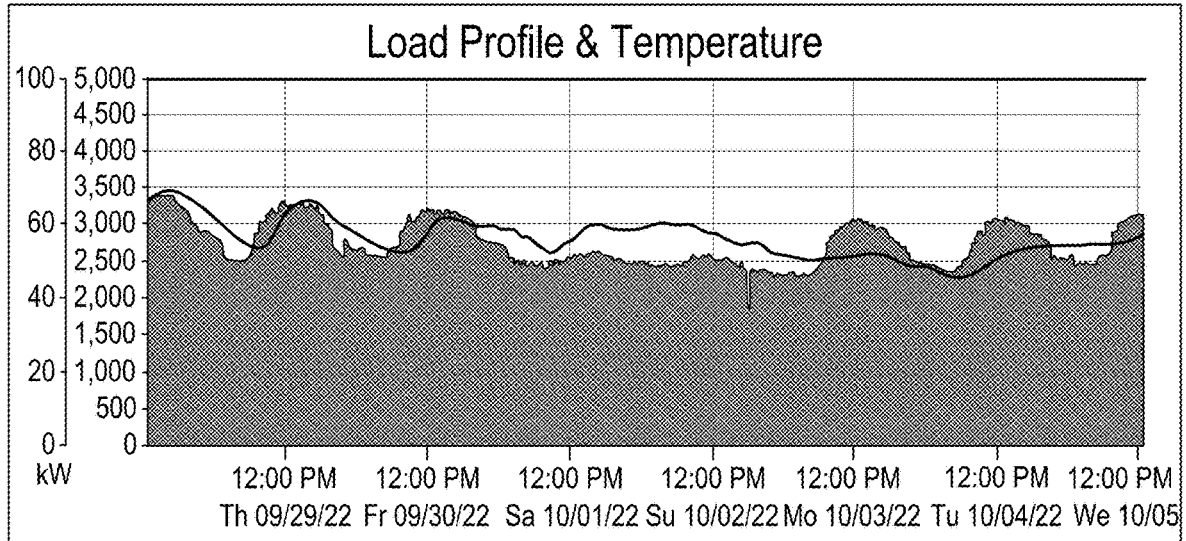
FIG. 16C

Sustainability Metrics

| | Monthly | |
|---|---|---|
| | Current | Previous |
| Electrical Power Density | 0 W/sqft | 0 W/sqft |
| Electrical Energy Cost Index | 0 $/sqft | 0 $/sqft |
| Energy Used (in kWh) | 279,816 | 279,816 |
| Harvested Energy (kWh) | 17,348.9 | 17,348.9 |
| Energy Cost Savings ($) | 2,272.71 | 2,272.71 |
| CO2 Reduction (Lbs) | 27,105.3 | 27,105.3 |
| CO2 Reduction (MTons) | 12.29 | 12.29 |
| Total square footage | 519,029 sqft | |

| | Year-to-Date |
|---|---|
| Energy Used | 18,427,746 kWh |
| Harvested Energy | 147,445.8 kWh |
| Energy Cost Savings | $19,242.76 |
| CO2 Reduction | 230,369.4 lbs |
| CO2 Reduction | 104.5 Mtons |

1,728

Trees Seedlings Grown for 10 yr.

23

Cars Driven for One Year

FIG. 16D

SYSTEM AND METHOD FOR KWH HARVESTING AND CARBON FOOTPRINT MANAGEMENT

CROSS-REFERENCE TO RELATED APPLICATIONS

This application claims benefit to U.S. Provisional Patent Application No. 63/256,682, filed on Oct. 18, 2021. The subject matter of the earlier filed application is hereby incorporated by reference.

COPYRIGHT NOTICE

FIELD OF INVENTION

The present disclosure relates generally to a computerized system and method for kWh harvesting and carbon footprint management and reductions.

BACKGROUND OF THE INVENTION

It is known that reducing carbon dioxide ($CO_2$) emissions is the only way to slow climate change. To address the climate change problem, it is important to address how buildings contribute to carbon emissions. The buildings sector accounts for about 40% of all U.S. primary energy use and associated greenhouse gas (GHG) emissions. Thus, it is essential to reduce energy consumption in buildings in order to meet energy and environmental regulation requirements and to reduce costs to building owners and tenants.

All buildings have a carbon footprint. A building's carbon footprint is defined as the amount of $CO_2$ it produces during its operations and activities. There are many contributors to a building's carbon footprint. Of the contributing factors, most building-related carbon emissions come from day-to-day energy use—known as the "operational carbon emissions." Globally, building operations account for about 28% of emissions annually. The major areas of energy consumption in buildings are heating, ventilation, and air conditioning; lighting; major equipment and appliances with the remaining in miscellaneous areas including electronics. In each case there are opportunities both for improving the performance of system components and improving the way they are controlled as a part of integrated building systems.

Opportunities for improved building efficiency and cost savings are enormous. To reduce carbon emissions from buildings, all levels of government, including federal, state, and local, have begun to implement new carbon emission laws and policies. For example, in 2019 New York City passed the Climate Mobilization Act, which is one of the most aggressive and rigorous carbon footprint reduction laws in the US. Local Law 97. The centerpiece of 2019's Climate Mobilization Act calls for carbon footprint reductions of 40% by 2030 and 80% by 2040, affecting more than 50,000 buildings in NYC. Local Law 97 in NYC forces companies to be comprehensively proactive in reducing their carbon footprint and subsequent contribution to global warming. Not meeting these strict GHG emission standards will result in penalties of $268 per metric ton of $CO_2$ over the mandated limits. If left unaddressed, the fines could reach hundreds of thousands of dollars per building each year. Other cities have announced plans to follow suit with similar carbon footprint laws.

Building owners and operators are asking the questions: How best to mitigate potential greenhouse gas fines? What are the Energy Conservation Measures (ECMs) one should put in place? and What are the lowest hanging fruits for kWh reduction? All keyed on reducing the facility's carbon footprint. To successfully implement a reliable and efficient carbon footprint management and reduction program, organizations need to methodically address comprehensive energy usage and the changing electric grid. This undertaking requires a "next level of energy management and efficiency" to mobilize significant reductions in facility energy intensity well beyond historical practice.

The five most significant challenges to verifiable ambitious carbon footprint management are:
1. The amount of energy usage must decrease, in most cases, dramatically.
2. Energy efficiency sources and reductions must be diversified.
3. Reliable Measurement and Verification (M&V) for energy reductions must be immediate with honest visibility.
4. Energy efficiency achievements and savings must be integrated into a carbon reduction framework.
5. Energy reductions and changing usage profiles must be part of the evolving electric distribution grid, integrating renewables, distributed energy resources (DERs), and intelligent load management.

Corporate carbon footprint goals along with the more rigorous legislated carbon emissions allowances have a momentous impact on building operations. Building owners need new means and methodologies to accurately monitor compliance including:
a. Real-time verifiable and unimpeachable carbon footprint computations including contributions by the individual system, user, and location.
b. Certifiable facility carbon footprint projections against corporate goals or legislated allowances.
c. Immediate and transparent actionable compliance accounting and direction.

SUMMARY OF THE INVENTION

The present invention may satisfy one or more of the above-mentioned desirable aspects. Other features and/or aspects may become apparent from the description which follows. The systems, methods and devices of the disclosure each have innovative aspects, no single one of which is indispensable or solely responsible for the desirable attributes disclosed herein. Without limiting the scope of the claims, some of the advantageous features will now be summarized.

Systems, methods, apparatus, and software are described herein for managing and reducing carbon footprint of buildings in a way that eliminates or ameliorates some or all of the problems described above.

The system, method, and software are configured to mitigate the carbon footprint caused by building operations. To provide building operations energy use optimization, the present invention uses a powerful kilowatt hour (kWh) harvesting and unique carbon footprint monitoring and management software platform. Specifically, the exemplary embodiments provide kWh harvesting that harvests energy from one or more load assets, which consume electrical power such as HVAC's, air conditioners, baseboard heaters, building lighting systems, other controllable loads or any combinations thereof.

As used herein, the term "kWh harvesting" refers to a systematic and continuous management process based on identification and prevention of excess electrical energy consumption expended in the delivery of load assets, for example, an HVAC load asset, and facility operations loads in the built environment. Energy consumption inefficiencies of such major load assets are reduced and optimized without compromising operations and comfort at any given time. Energy harvesting can be harvested from one or more load assets as described below.

The system and methods can use network applications and/or software applications to create customized strategies to measure the carbon footprint used by enterprises and to increase building wide savings.

The present invention specifically recognizes the infinitely distinctive facility operational modes dictated by occupancy and activities coupled with seasonal and hourly weather variations. This solution proactively and incrementally adjusts equipment operations and inputs/outputs to perform ongoing capture of those kWh being unnecessarily consumed. This enables the present invention to deliver persistent real-time performance optimization by implementing the "kWh harvesting" technique based on long term operating experience and proven technical capabilities. The present invention advances a proactive approach that emphasizes energy consumption identification and building energy use control and mitigation before carbon emission events that adversely affect climate change can occur.

The embodiments of the present invention can comprise hardware and software elements. In some embodiments that are implemented in software, all data points can be collected via automated processes, quality controlled and analyzed using Emacx® Systems, Inc. proprietary software, Aciex® Pulse Software Platform© and Aciex® Software Suite©. In various embodiments, the present invention provides a powerful and unique Carbon Footprint Monitoring and Control Software, Aciex® Pulse Software Platform© running on a Supermicro Fanless IoT Gateway to provide building operations with the right tools. In other embodiments, some or all method steps can be performed using any software and/or hardware commercially available products.

By engaging the "kWh harvesting technique" disclosed herein, the present invention can consistently deliver verifiable real-time carbon footprint determinations and persistent building performance optimization leading to resultant savings and carbon footprint reductions. The present invention is applicable to the management and control of a building's carbon footprint that affects both new construction as well as existing buildings. The system, method, and software can be installed to successfully transition existing conventional buildings to high-performance operations, which are now mandated for sustainable buildings of the future.

The present invention has consistently demonstrated having robust capabilities to:

Quantify and assess building GHG (green-house gas) emissions in real-time in accordance to the legal limits, and energy source contribution as well as a specific contributor so that they are immediately visible.

Accomplish full energy use transparency from the building level down to individual meter levels, across billing cycle, year, and variable compliance periods.

Calculate and forecast building year-end carbon footprint and associated penalties or surpluses across any compliance period.

Identify high-energy-consumption meters/tenants/users for targeted monitoring or management directed reductions.

Facilitate targeted kWh and kW reductions or noncompliance gap closure scenarios.

Enable at-will facility carbon emissions reporting and audit requirements.

Improve tracking and performance reporting, which are very necessary for current corporate environmental social policies and publications.

Through the use of high efficiency server technology and innovation, the present invention provides end-to-end green computing solutions to the data center, cloud computing, enterprise IT, and high performance computing (HPC). The present invention enables customization to build and deliver application-optimized solutions based upon an enterprise's requirements.

In the following description, certain aspects and embodiments will become evident. It should be understood that the invention, in its broadest sense, could be practiced without having one or more features of these aspects and embodiments. It should also be understood that these aspects are merely exemplary and explanatory and are not restrictive of the invention.

BRIEF DESCRIPTION OF THE DRAWINGS

FIGS. 4B-4D are screenshots of parameters which may be generated by the parameterization process of FIG. 4A, consistent with the disclosed embodiments.

FIGS. 6A-6E are flowcharts of a process for calculating $CO_2$ emissions limit vs. $CO_2$ tonnage emissions, consistent with the disclosed embodiments.

FIGS. 7A-7M are screenshots which may be generated by the calculation process of FIGS. 6A-6E, consistent with the disclosed embodiments.

FIGS. 11A-11C are screenshots depicting the mitigation measures and strategies in FIG. 10, consistent with the disclosed embodiments.

FIGS. 12A-12F are flowcharts of a kWh harvesting process, consistent with the disclosed embodiments.

FIGS. 12G-12L are screenshots depicting the kWh harvesting process in FIGS. 12A-12F, consistent with the disclosed embodiments.

FIGS. 13A-13J are screenshots depicting the process of the loads prioritized and organized in groups, consistent with the disclosed embodiments.

FIGS. 16A-16D are screenshots that illustrate an aggregate summary view of the kWh harvesting operations displayed on a data interface dashboard, consistent with the disclosed embodiments.

The skilled artisan will understand that the drawings described below are for illustrative purposes only. The drawings are not intended to limit the scope of the present teachings in any way.

DETAILED DESCRIPTION OF THE EMBODIMENT(S)

Embodiments of this disclosure encompass systems, methods, and software for proactively and incrementally adjusting equipment operations and inputs/outputs to perform ongoing capture of kilowatt hours (kWhs) being unnecessarily consumed by ongoing recalibration of facility operations all the while maintaining even the strictest environmental quality. The system delivers persistent real-time performance optimization with the implementation of a "kWh harvesting" method and application that provide a long-term, efficient, and cost-effective solution for the reduction of carbon dioxide ($CO_2$) emissions.

As mentioned above, the term "kWh harvesting," as used herein, refers to a systematic and continuous management process based on identification and prevention of excess electrical energy consumption expended in the delivery of load assets, for example, an HVAC load asset, and facility operations loads in the built environment. Energy consumption inefficiencies of such major load assets are reduced and optimized without compromising operations and comfort at any given time. Energy harvesting can be harvested from one or more load assets as described below.

Figure 1:
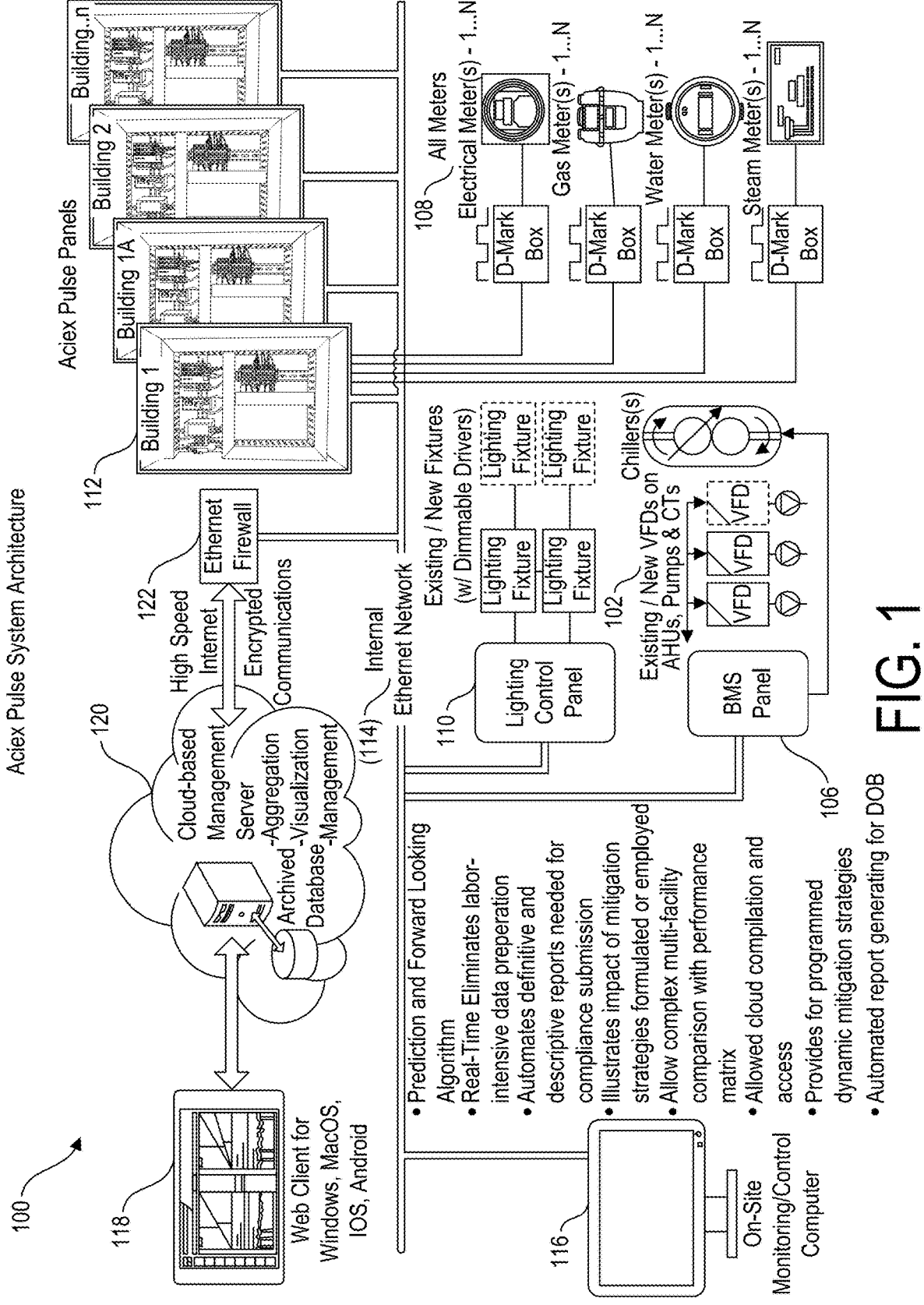
FIG. 1 is an exemplary system architecture, consistent with the disclosed embodiments.

FIG. 1 illustrates an exemplary system 100 architecture for implementing embodiments consistent with this invention. These components of the system may 100 be implemented using any suitable combination of hardware, software, and/or firmware. The components may correspond to functional blocks implemented with a set of instructions executed by suitable hardware (e.g., a computer, a server, a group of computers, or one or more computing nodes operating over a network). The components may also correspond to programmable, fixed-function hardware, such as programmable-logic devices, such as PALs, PLAs, CPLDs, or FPGA. The number and arrangement of components in FIG. 1 is merely provided for illustration.

The system 100 with its granular energy consumption tracking capability can be incorporated and seamlessly integrated with any existing Building Management System (BMS) 106. It should be understood that the BMS 106 as depicted in FIG. 1 is merely an example and other existing or future BMS may be used in conjunction with the system 100. The integrated system platform will provide operators the capability to monitor the current carbon footprint posture and project year-end target compliance and goals of commercial buildings, hospitals, universities, and among other facilities. It is noted that buildings and facilities are constructed to have different configurations across the building industry. Thus, the architecture of the system 100 is easily customizable and adaptable to the specifics of each facility for which it is deployed. The system 100 also provides a best-of-class proactive approach to reduce carbon dioxide ($CO_2$) emissions accomplished through ongoing facility performance optimization without sacrificing environmental quality.

The system 100 generates these valued emissions reductions by implementing its proprietary optimization technique of "kWh harvesting". According to the present teachings, kWh harvesting is a sustainability strategy executed by the system to:

a. Capture the "wasted" usage of kWh of load assets stemming from due universally recognized inherent systems overdesign or overly conservative systems operations.

b. Capitalize on recalibration optimization of operations during non-peak conditions, and ambitiously taking advantage of seasonal and hourly weather variations c. Optimize energy asset loads that are pointlessly running at 100% capacity 24 hours, 7 days a week d. Enhance operating efficiencies of energy-consuming load assets with additional controls such as variable frequency drives (VFDs)

e. Taking advantage of load shifting and scheduling

As illustrated in FIG. 1, the integration of the system into a facility begins with a thoroughly detailed facility evaluation process. A meticulous granular load study is performed. Appreciable electric-consuming load assets 102 that could potentially qualify for the kWh harvesting technique are identified. FIG. 1 shows examples of load assets 102 (e.g., air handling units (AHUs), pumps, chillers, etc.) that may be used for the kWh harvesting process. It will be readily appreciated that other loads may also be connected to the BMS 106. All operating parameters of these load assets 102 are codified and documented.

These pre-qualified selected load 102 reduction resources are registered into the software platform of the system and assigned to the kWh harvesting protocols. Through a proprietary innovative forward-looking feedback analysis, the software determines at any given time how the load is specifically performing (such as speed, HZ, kW, . . . ) and what load reduction potential is possible as a result of facility real-time environmental coincidental data retrieved from the BMS interface 106.

Once the load assets 102 that qualify for kWh harvesting are identified and selected, the time-stamped sustainable kW reduction from each load 102 is determined and triggered with targeted facility operations acting as the maintained IEQ (Indoor Environmental) reference point. The aggregation of each kW reduction achieved coupled with the associated harvesting period of that reduction will determine the ongoing real-time reduced kWh accumulation being achieved at any instant and cumulative from any point of reference or overall time period.

Since one of the primary functions of the kWh Harvesting software is to analyze all the loads 102, (e.g., AHUs, Pumps, Chillers, etc.), associated with the system 100, it is essential that the loads 102 are connected to the BMS 106 since all the curtailing commands must pass through the BMS 106 and the feedback status for each load 102 is provided by the BMS 106. The curtailing command controls the individual loads 102 so as to shift or curtail usage. Thus, all the selected loads 102 selected and triggered for kWh harvesting can be connected to, monitored, and ultimately controlled by the existing facility BMS 106 with the software platform of the present invention acting in a suggested target parameter fully in synchronization with the BMS 106.

In addition, the system 100 reports the energy consumption, in real-time, for each source of energy used by the building where the system is installed. To be able to accurately collect and report the energy resource consumption information, the system 100 must be connected to all the meters 108, for example, electric, gas, steam and water in the building wherever those meters 108 may be located. The system 100 receives data from the meters 108 and other sensors.

The system 100 may interact with other systems that are ancillary to the loads 102. The system may import information from these ancillary systems, such as LED Lighting Control 110, which can have their own controllers. Such ancillary systems, participating in the kWh Harvesting strategy, need to also be interfaced with the system 100 so that system 100 can harvest energy from the ancillary system.

Figure 3A:
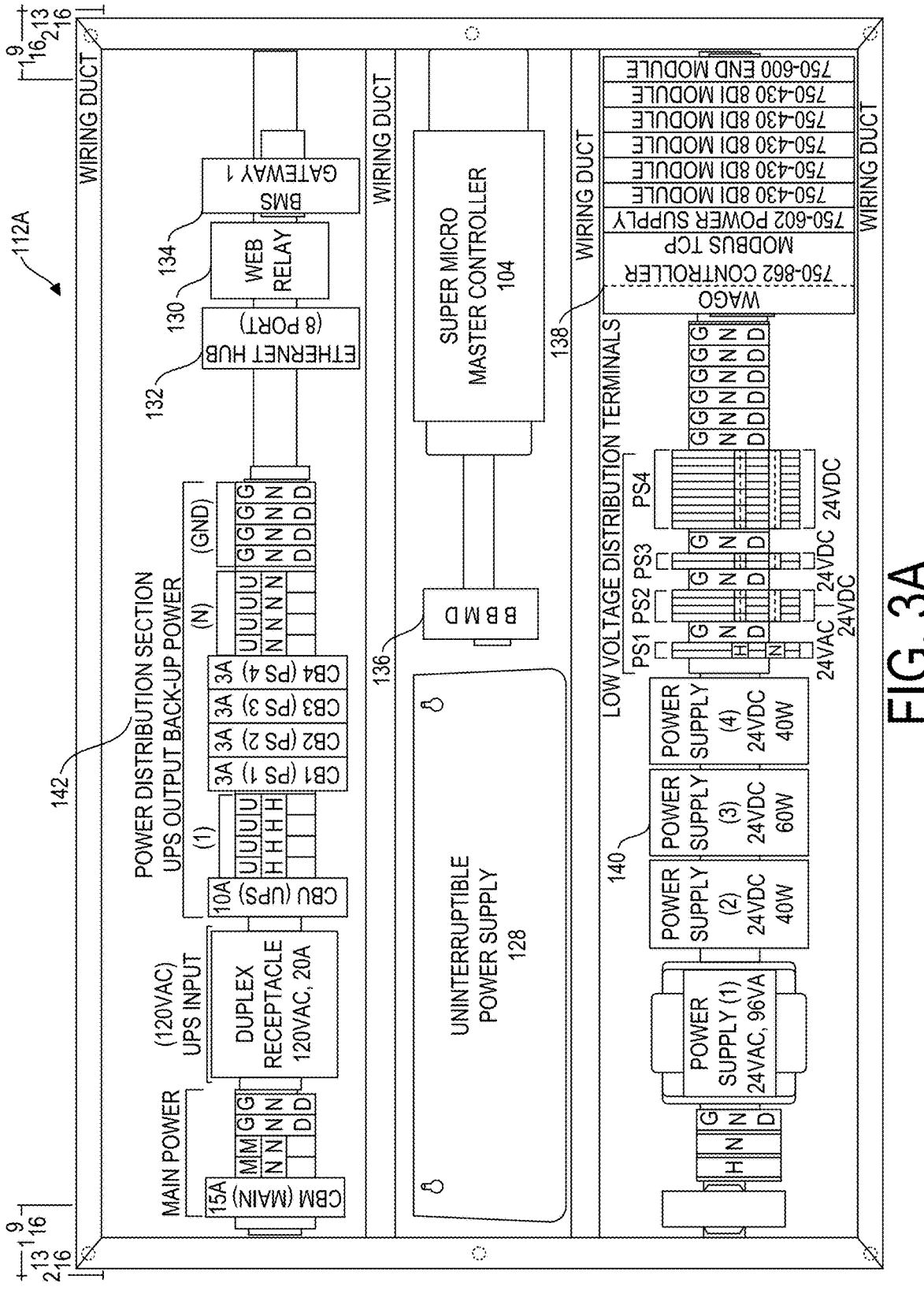
FIG. 3A illustrates exemplary components of a main panel, consistent with the disclosed embodiments.
Figure 3B:
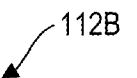
FIG. 3B illustrates exemplary components of a satellite panel, consistent with the disclosed embodiments.

Industrial panels 112 include the electronic components necessary for implementing the system 100. Depending on the location of the meters 108, more than one panel 112 may be required to be installed into the facility to optimize the operation of the system 100. All the panels 112 are connected together to one main panel which houses an industrial controller 104 (FIGS. 3A-3B). The industrial controller 104 is a special purpose computer for controlling the kWh Harvesting process and the components. The various components of the industrial controller 104 can be spatially disturbed about the facility and interconnected to the industrial controller 104.

The industrial controller 104 controls the devices, processes, and other assets of the system 100 via a kWh Harvesting algorithm, which is one of the main components of the system 100. The industrial controller 104 can execute a control program, which can be used to process input signals read into the controller 104 and to control output signals generated by the industrial controller 104.

In this example, while the meters 108 are hardwired to the panels 112, the industrial panels 112 and their electronic components, and the BMS 106 are interconnected using the TCP/IP protocol on the building's internal Ethernet network or on the BMS network 114.

Typically, a computer 116, such as a Windows™-based computer can be installed on-site at the facility, and connected to the main industrial panel via the same Ethernet network 114. This on-site computer 116 provides an efficient and convenient way to (re-)configure, manage and monitor the entire system 100. Although this exemplary implementation discusses a Windows™-based computer, there could be web-based or use of any other acceptable software.

In addition, the same software application may be installed on a cloud-based computer 120 for remote management. The cloud-based management computer 120 may also serve as a platform for aggregating and analyzing the data from multiple buildings and facilities. All cloud-based connections can be encrypted and transferred from the internal network to a public internet via the network firewall 122 which regulates inbound and outbound traffic.

A web client, such as browsers or applications therein, that may operate on a mobile device 118 may be accessed for monitoring the KPIs (key performance indicators) of the project. The mobile computing device 118 includes a transceiver arranged to (1) send and receive data communications via the BMS network and (2) periodically send operational status data to a remote resource controller (e.g., industrial controller 104), the operational status data can include at least one key performance indicator and/or alert message.

The remote computing devices may be mobile devices, such as smart phones, table computers, wearable computing devices such as smart watches, or other highly mobile computing devices. The remote computing devices may also include notebook, netbook, desktop, or similar computers located remotely from the facility and communicating with a mobile server via the web client (e.g., a web browser or application running therein).

Once the kWh harvesting goal is authorized by facility operations, guided by year-end projections, and the amount to harvest from each load 102 determined, the loads 102 are prioritized and organized in groups. The priority indicates the order in which the loads 102 are activated for kWh harvesting. The lower the priority, the earlier the load will be harvested. The groups are formed with loads 102 to create uniform entities that will provide comparable amounts of kWh that can be harvested.

To "assure" the determined kWh harvesting amount necessary for the carbon footprint reduction sought after, each load 102 group has more usage reduction potential available for collecting than required.

Each group of loads 102 is on a rotating schedule activated for shedding, for example, for 15 minutes (time adjustable) and then reconnected, for example, for 15 minutes. If there are more than two load groups, each load 102 group is activated less often for kWh harvesting. Each group 102 can be assigned a different time duration for kWh harvesting and reconnection. In general, the more individual loads 102 that are available for kWh harvesting the higher the energy reduction the more load 102 groups can be formed, and consequently each load group, due to the rotation schedule, is less often activated.

In summary the unique and smart kWh harvesting controls methodology of the present invention allows for significant kWh reduction without compromising operations or comfort at any given time.

The system 100 provides any industry with real-time, next-generation controls strategy for kWh harvesting and carbon footprint management solution. The system 100 fully automates the assessment, compliance, reporting administration, and mitigation capability requirements to meet corporate carbon footprint goals or legislated carbon emission allowances with associated penalties. The system 100 provides deliverables that will meet the challenges of climate change.

In use, the system 100 specifically recognizes the infinitely distinctive facility operational modes dictated by occupancy and activities coupled with seasonal and hourly weather variations. The system 100 optimizes operations by responding to inherent systems overdesign, capitalizing on non-peak condition reduction potentials and allowances, and integrated proactive predetermined protocols including selective load reduction rotation. Correcting and capturing these "right sizing" inefficiencies is one of the main principles in delivering high performance sustainable building operations.

The system 100 proactively and incrementally adjusts equipment operations and inputs/outputs to perform ongoing capture of the kWhs being unnecessarily consumed by ongoing recalibration of facility operations all the while maintaining even the strictest environmental quality. The system 100 delivers persistent real-time performance optimization with the kWh harvesting technique grounded by long term efficient building operating experience and proven technical capabilities.

The facility integration of the system 100 begins with a thorough evaluation process. A meticulous granular load study is performed where all potential load 102 assets that qualify for the kWh Harvesting technique are identified with all operating parameters documented. These pre-qualified selected load 102 assets are keyed into software platform for the kWh harvesting protocol. Through a proprietary sophisticated feed-back analysis the system 100 knows in real-time how the load 102 is specifically performing (speed %, HZ, kW, etc.).

Potential load 102 assets can be identified to meet, for example, the following requirements in order to be eligible for kWh-Harvesting:

Motor Load assets can be on a VFD (Additional VFDs will be added as part of the implementation process).

Resistive Loads, like electric heaters, should be controllable.

Load assets cannot be mission critical (like an Operating Room AHU).

Load assets need to be fully integrated into the BMS.

Load assets needs to meet minimum run times to be viable.

To ensure successful selective kWh Harvesting targets and objectives, following exemplary steps can be taken:

Qualified loads 102 are categorized according to persistent or fixed permanent potential to yield results.

To safeguard seamless operation with negligible impact, load classifications can be alternated based on a preset schedule approved by plant operations.

kWh Harvesting targets and results are continuously monitored and adjusted according to facility conditions and operation mandates. A constant commissioning principle is ingrained in the software platform.

Figure 2A:
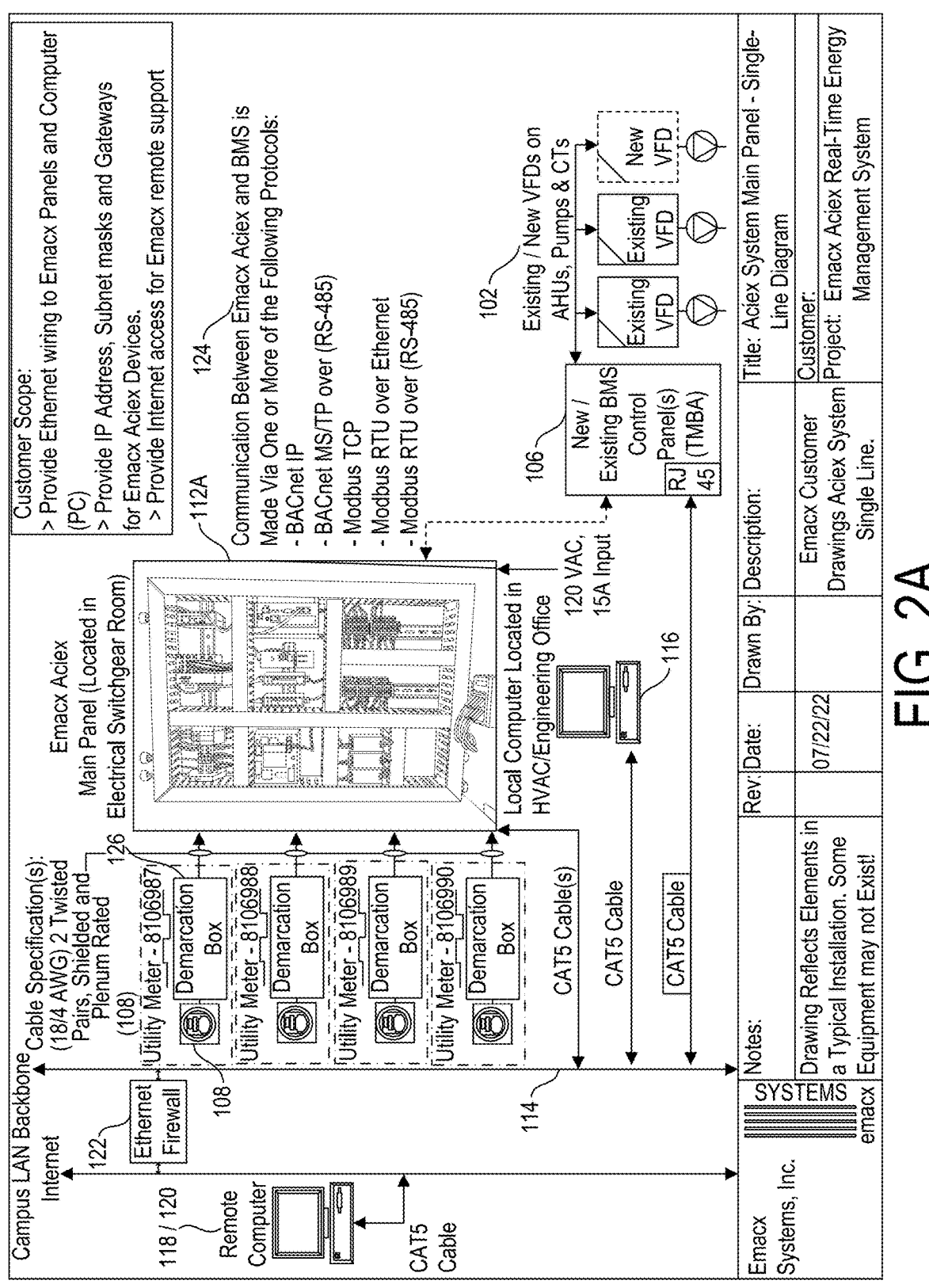
FIG. 2A illustrates an exemplary main panel, consistent with the disclosed embodiments.
Figure 2B:
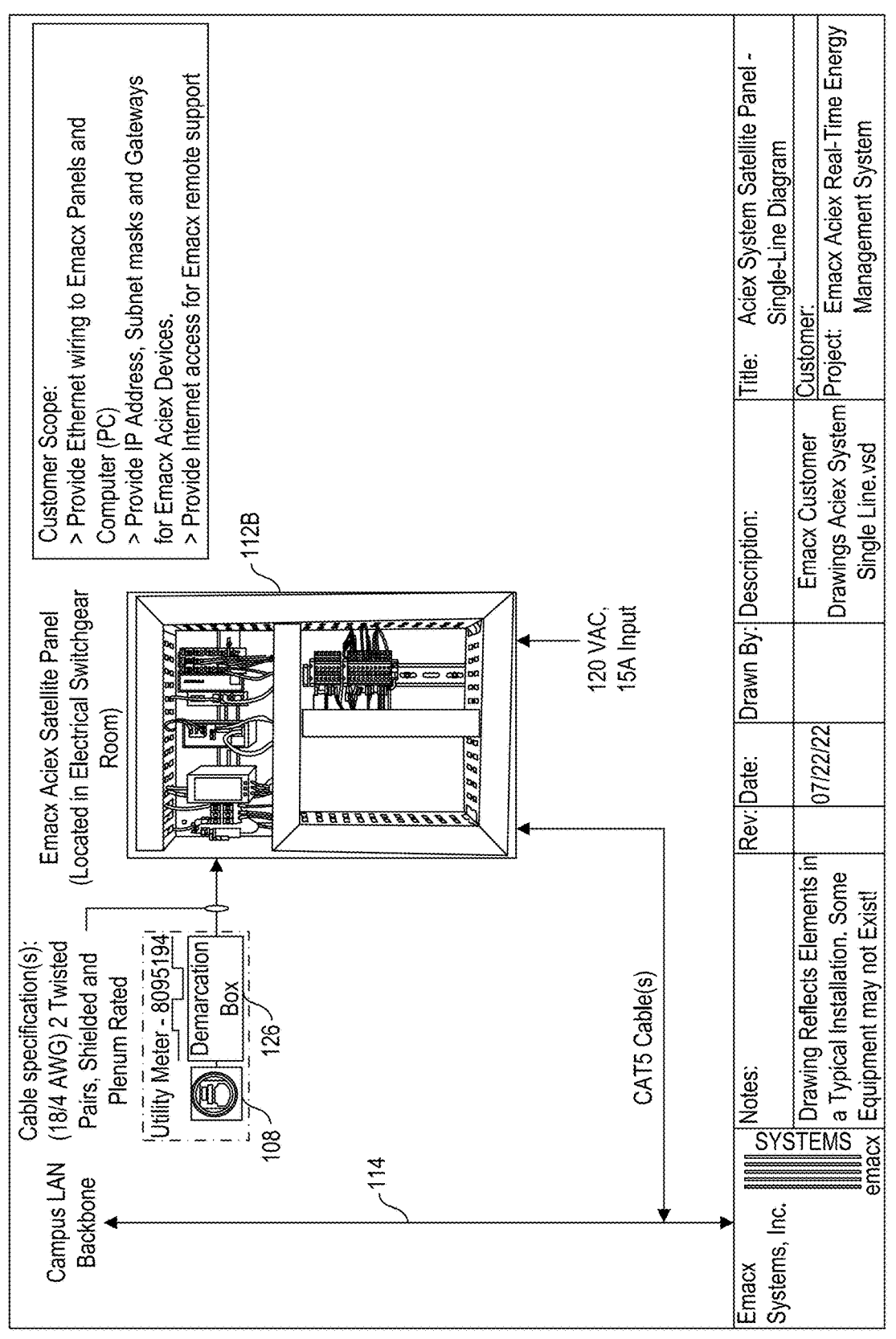
FIG. 2B illustrates an exemplary satellite panel, consistent with the disclosed embodiments.

In FIGS. 1, 2A and 2B, the building management system (BMS) 106 controls one or more devices servicing the building or structure. Such a BMS 106 may be implemented in, for example, office buildings, factories, hospitals, health clubs, movie theaters, restaurants, and residential locations. The illustrative BMS 106 shown may include one or more heating, ventilation, and air conditioning (HVAC) systems, one or more security systems, one or more lighting systems, one or more fire systems, and one or more access control systems. These are just a few examples of systems that may be included or controlled by the BMS 106. In some cases, the BMS 106 may include more or fewer systems depending on the industry. For example, some buildings may include refrigeration systems or coolers. In some cases, each system may include a client device configured to provide one or more control signals for controlling one or more building control components and/or devices of the BMS 106.

The illustrative BMS 106 shown in the figures include one or more heating, ventilation, and air conditioning (HVAC) systems. For instance, in some cases, the HVAC system may include an HVAC control device used to communicate with and control one or more HVAC devices (individually or collectively) for servicing the HVAC needs of the building or structure. It should be understood that the structure may include fewer than or more than the devices shown. Some illustrative devices may include, but are not limited to a furnace, a heat pump, an electric heat pump, a geothermal heat pump, an electric heating unit, an air conditioning unit, a roof top unit, a humidifier, a dehumidifier, an air exchanger, an air cleaner, a damper, a valve, blowers, fans, motors, and/or the like. The HVAC system may further include a system of ductwork and air vents. The HVAC system may further include one or more sensors or devices configured to measure parameters of the environment to be controlled. The HVAC system may include more than one sensor or device of each type, as needed to control the system. It is contemplated that large buildings, such as, but not limited to an office building, may include a plurality of different sensors in each room or within certain types of rooms. The one or more sensors or devices may include, but are not limited to, temperatures sensors, humidity sensors, carbon dioxide sensors, pressure sensors, occupancy sensors, proximity sensors, etc. Each of the sensor/devices may be operatively connected to the control device via a corresponding communications port. It is contemplated that the communications port may be wired and/or wireless. When the communications port is wireless, the communications port may include a wireless transceiver, and the control device may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

In the system architecture of FIG. 1, the system can include a host device which can be any hardware device that has the capability of permitting access to a network via a user interface, specialized software, network address, protocol stack, or any other means. The host device can function as a server, a client, a local controller, or any other suitable device. The host device can perform various communication and data transfer functions as described herein and can execute one or more application functions. The host device can be any of a variety of computing devices (e.g., computer 116 or remote computer 118), such as a server computer, a desktop computer, a handheld computer, a tablet computer, mobile telephone or other mobile device, and the like. The components of the host device may include, but are not limited to, a controller, a system memory, and a bus that couples various system components including the system memory to the controller.

The controller may include one or more controllers or processors that execute instructions stored in the system memory. The controller may include a programmable microprocessor. Such a programmable microprocessor may allow a user to modify the control logic of the host device even after it is installed in the field (e.g., firmware update, application update). When provided, the bus may represent one or more of any of several types of bus structures, including a memory bus or memory controller, a peripheral bus, an accelerated graphics port, and a processor or local bus using any of a variety of bus architectures. By way of example, and not limitation, such architectures include Peripheral Component Interconnect (PCI) bus and PCI Express bus.

The system memory of the host device can include computer system readable media in the form of volatile memory, such as random access memory (RAM) and/or cache memory. The host device may further include other removable/non-removable, volatile/non-volatile computer system storage media. By way of example only, the storage system can be provided for reading from and writing to a non-removable, non-volatile magnetic media (not shown and typically called a "hard disk drive" (HDD) and Solid State Drive (SSD)). A magnetic disk drive for reading from and writing to a removable, non-volatile magnetic disk (e.g., a "floppy disk," flash drive, and USB drive), and an optical disk drive for reading from or writing to a removable, non-volatile optical disk such as a CD-ROM, DVD-ROM or other optical media can be provided. In such instances, each can be connected to the bus by one or more data media interfaces.

The building system controllers and/or IoT devices may be connected to the host device through any type of connection such as a network, including a local area network (LAN) or a wide area network (WAN), or the connection may be made to an external computer (for example, through the Internet using an Internet Service Provider). In various embodiments, the host device may communicate with one or more devices from the various systems of the building system controllers over the network. Such communication can occur via Input/Output (I/O) interface(s). In some cases, the controller of the host device may be operatively coupled to I/O interface(s) via the bus, and may use the I/O interface to communicate with devices via the building system controllers.

In some cases, the control devices and/or the host device may be programmed to communicate over the network with an external web service hosted by one or more external web servers. The control devices and/or the host device may be configured to upload selected data via the network to the external web service where it may be collected, stored, and/or analyzed on the external web server. Additionally, the control devices and/or the host device may be configured to receive and/or download selected data, settings, and/or services sometimes including software updates from the external web service over the network. The data, settings and/or services may be received automatically from the web service, downloaded periodically in accordance with a control algorithm, and/or downloaded in response to a user request.

The host device may be a single host device or multiple host devices. The multiple host devices can be configured as a distributed computer system including multiple servers or computing devices that interoperate to perform one or more processes and functionalities associated with the disclosed embodiments. The host devices can include one or more servers or computing devices that can distribute processing and/or memory resources amongst one or more physical and/or virtual machines. As a distributed systems, some or all of the components of the systems can work together over different physical or virtual network devices across a data center or cloud computing environments.

The exemplary diagram in FIG. 1 depicts a plurality of buildings, Building 1, Building 2, Building n (collectively, Buildings) each having, for example, one or more HVAC control devices, one or more lighting system control devices, and/or one or more access control system control devices in communication with an external web server. It is contemplated that devices from any number of buildings may be providing information to the external server. In some cases, a few, hundreds, thousands, tens of thousands, or more buildings may be in communication with the external web server(s). The buildings may each have one or more of: an HVAC system, a light system, and/or an access control system, etc., which may be in communication with one another and/or other controller (e.g., host device) configured to operate the systems and devices within the respective building. The control devices from each building may relay performance data, operating parameters, alarm conditions, electricity, gas, water and/or steam usage, etc. to the external server. In some cases, the data may be relayed through a WAN to the external server. In some cases, the external server may be configured to aggregate the data obtained from the individual buildings.

As shown in FIGS. 3A-3B, the device controller, such as WAGO PLC controllers, may be used for providing connections to one or more meters (e.g., electrical, gas, steam, and water, see for example FIGS. 1-2B, and 5B-5F) to obtain the data to conduct load asset analysis for performing kWh harvesting, as will be described in more detail herein. Once aggregated, the data can be analyzed for trends, outliers, etc., to make changes and/or recommendations for improving the efficiency of one or more of the buildings.

FIG. 2A illustrates an example of a main panel 112a for use in establishing connections with the components of the system 100. Implementation of the system 100 within a facility require access to most, preferably all, of the meters 108. The meters 108 can be, for example, electric, gas, steam, fuel, water, etc. The connections to the meters 108 within the system 100 can be established through components installed in an industrial panel, such as main panel 112a.

Implementation of the system 100 can be performed to modernize an existing facility to monitor its carbon footprint by providing a configuration that does not tamper with the integrity of the facility, including the meters 108 installed in the facility. Because the system 100 does not tamper with the integrity of the meters 108, a demarcation point is established where the network of system 100 ends and connects with the components or wiring at the facilities' premise. Thus, a DEMARC box 126 is installed to each meter that the system 100 is connected to in order to have access to real-time energy pulse signals. The DEMARC box 126 is then connected via low voltage wiring to components inside the panel (112).

Components inside the main panel 112a (which are described below in FIG. 3A), in turn, connect to the BMS 106 using one of communication protocols 124 available in the system 100. The BMS 106 includes a communication network including software and hardware systems networked to control and monitor various parameters of the facility's operation. The software program of the BMS 106 is configured to use one or more of a variety of different protocols, such as BACnet, Modbus, DeviceNet, SOAP, XML, ARCnet, LonWorks, and Profibus. These communication networks interface, for example, with room condition monitoring systems, including room pressure monitors, temperature monitors, and humidity monitors, for example.

The BMS 106 itself is connected to all the loads 102, such as AHUs, and transfers all the curtailment commands from the systems 100 to the loads 102 once it has validated those commands. The curtailing command is used to control the individual loads 102 so as to initiate a shift or curtail usage.

The components inside the main panel 112a can communicate with each other through the internal network 114 whether it is the BMS internal network or the building internal network, such as the campus LAN backbone. In an embodiment where the main panel 112a is not connected to the BMS internal network additional device(s) may be required to achieve communication with the BMS 106.

The management computer 116 communicates with the main panel 112a usually on the same internal network 114 although it may be located on a separate segment or VLAN requiring additional configuration in the building IT infrastructure such as switches and firewalls.

The communication interface may be configured to enable connection to external systems (e.g., an external network). In this manner, data may be retrieved from a remote, external server via the external network in addition to or as an alternative to an internal memory. All external communications, including with remote computers 118 and/or cloud-based computers 120 can be achieved through high-speed internet lines. All the data packets are encrypted to and from these devices and all the connections are controlled by the internal network firewalls 122 and other security measures.

FIG. 2B illustrates an example of a satellite panel 112b for use in establishing connections with the components of the system 100. Often, a facility may be comprised of multiple building with meters 108 located in each different building, and/or in locations too remote from the main panel 112a. In such an embodiment, one or several satellite panels 112b should be installed and connected to the main panel 112a through the facility's internal network 114. In this embodiment, a DEMARC box 126 must be installed for each of the meters 108 connected to the satellite panel 112, as described above.

FIG. 3A depicts an embodiment of the components that may be installed into an exemplary main panel 112a. It is understood to a person skilled in the art that the components installed into the main panel 112a may differ in numbers and types depending on the BMS (106) that the system 100 software platform communicates with, the numbers of meters, the protocols used and the number of ethernet connections provided in the system. However, a minimum core number of components will always be present in the main panel 112a.

First, the components may be powered by a 120 VAC power source 142 or any other suitable power source, as desired. A conventional 120 VAC power 142 can be provided to the main panel 112a with its power distribution system for all the components present and connected to the uninterruptible power supply UPS 128. The UPS 128 provides stable power to all the internal components by protecting them against brownouts and power surges. All the components and devices in the main panel 112a may use low voltage provided through a low voltage power supply and distribution terminals 140.

In addition to the input power circuitry 142 and the low voltage distribution subsystem 140, an exemplary main panel 112a may include one or more of the following components:

1) A WAGO PLC (programmable logic controller) module 138 for digital I/Os. All the meters 108 are connected to the system's software platform through the WAGO module 138. The pulses sent by the meters 108 are collected by the WAGO modules 138 and sent to the master controller 104 via an ethernet connection on the internal network 114 for processing. Given that the main panel 112a has an ethernet interface, it may be managed and reconfigured remotely should the need arise.

2) A master controller 104. This industrial computer is the brain of the system as it receives all the inputs from the meters 108 through its connection to the WAGO module 138, processes them using all the algorithms comprising the system software platform and, if necessary, sends corresponding set points commands to the loads 102 by the intermediary of the BMS 106 over the internal network 114. The master controller 104 in return receives feedback from the loads 102 through the BMS 106. This process is continuously repeated.

3) In various embodiments, a facility is typically configured such that an individual ethernet drop or connection is provided for every device in the main panel 112a including a few spares. However, in other embodiments, some facilities only provide one single ethernet connection to the main panel 112a. In such cases, a small ethernet hub or switch 132 can be added to the main panel 112a so that all ethernet based devices in the main panel 112a may communicate with the master controller 104 and by extension to other devices such as the BMS 106 and the monitoring computer 116 on the internal network 114.

4) The mode of communication of the system software platform can be, for example, the Modbus protocol which can be used to communicate with the WAGO modules. Since most BMSs 106 use the BACnet protocol, a gateway 134 can be added as a way to communicate with all commercially available BMSs. The gateway 134 enables the system software platform's Modbus registers to be mapped to BACnet objects so that the system software platform may communicate with the BMS. If the BMS 106 also uses Modbus as its communication protocol then the gateway 134 can be replaced with a Modbus converter to fulfill a similar function. Whether a gateway or a Modbus converter or both are used in a main panel 112a, they can be accessed and reconfigured remotely through their ethernet interface.

5) In some cases, the network infrastructure of the facility is complicated as BACnet is used to connect campuses, not just buildings. When several networks are connected together, a BACnet/IP Broadcast Management Device (BBMD) 136 may be necessary to bridge them so that system software platform may communicate successfully with the BMS 106.

6) Sometimes, glitches may occur in the devices, and it may be necessary to cycle their power (soft reboot). In such a situation, web relays 130 can be a very useful tool to enables a user to perform the soft reboot over an internet connection whether the user is located onsite in the building or off-site. All ethernet based devices inside the main panel 112a customarily have their input power connected through the web relay 130 so that they may be remotely and securely accessed.

FIG. 3B depicts an embodiment of the components that may be installed into an exemplary satellite panel 112b. In various embodiments, satellite panels 112b are used to connect to remotely located meters 108. They are connected to the main panel 112a through the internal network 114. Since they only collect pulses from the remote meters 108, they only contain a subset of all the devices in a main panel 112a. The satellite panels 112b can include a 120V power section 142 as well as a low voltage power distribution system 140. Since the main purpose of a satellite panel 112b is to collect pulses from meters 108, it contains a WAGO module 138 with the required digital I/Os necessary to accommodate all the meters 108 connected. To protect all the components inside the satellite panel, a UPS (128) is installed in the same way as in the main panel 112a.

Figure 4A:
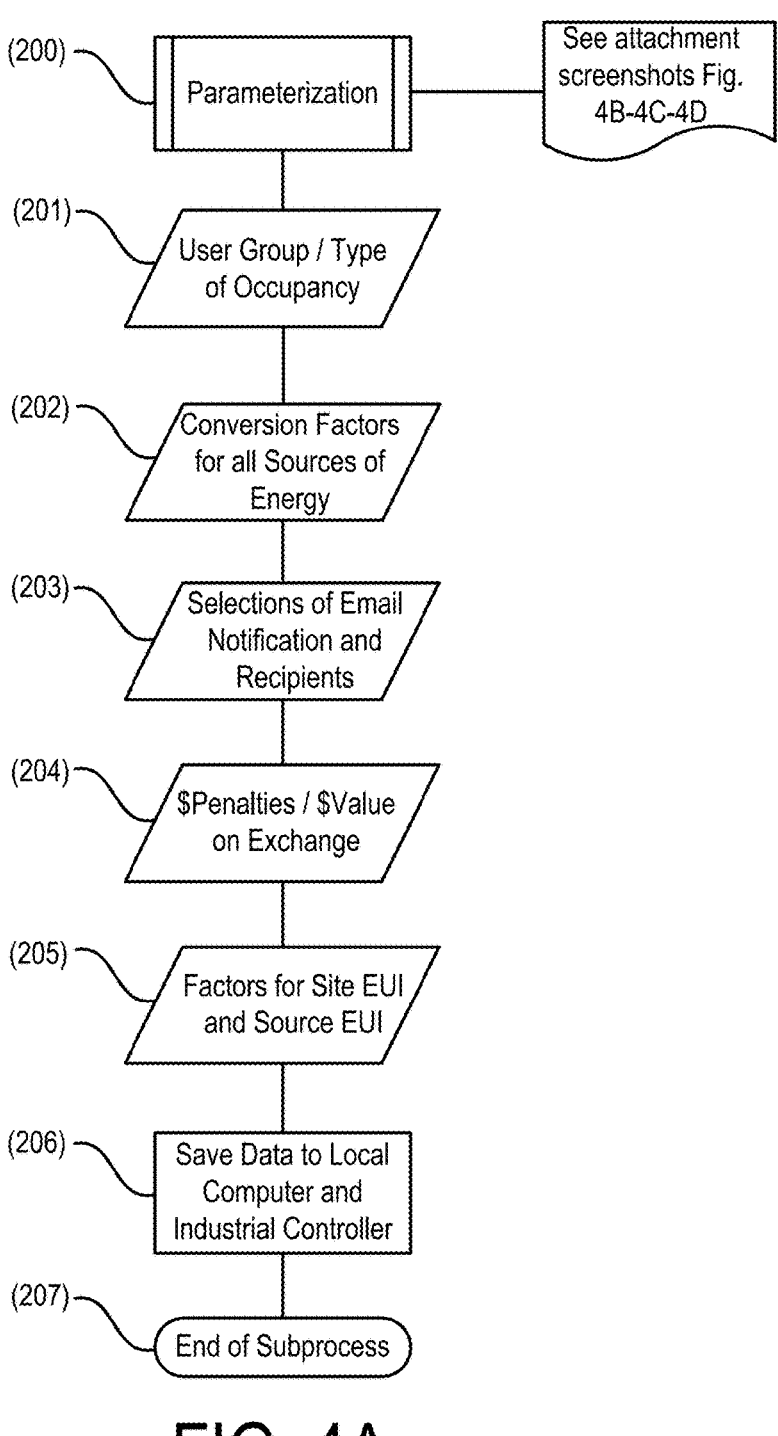
FIG. 4A is a flowchart of a parameterization process, consistent with the disclosed embodiments.
Figure 5A:
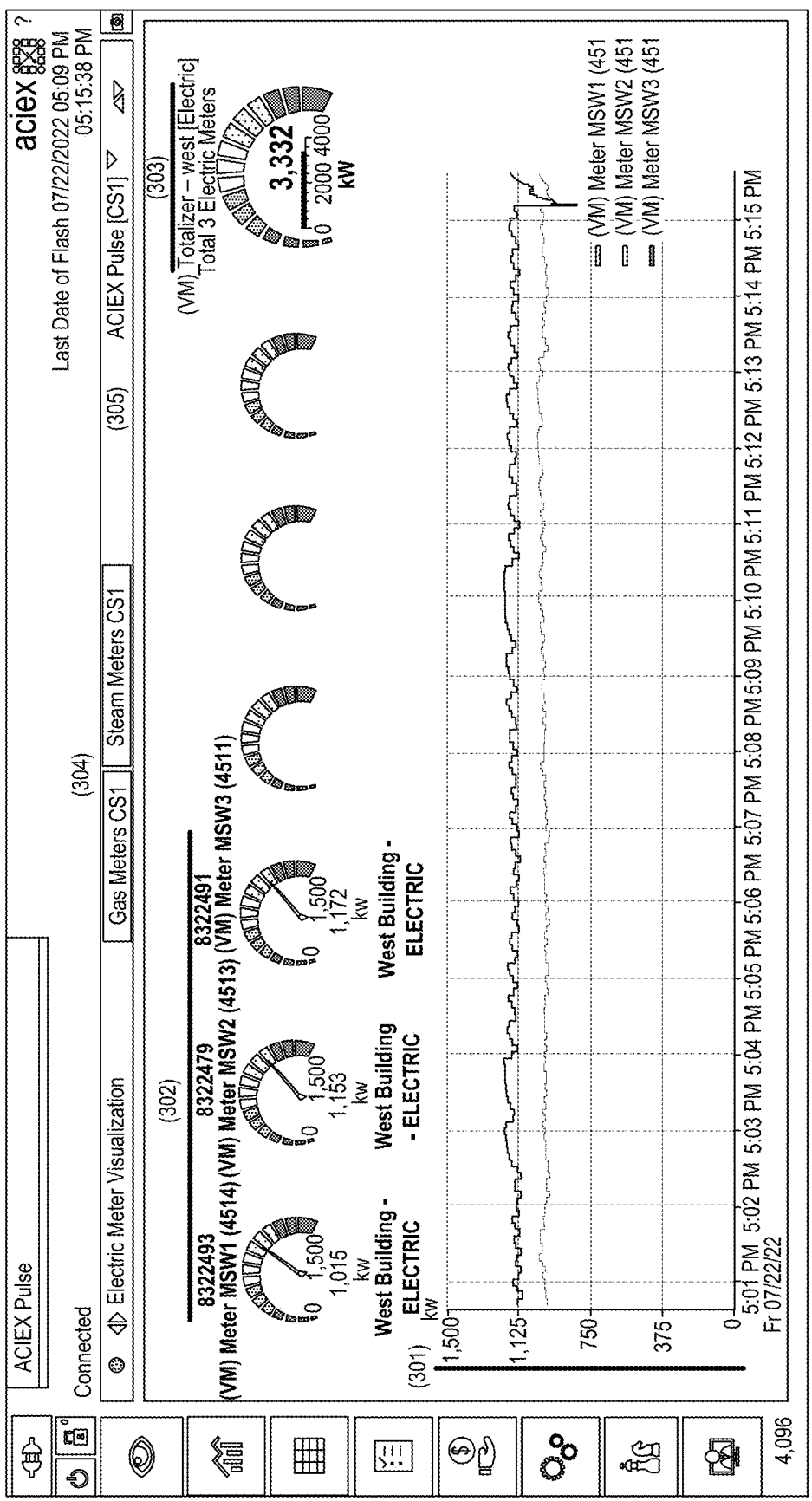
FIGS. 5A-5L are screenshots showing example visualizations of meter data, consistent with the disclosed embodiments.
Figures 5B, 5C:
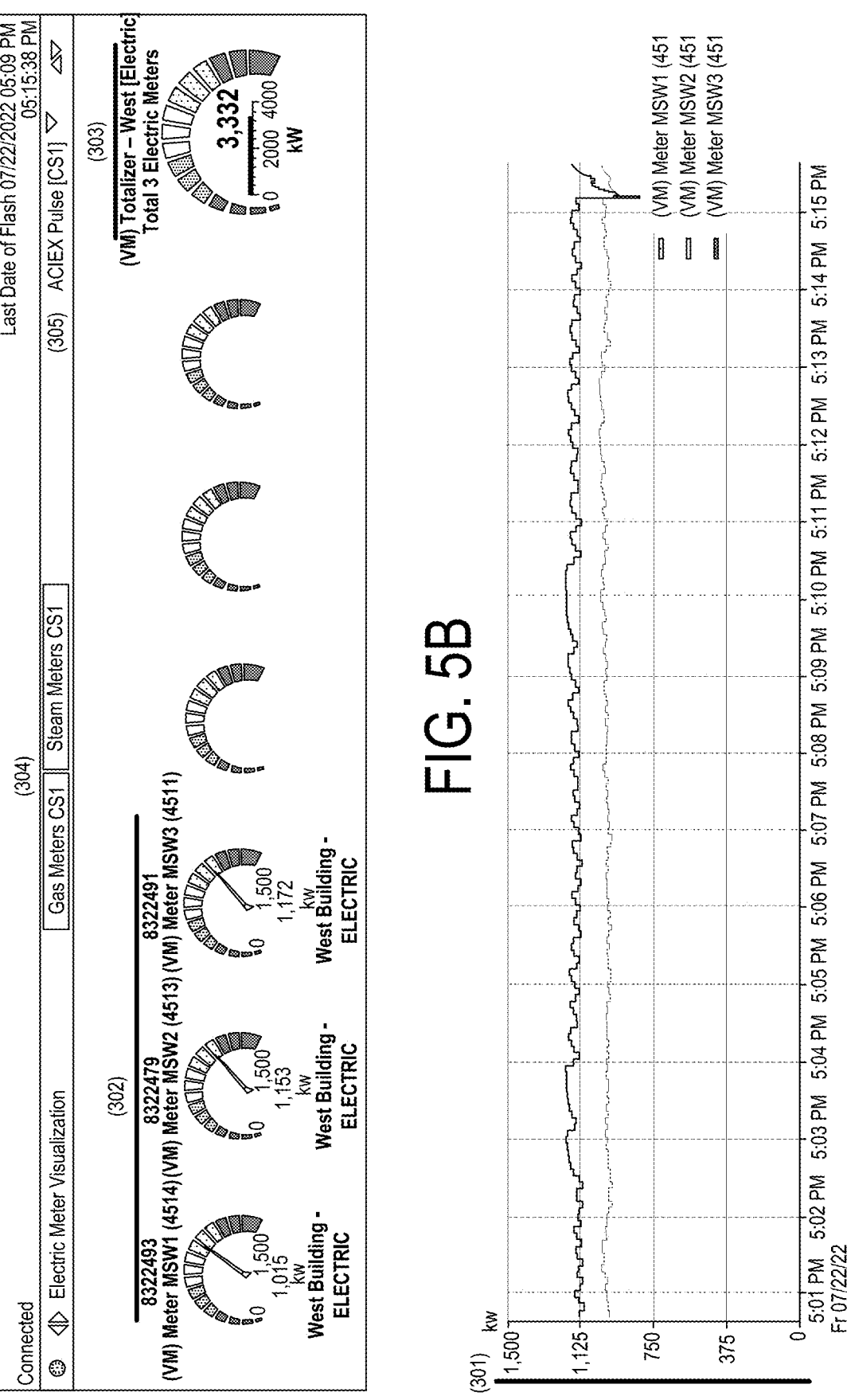
Figure 5D:
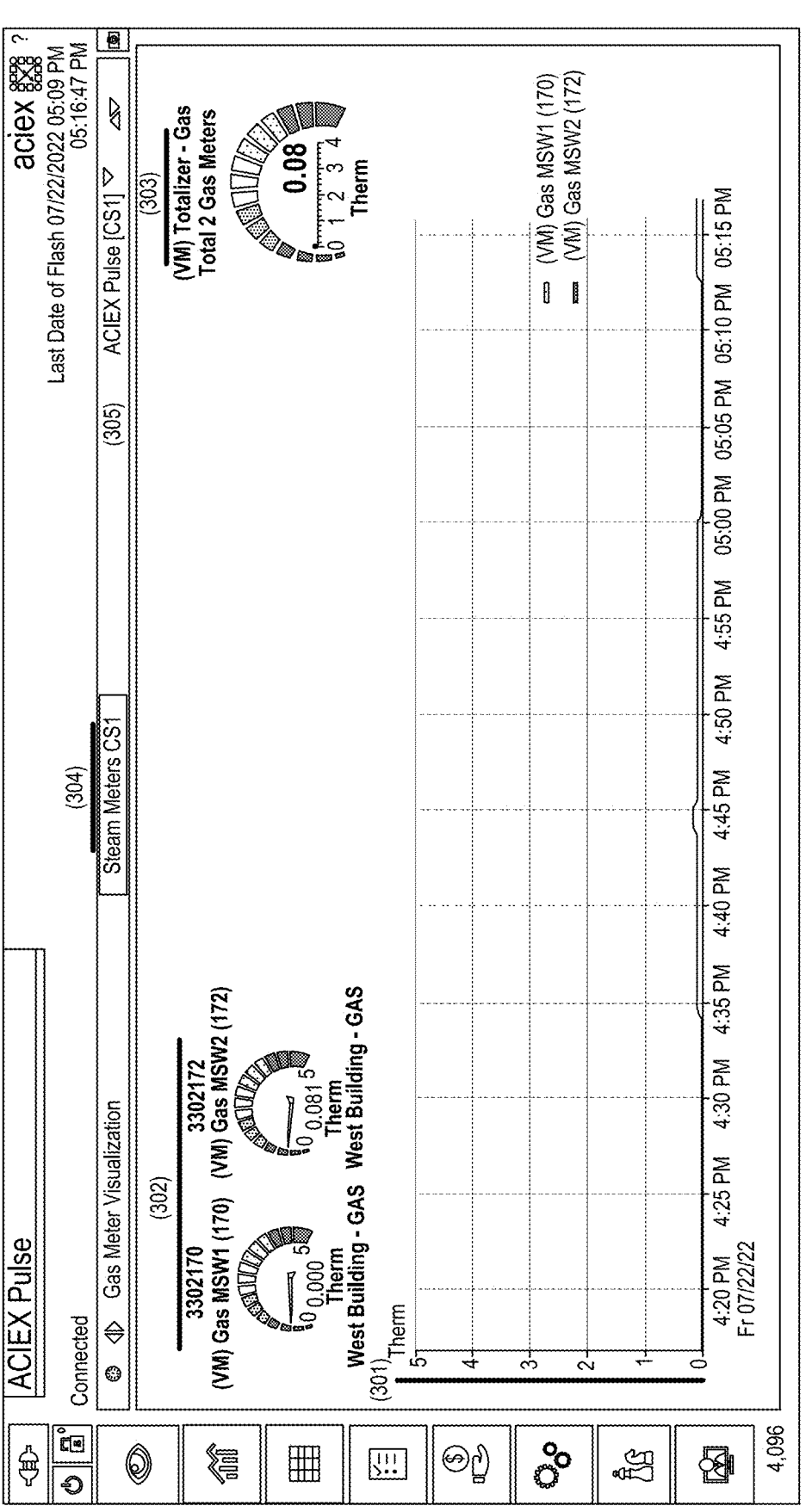
Figures 5E, 5F:
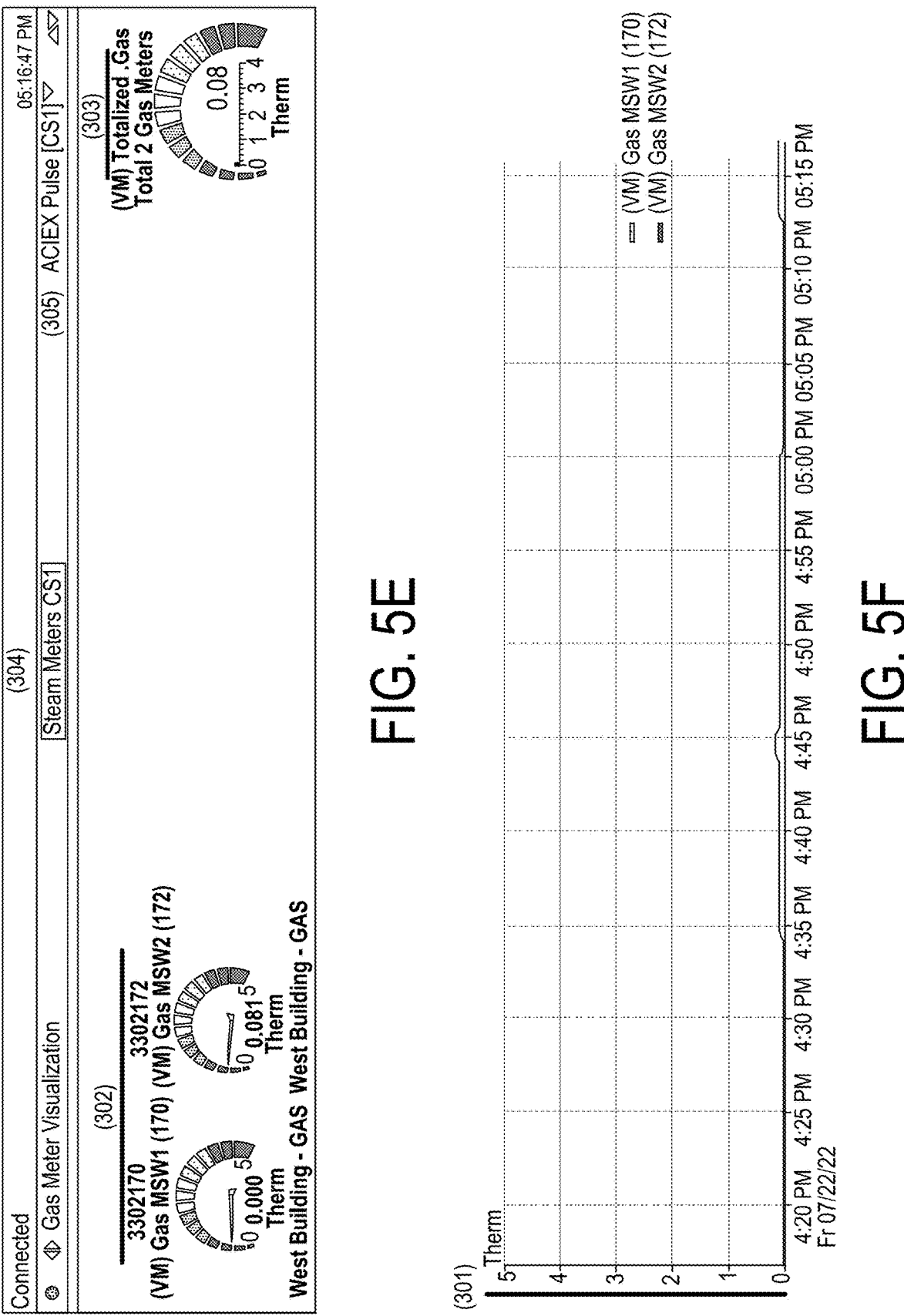

As shown in the parameterization flowchart of FIG. 4A and depicted in FIGS. 5A-5F, the illustrative method begins with an initial set-up that:

Define Use Group(s) (type of occupancy(s)) as outlined
Determine total Square Footage of Property
Connect all relevant meters, Electrical, Steam, Gas, and Water as shown in FIGS. 5D-5F.

In general, the primary goal of climate change policies enacted in various jurisdictions is decarbonization, the reduction of $CO_2$ emitted in the atmosphere. To achieve this goal through the implementation of the present invention, all sources of emissions must be accounted for and converted to a common unit, for example, metric tons of $CO_{2e}$—$CO_2$ equivalent, so that all $CO_2$ emissions may be quantified.

Figure 4B:
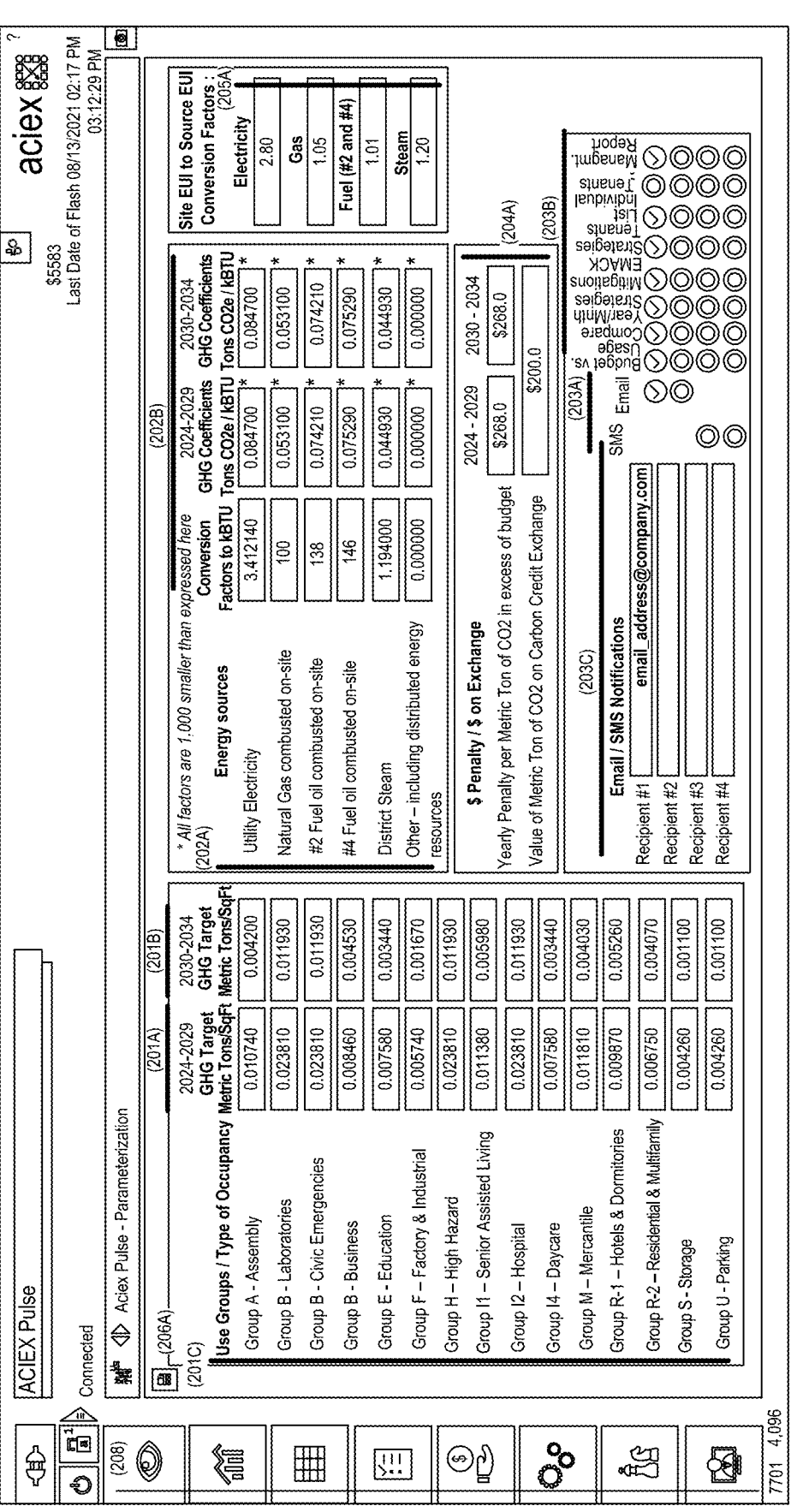
Figure 4D:
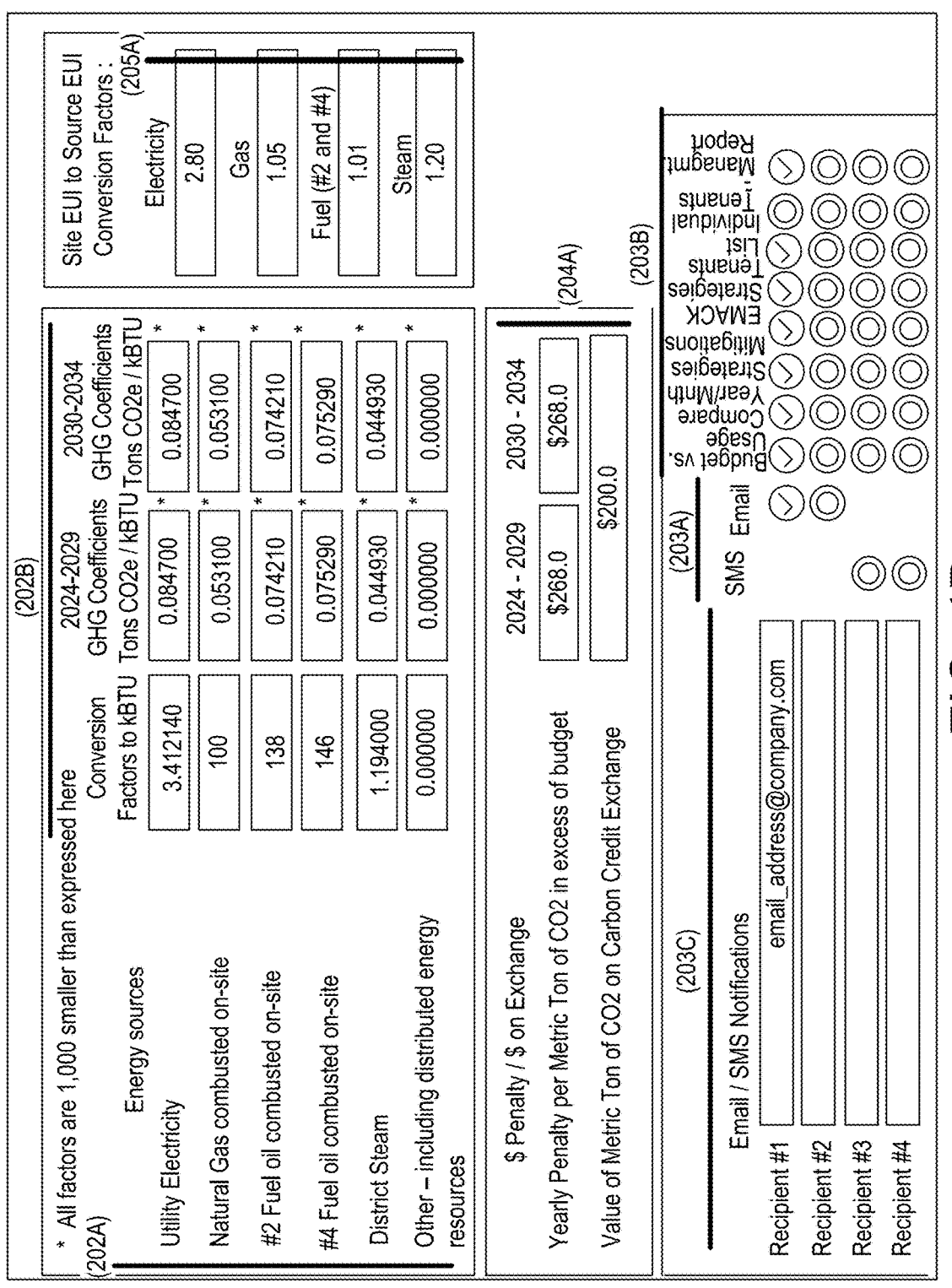

FIG. 4A is a flowchart of the process implemented by a parameterization algorithm which is used by the system to derive values of the various parameters being used in the process to calculate the $CO_2$ emission limits of a building. FIGS. 4B-4D are screenshots illustrating exemplary parameters that can be monitored, controlled and displayed based on the process performed in FIG. 4A consistent with various embodiments. The parameterization algorithm in step 200, as described herein, is integral to the implementation of the kWh Harvesting system and method. In step 201, the algorithm calculates the emission limits of a building based on the types of occupancy or use groups and greenhouse gas (GHG) target factors using respective GHG coefficients for each energy source, as shown in column 202B in FIGS. 4B and 4D. For example, in FIGS. 4B and 4D, for 2024-2029, the GHG coefficient is 0.084700 for the energy source of utility electricity; the GHG coefficient is 0.053100 for the energy source of natural gas; etc. In response, as illustrated in FIGS. 4B-4D, a processor may instruct a user's device to display a use groups/types of occupancy column 201C and the associated GHG target factors columns 201A and 201B.

In calculating the emission limits for a building, there are many factors that affect the total emissions. Indeed, calculating the emission limits of a building as well as the total actual emissions of that same building over time enables building owners and managers to assess the performance of the kWh harvesting strategy as well as other mitigating strategies that may be implemented. The present system collects and maintains data and aggregates the data of these various sets of factors which culminates into the reporting requirements.

Thus, the target factors can be time period sensitive. Using the user interface, the user can select a certain time period for the system to calculate the GHG target. For example, the greenhouse gas (GHG) targets can be managed using the methods and systems of the present invention such that they are assessed during specific time periods or during particular time periods based on certain conditions. In the example of FIGS. 4B-4D, a first GHG Target column 201A provides a list of numbers representing a list of GHG targets for each load set for the period of 2024 to 2029. A second GHG Target column 201B) provides a list of numbers representing a list of GHG targets for each load set for the period of 2030 to 2034.

While many embodiments in this disclosure relate to the types of occupancy, the target periods and their associated targets that were designed to comply with the law (Local Law 97) voted in New York City, the disclosed embodiments can be easily modified to accommodate other localities and jurisdictions. For example, other localities and jurisdictions may have different time periods, different user groups/types of occupancy and different factors.

In step 202, the system converts all sources of energy to the same unit, (e.g., Metric Tons of $CO_2$), so that the total energy consumption of a building may be calculated and compared to the total emission limits of the same building.

In response, the system compiles and lists in the energy source column 202A all of the exemplary sources of energy (in FIGS. 4B-4D) in a table, which can be updated to add additional sources, if necessary. To convert all sources of energy to the same unit as described above in step 202 and to satisfy reporting requirements, the system can perform both the conversion from the original unit of the source of energy to kBTU, and then from kBTU to Metric Tons of CO2e using respective conversion factors for each energy source. For example, as shown in column 202B in FIGS. 4B and 4D, for the energy source of utility electricity, the conversion factor is 3.412140; for the energy source of natural gas, the conversion factor is 100; etc. The results of the conversions in step 202 can be displayed in conversion unit column 202B as shown in FIGS. 4B and 4D.

In step 203, the system can be used by a user to set up email notifications. The notifications may include the recipient's information such as displayed in email address column 203C, and communication method 203A. Various types of reports and information can be compiled and reported to various recipients by selecting the item(s) in the reporting column 203B. For example, a management report at the end of the year which summarizes the status of the building with supporting data, can be communicated to one or more recipients.

In step 204, to provide a strong incentive for building owners and managers to comply with the locality or jurisdiction's law, the system can calculate the yearly penalties that will be assessed when the $CO_2$ emissions of the building exceeds the calculated limits based upon the use group(s) and square footage of the building. In response, the system displays the penalty amount in the $ penalty/$ on exchange section 204A.

In the example in FIGS. 4B-4D of the City of New York, penalties will be assessed at $268 per Metric Tons of $CO_2$ in excess of the building's calculated limits. Although the penalty per Metric Tons of $CO_2$ for the period running from 2030 thru 2034 may be even higher, the example shown uses the same value.

In step 204, the system can be further configured to operate with existing systems and also future systems to set up an exchange for "carbon credits" (displayed in section 204A in FIGS. 4B-4D). The example in section 204A illustrates the financial benefit that a $CO_2$ emissions surplus might provide. The trading of carbon credits that can be facilitated through the use of the system enables the practice of buying and selling permits and credits that allow the permit holder to emit carbon dioxide.

It is known to one skilled in the art that other localities and jurisdictions may decide to configure their systems to have different schedules, penalty levels and whether an carbon credit exchange will be created. The software of the present invention is flexible enough to accommodate all modifications and changes.

In step 205, in addition to the above conversion factors, the system can also perform the conversion from Site EUI (Energy Use Intensity) to Source EUI and display the resulting conversions in the Site EUI to Source EUI section 205A to provide a more complete assessment of the energy efficiency of a building similar to the Energy Star program. As defined on the Energy Star web site, the term "site energy" means the amount of heat and electricity consumed by a building as reflected in utility bills. The term "source energy" means the most equitable unit of evaluation for comparing different buildings to each other. Source energy represents the total amount of raw fuel that is required to operate the building. It incorporates all transmission, delivery, and production losses.

In step 206, the system displays, as shown on the screen in FIGS. 4B-4D, a SAVE button 206A that allows the user to initiate the system to save all the data entries to a local computer and/or the industrial controller. In addition, an exemplary vertical menu on the left (referenced as 208) is depicted to show examples of visual cues for some categories of actions that can be available on each of the submenus. In step 207, the subprocess ends.

Figure 5G:
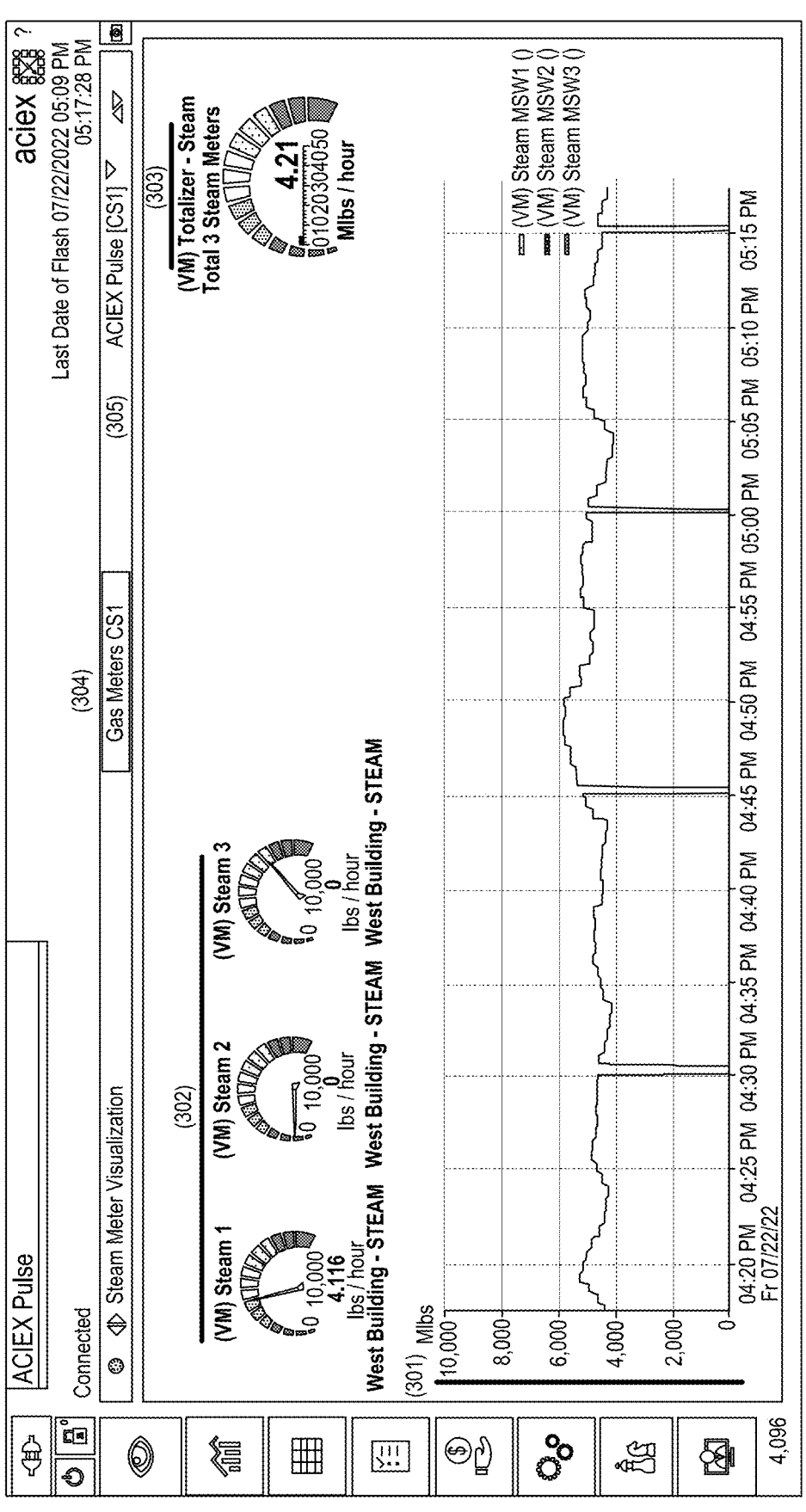
Figures 5H, 5I:
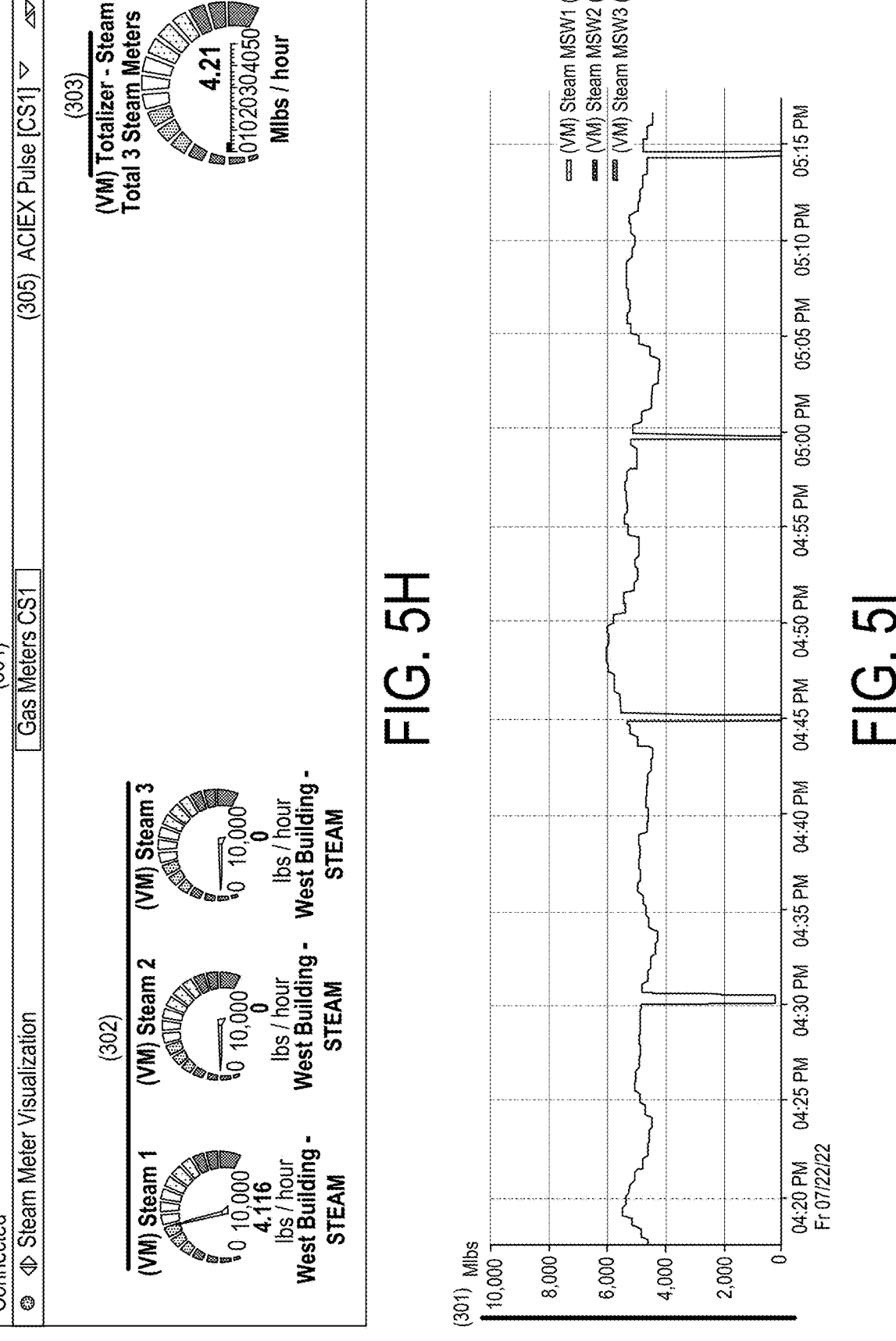

FIGS. 5A-5I are exemplary screenshots showing meter data displayed on a screen to enable a user to visualize—in real-time—all the meters for all the sources of energy for all the utility accounts in the building as wells as their totalized values to provide a visual cue for the readings of the meters. The user can elect to see the resulting comparison in either graphical or numerical data form, can select a number of different meters to compare side-by-side simultaneously, can compare the results over a number of selected years, and can compare the results to either the building average or the industry average. FIGS. 5A-5C illustrate exemplary screenshots of an electric meter. FIGS. 5D-5F illustrate exemplary screenshots of a gas meter. FIGS. 5G-5I illustrate exemplary screenshots of a steam meter.

In FIGS. 5A-5L, the meter data can be displayed on the screen in a graph 301 or through a depiction of a gauge 302, such as a meter, a pie chart, a progression bar, or any other representation of a percentage of progress that may represent energy usage. In FIG. 5A-5I, the graphs 301 show all the individual meters for each of the sources of energy utilized in the building. The representation in graph form 301 depict all the meters along with their location, and other particular information such as the meter number if available. The graph 301 enable the users to quickly pinpoint abnormal behavior as well as malfunctioning meters.

The total value of all the meters in the account can be shown in a totalizer section 303.

If the building is comprised of more than one utility accounts, an account button 305 can allow the user to switch to another account.

In addition, if a specific building also uses gas meters and/or steam meters, a building meter button 304 can be provided for the user to switch between the different types of meters for a specific building.

Figure 5J:
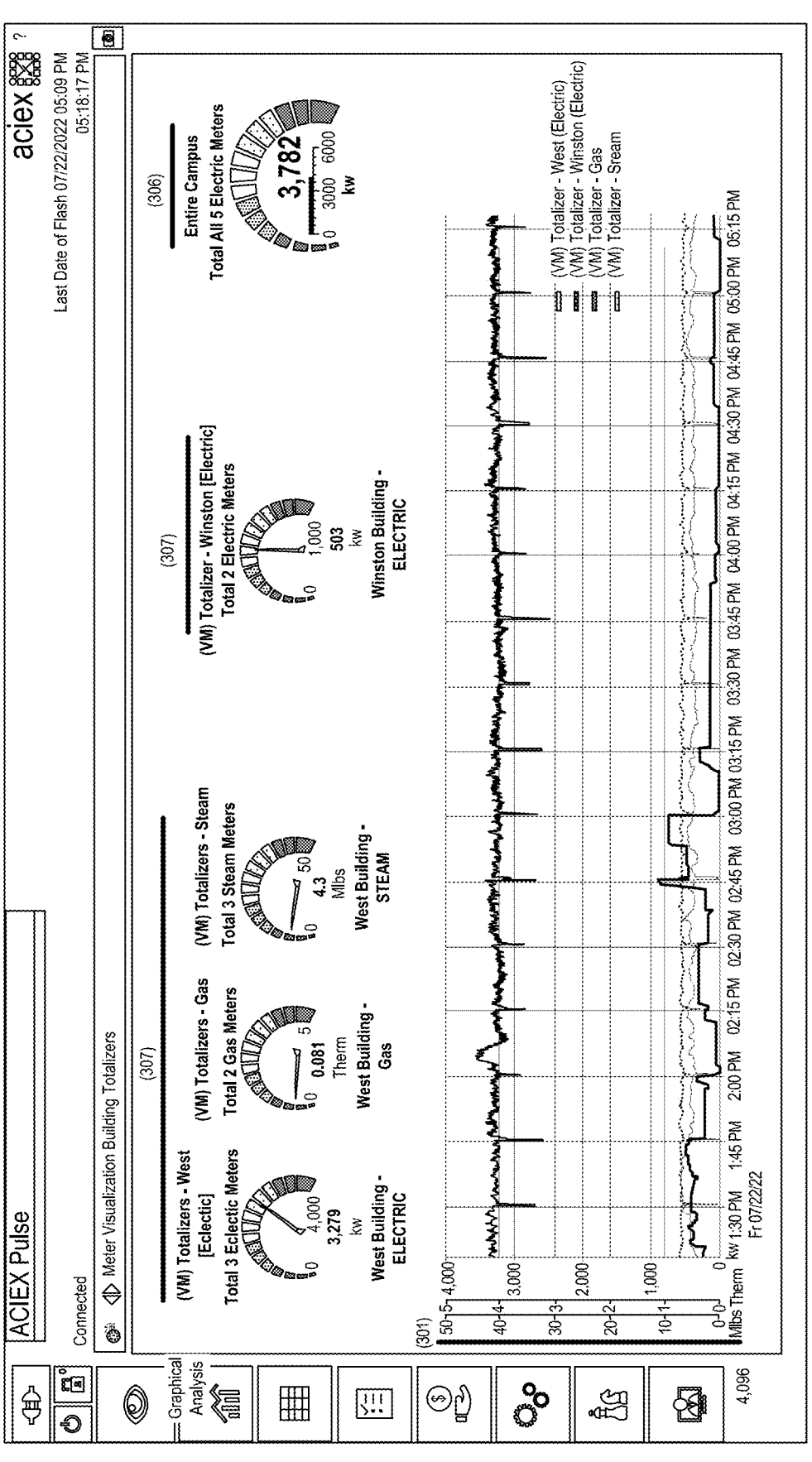
Figure 5K:
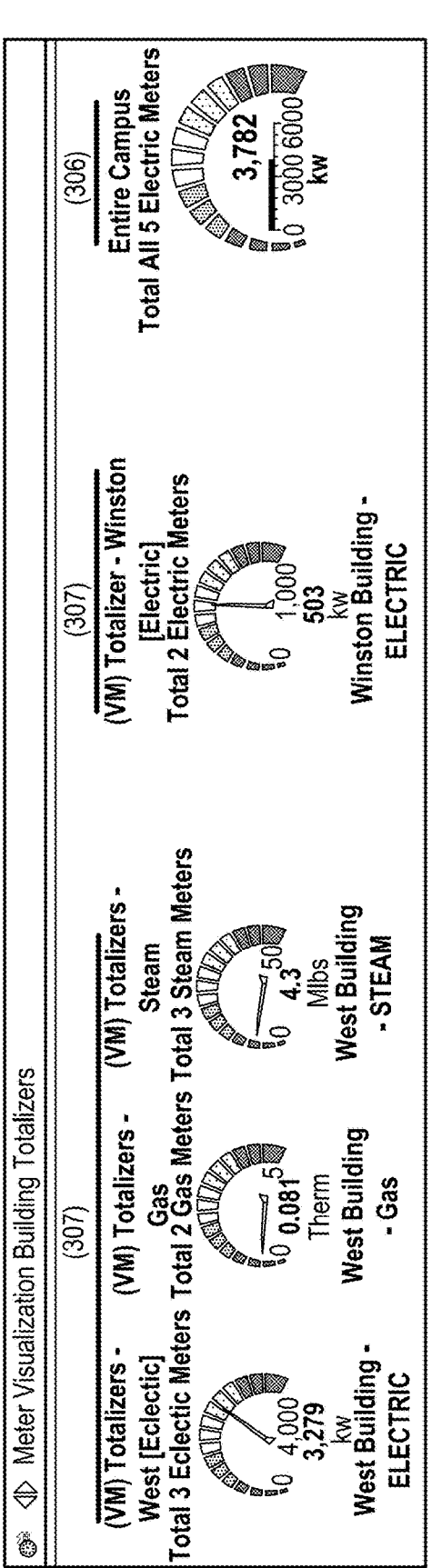
Figure 5L:
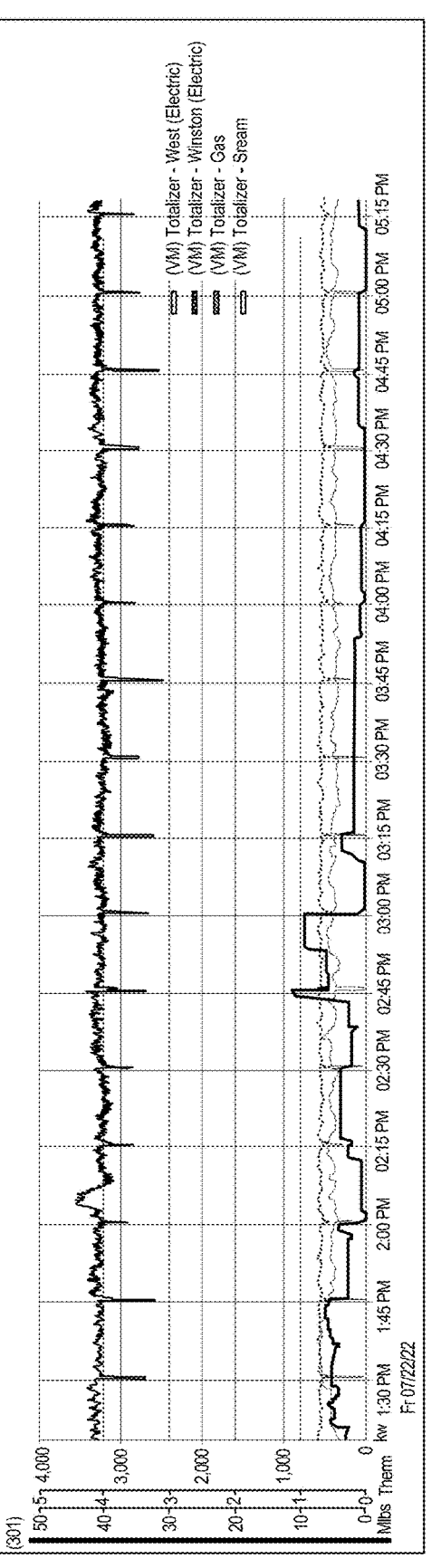

FIGS. 5J-5L are screenshots of an example summary of all the meters for all the sources of energy for all the utility accounts. The summary data can provide to the user a comprehensive view of a building's energy instant demand by accounts and energy sources.

Following the same format in FIGS. 5A-5I, totalizer sections 307 by energy sources and by accounts can be provided as well as a totalizer for the campus-wide electric instant demand. Through the use of the data collected at the WAGO module, a demand response submodule can be configured to reduce carbon emissions, optimize resource usage and/or calculate the monetary cost of the resource usage and potential cost reduction such resource usage in response to satisfy the demand of the facility.

The demand response submodule can provide a response to input data received from sensor inputs, such as carbon dioxide levels, curtailment signals, temperature, occupancy sensors, humidity levels, air quality sensors, electrical use, thermal measurements, pricing information and the like. The demand response submodule can be configured to communicate with the kWh harvesting algorithm to activate or deactivate building equipment, implement or change control strategies, or change setpoints.

The demand response submodule can use models to determine an optimal carbon emission reduction strategy. The demand response submodule can further include a policy definition module component that allows system administrators to define system operating policies to be implemented according to, for example, jurisdictional regulation requirements, such as carbon emission laws and policies. In particular, the policy definition module allows the administrators to create new operating policies, modify already existing operating policies, e.g., modifying, adding, deleting operating rules, delete operating policies, define conditions in which specific operating policies has to be actuated in order to be in compliance with the specific jurisdictional regulation requirements. The system administrators may for example access the policy definition module and perform the above actions remotely, via a web interface, exploiting one of the known web browsers. The policy definition module is capable of translating the operating policies entered by the administrators into a format specific and supported by the desired targets.

Referring now to FIGS. 6A-6E, a flowchart of a process for calculating the emissions limit in metric tons of $CO_2$ vs. $CO_2$ tonnage emissions is shown and illustrated in the screenshots of FIGS. 7A-7M. Once the types of occupancy and their associated square footage are entered, the emissions limit in metric tons of $CO_2$ is calculated, displayed and aggregated.

Each source of energy is collected separately in real-time and the emission tonnage converted to kBTU and then to metric tons of $CO_2$.

An emissions limit higher than the actual tonnage emissions result in a surplus which may be monetized on a future carbon credit exchange or used for another building in the owner's portfolio if that building experiences a deficit.

An emissions limit lower than the actual tonnage emissions results in a deficit. The relevant area of the summary panel will turn red and show both the calculated $CO_2$ deficit and its corresponding monetary penalty, for example, at $268 per metric ton of $CO_2$ in excess.

Through these calculations the software enables the user to monitor the actual $CO_2$ tonnage emissions in real-time year-to-date. It also offers the capability to extrapolate and forecast the $CO_2$ tonnage emissions for the entire year.

The software can use the actual date data or data for a range of dates.

Calculations:

As illustrated in FIGS. 7A-7F, the forecasting of the $CO_2$ tonnage emissions is achieved in several steps:

First, a ratio is calculated between the actual data of the current year and the equivalent period for the previous year. This calculation is performed for each source of energy.

Second, the software looks at the archives and calculates the energy consumption for the balance of the previous year for each source of energy.

Third, the ratio calculated in step 1 is applied to the energy consumption calculated in step 2. This action is performed for each source of energy used.

Fourth, the extrapolated energy consumption for the balance of the year is added to the actual data year-to-date to provide an estimated year-end energy consumption. This action is performed for each source of energy used.

Finally, the calculated values are converted to metric tons of $CO_2$ and aggregated together. The resulting totals are compared to the emissions limit as before.

Figure 6A:
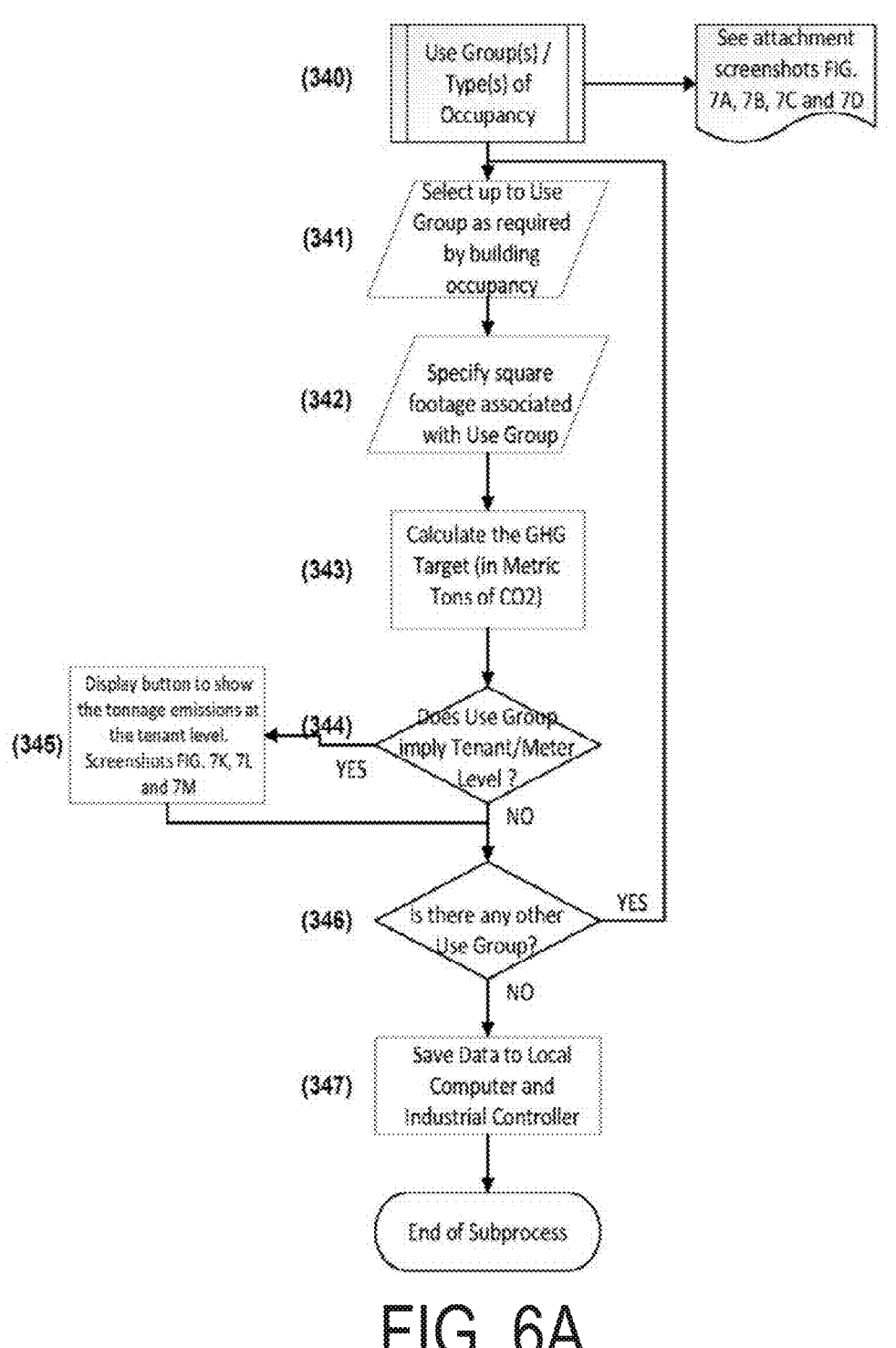

Specifically, in FIG. 6A is a flowchart that provides details of the building's use group can be setup by the user Once all the use groups (i.e., types of occupancy) and associated factors are entered into the system and set for the target locality and jurisdiction. As shown in FIG. 6A, in step 340, the building's use group can be setup by the user entering the information via a user interface into the Use Groups column 341A (shown in a screenshot of FIGS. 7A-7D) such that the system can track the building's energy consumption in real-time.

In step 341, for example, by selecting the screen in FIGS. 7A-7D, the user may enter the types of business or businesses are hosted so that the system may derive the associated use groups. The types of businesses can then be selected from a dropdown menu button. In step 342, the user may enter the corresponding gross square footage of each of the individual use groups into Square Footage column 342A.

When a use group is selected from the dropdown menu and its associated square footage entered into the system by the user, in step 343, the software automatically calculates the amount of $CO_2$ that the business or businesses associated with the use group is or are allowed to emit and enters the calculated results into the GHG Target columns 343A.

In step 344, if the use group selected has multiple tenants such as a commercial building or a multi-residential building, then the process advances to FIGS. 7K-7M and a Show Tenants Detail button 345A will be displayed on the right part of the screen as a dropdown menu next to the "Utility Electricity" energy source column (which will be discussed in further details with regards to FIG. 6E and Screenshots FIGS. 7K-7M.

Referring back to FIG. 6A, in step 346, if the building hosts businesses in more than one use group, the user can enter all the use groups by selecting each from the dropdown menus and their associated gross square footage indicated in the corresponding entry field 342A.

After all the use groups are selected and their square footage entered into the software, in step 347, the process saves the selections information to the local computer (management PC) and transferred to the industrial computer.

In As previously discussed, FIGS. 1, 2A and 2B explains the importance of connecting to most, preferably, all the energy sources and their associated meters 108. FIGS. 7A-7D provide a detail illustration for the user to observe the results, in real-time, of those connections.

Figure 6B:
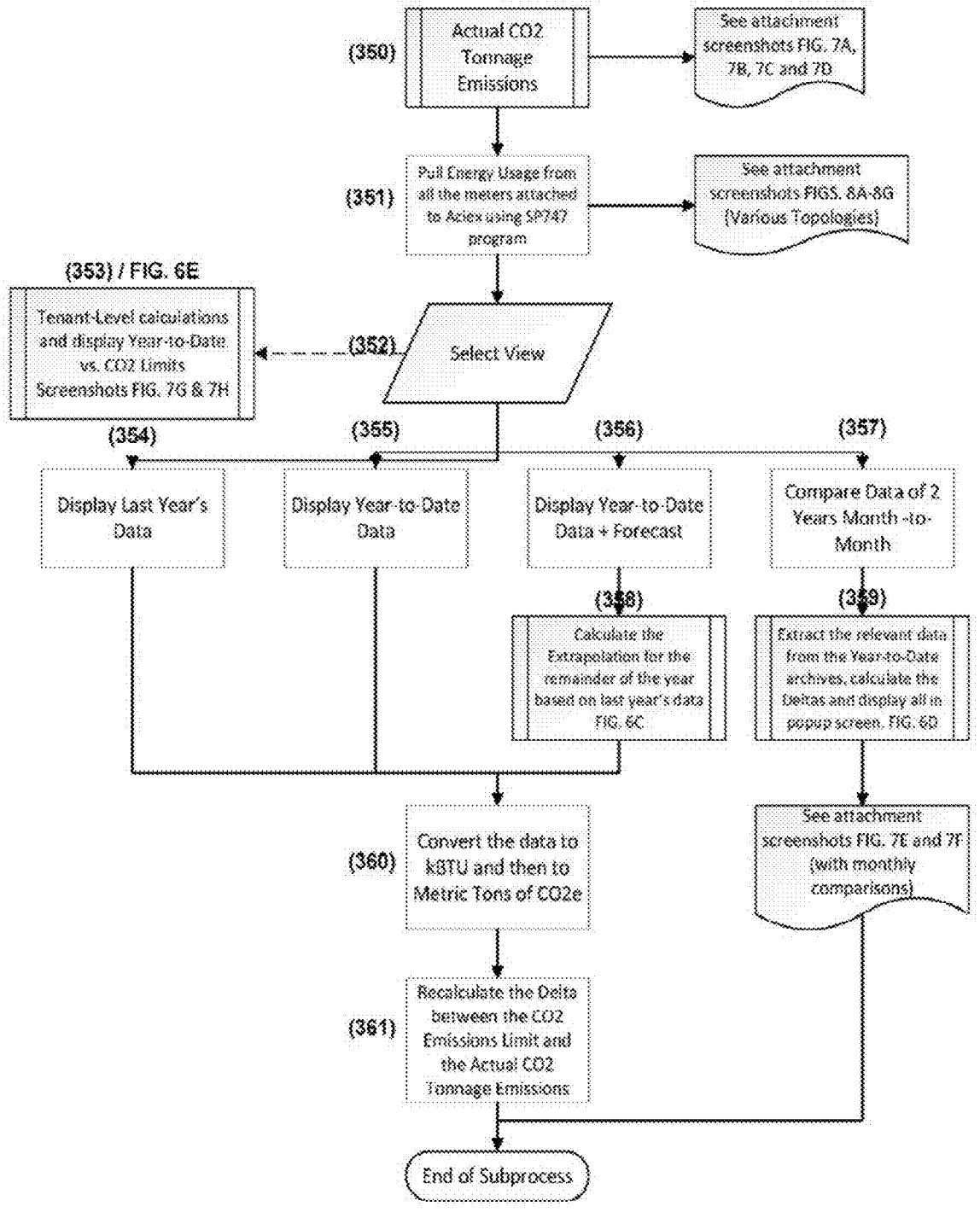

FIG. 6B is a flowchart that provides details various options available to the user to display the energy consumption by energy sources. In step 350, the process provides the calculations that enables the user to monitor the actual $CO_2$ tonnage emissions. In step 351, data regarding energy usage from all the meters is entered input into a special computer program (SP-747) (351) running on the master controller in the main industrial panel. This computer program can be configured to be responsible, for example, for keeping track of the various energy sources and for accumulating the results, year-to-date, for extrapolating the year-to-date with forecast reading using last year data, and for extracting last year totals from the archives.

In step 352, using a navigation button the user may select from various screen view options. FIGS. 7A-7D show an example of a default view displaying the Year-to-Date energy consumption by energy sources.

Once the default view is displayed, the user is presented, for example, with four or five views to select from in step 352 as screen view options 352A shown in FIGS. 7A-7D.

A. In step 354: display a summary of last year's energy consumption by energy sources field 354A.
B. In step 355: the Default view of the energy consumption year-to-date field 355A.
C. In step 356: the view extending the year-to-date data with a projection of the energy consumption by energy sources to the end of the year field 356A. This option will be discussed further with regards to FIG. 6C which explains how the forecast for the remainder of the year will be extrapolated using not only actual data from January $1^{st}$ until the current date but also last year's data from the current date until the end of the year (step 358).
D. In step 357: The user also has the option to compare the year-to-date energy consumption month-by-month with the previous year or any other available year of historical data available as shown in field 357A. This option in step 359 will be discussed further with regards to FIG. 6D and shown in screenshots FIGS.

7E-7F where the data is extracted from a special archive named Daily Year-to-Date, and summarized by months for each of the two years being compared. Once this is done, a delta is calculated, both in absolute values and in percentages, for each of the months; finally, the resulting data is displayed on a special pop-up panel.
E. In step 353: The system can be configured such that this option is only available if one of the use groups selected in FIG. 6A includes Business and/or Multi-Residential. This option allows the user to display the energy consumption at the tenant level. It is particularly relevant to the entire kWh harvesting strategy, as it enables building owners and managers to identify tenants who would be the principal beneficiaries of the strategy. This option will be further discussed in FIG. 6E and displayed in screenshots FIG. 7G-7H.

In step 360, whenever the user selects the option of step 354, step 355 or step 356, the resulting energy consumption of each of the used energy sources is first converted to kBTUs and then to Metric Tons of $CO_2e$ before being displayed on the screen (FIGS. 7A-7D).

Finally, in step 361, the delta between the CO2 emissions limits and the actual CO2e tonnage is recalculated for both periods of reference in the example of the NYC jurisdiction field 361A. If the result is a deficit for either period, the calculated deficit is multiplied by the proposed penalty per metric ton of CO2e and the result clearly indicated as a penalty. If, however, the delta is a surplus, it is multiplied by the placeholder value to show a potential value on a future Carbon Credit Exchange.

One of the many functions that the software provides is the capability to extrapolate the energy consumption for each of the energy sources to the end of the year.

This extrapolation calculation is predicated upon having historical data for the prior year for each of the meters that are included and that system is actively monitoring.

The system is capable of providing mid-year extrapolation calculations. At the mid-point of the current calendar year and last year's data is available, is the system can perform the important mid-year extrapolation calculations to determine the current energy consumption of the entire building and extrapolate an end of the year energy consumption. Such granular analysis enables the building manager to enact aggressive countermeasures in advance to mitigate any potential financial liability at the end of the year. This is one of the important features of the kWh Harvesting strategy because it provides an unobtrusive methodology to reduce energy consumption distributed over all the air handling units (AHUs) managed by the system.

Granted, in some situations, there may be drastic changes in the topology of the HVAC plant from one year to the next. In such a situation, the system is capable of adapting to such changes. For instance, the building manager most likely will be well aware of those changes and can enter the changed configurations such that the system can adjust the forecast accordingly. Thus, the ability to forecast end-of-year energy consumption by energy sources is important and cannot be discounted.

Referring to FIG. 6C is a flowchart that provides details of the process in step 370 which calculates the extrapolation for the remainder of the year based on last year's data.

In step 371, using, for example, the special computer program SP-747 the system analyzes the year-to-date energy consumption for each of the meters across all sources of energy.

In step 372, last year's archives which stores the energy consumptions data are read in the computer program and, in response, a total "year-to-date" is calculated for each of the meters for each of the energy sources. In step 373, a ratio is calculated 373 between last year's Year-to-Date energy usage and this year's Year-to-Date energy usage for each of the meters/sources of energy.

Next in step 374, the ratio of step 373 is applied to last year's data for the balance of the year for each of the meters to generate a forecast for each meter and source of energy.

Last, in step 375, the extrapolated data is added to the year-to-date data for each source of energy to generate a yearly forecast.

FIG. 6D is a flowchart of the process of comparing energy data month-to-month Having access to the calculation results of the energy consumption of one's building year-to-date and year-to-date with forecast is important but without context provides only a truncated view of the dynamics of the building. Indeed, years are different due to the weather or other external circumstances such as COVID. The energy consumption of the building may also vary month to month besides year to year. Indeed, a building must be heated in winter and cooled in the summer. Different pieces of machinery are used with different power consumption.

In step 380, a sub-algorithm compares the energy consumption of the building month to month and also with other years for which the monthly data is available. The results may be seen on screenshots FIGS. 7E-7F.

In step 381, the sub-algorithm relies on special program SP-747 to pull the year-to-date energy usage from all the meters monitored by the system. The energy usage is then summarized by months.

In step 382, the sub-algorithm pulls the complete energy usage and summarizes it by month for the selected year to compare. Initially, year-to-date data of the current year field 382A will be compared with the previous year's data field 382B.

Once the data is extracted, in step 383, the sub-algorithm calculates the month-to-month differences in values and percentages.

Figure 7A:
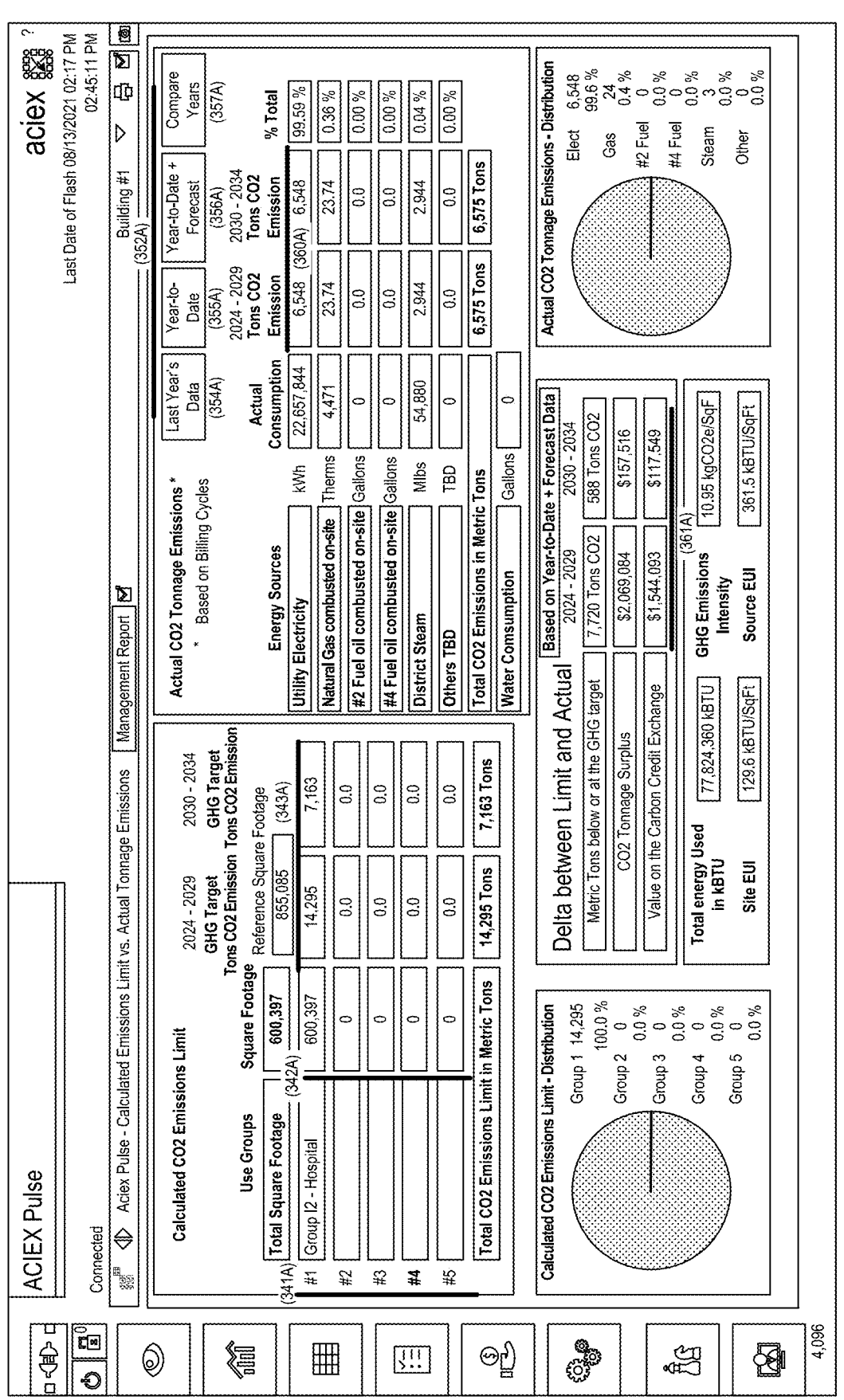
Figure 7D:
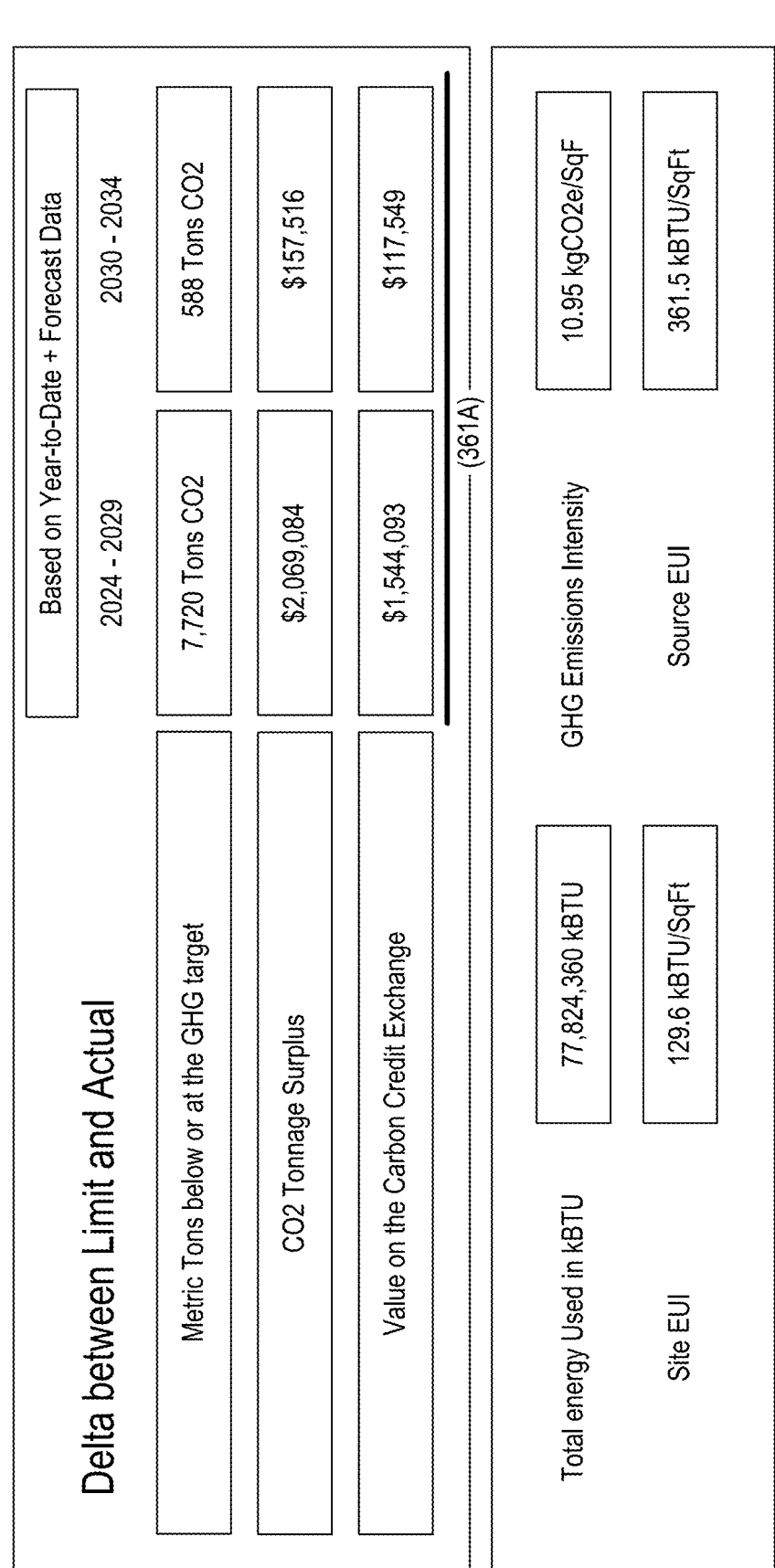
Figure 7E:
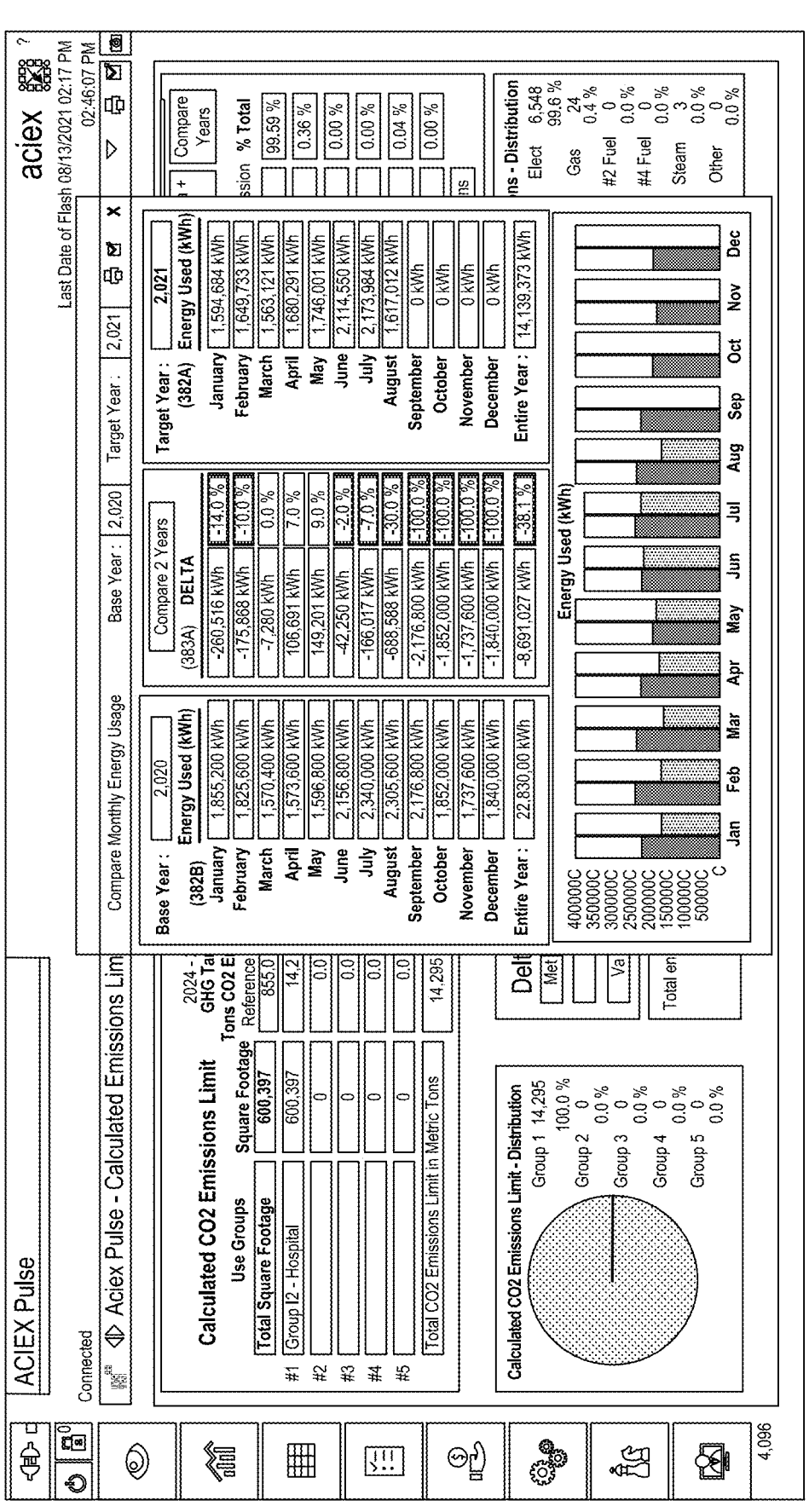
Figure 7F:
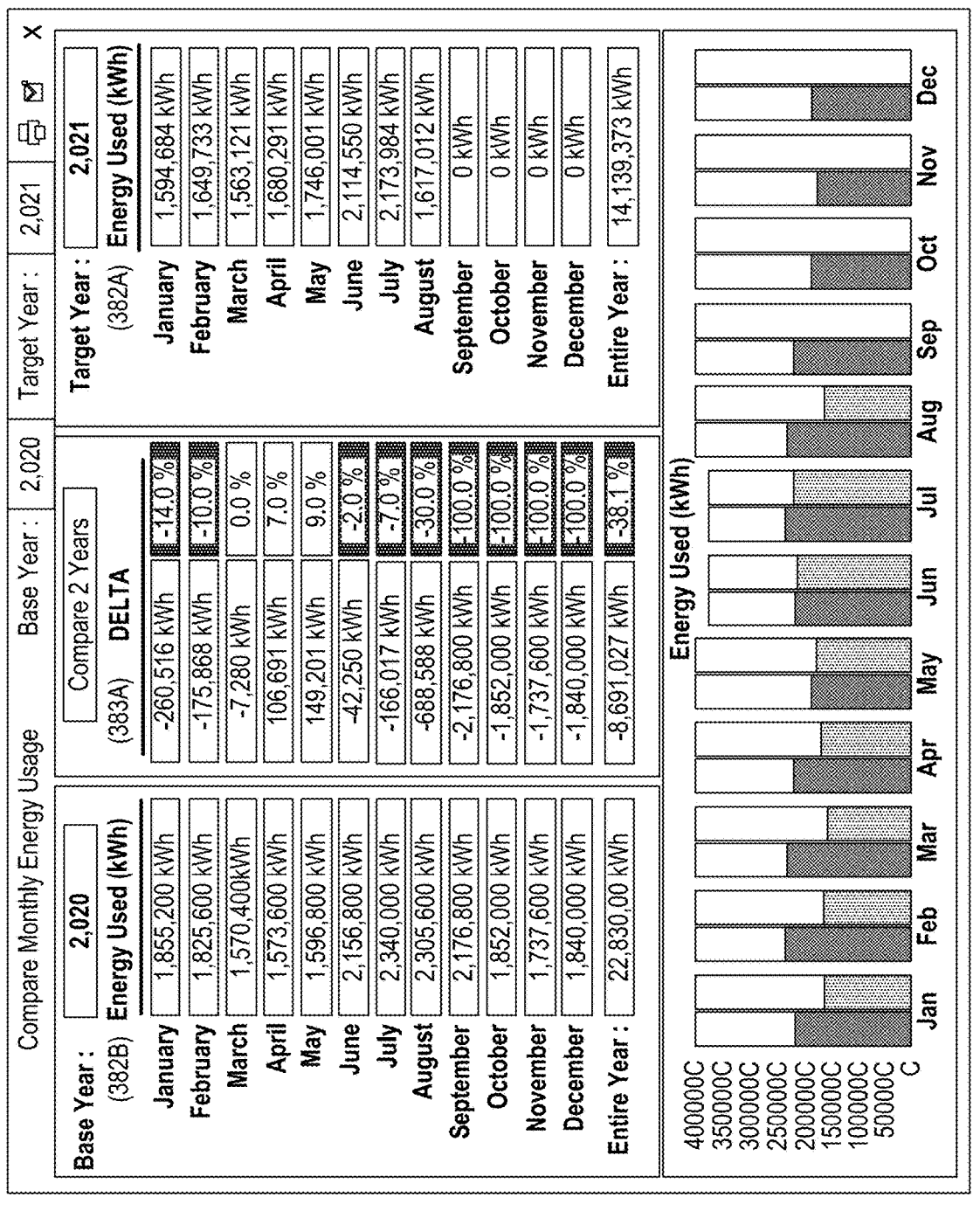

Finally, in step 384, all the results are displayed on a pop-up panel along with a graph, as shown in FIGS. 7E-7F.

Thus, the system provides the user then with the capability to compare any years for which historical data stored is in the system. This enables the user to analyze the evolution of the energy consumption month over month and year over year.

FIG. 6E is a flowchart of a process for determining the energy consumption for multi-tenants. Indeed, while a tenant in a multi-occupancy building may be directly responsible to the utility company for their energy demand and consumption, the building owner is still responsible for the entire envelop, meaning for the overall energy consumption of the entire building. From such a dichotomy in responsibilities, there may arise such a scenario where one or several tenants, residential or business, types are causing the building owner a financial penalty due to their outsized energy consumption.

To help building owners mitigate such situations, in step 390, the algorithm of the present invention can be used to handle as identified in multi-tenancy in business and multi-residential buildings.

Figure 7G:
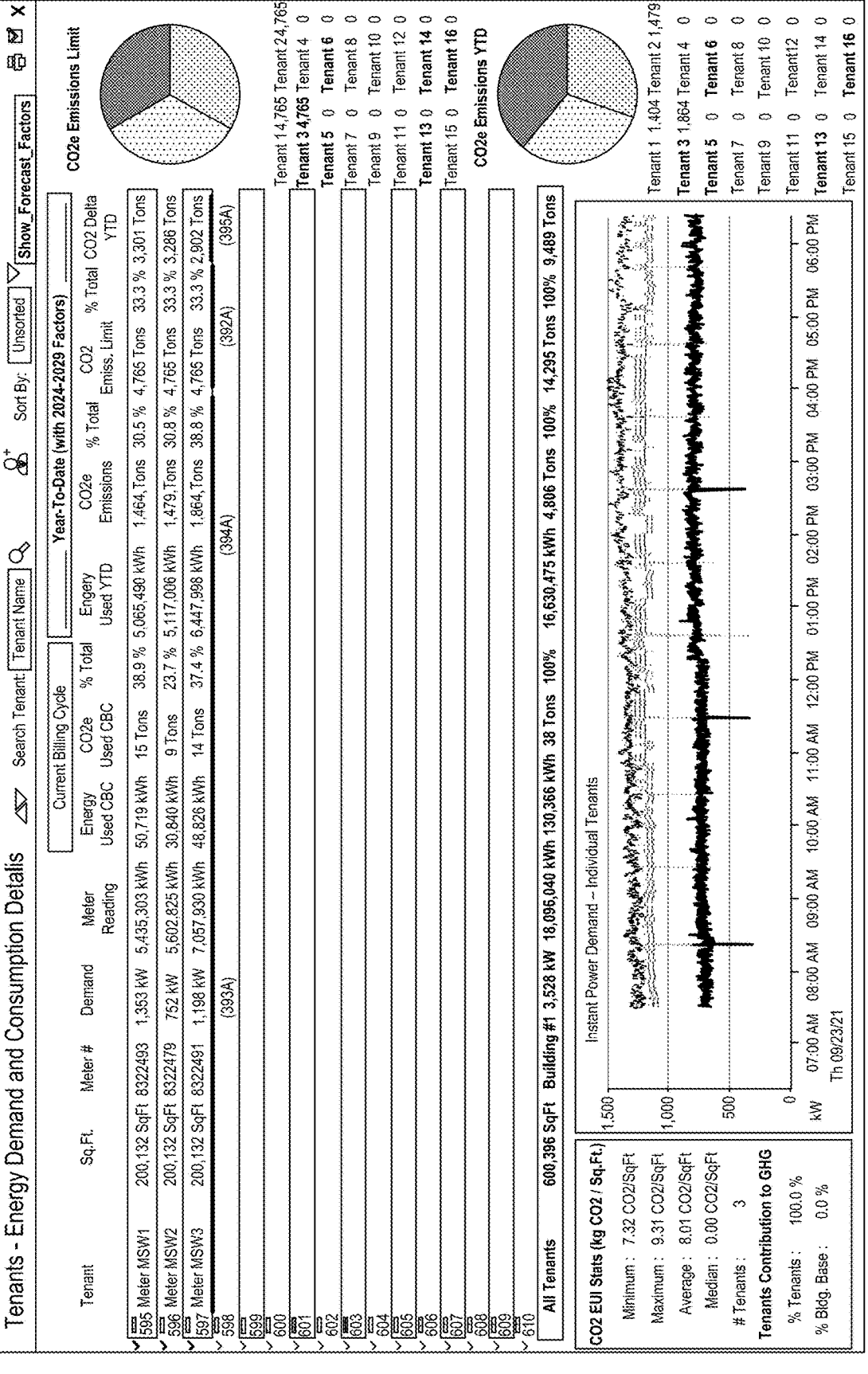
Figure 7J:
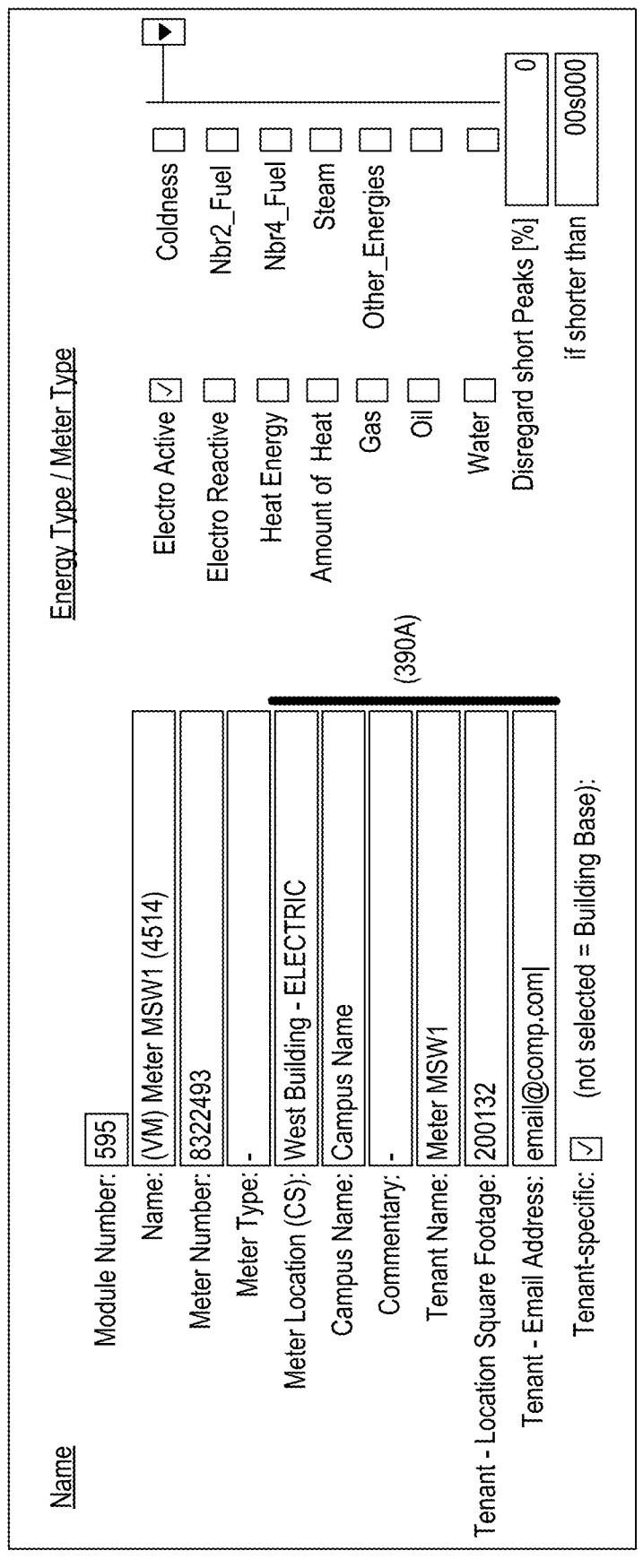
Figure 7K:
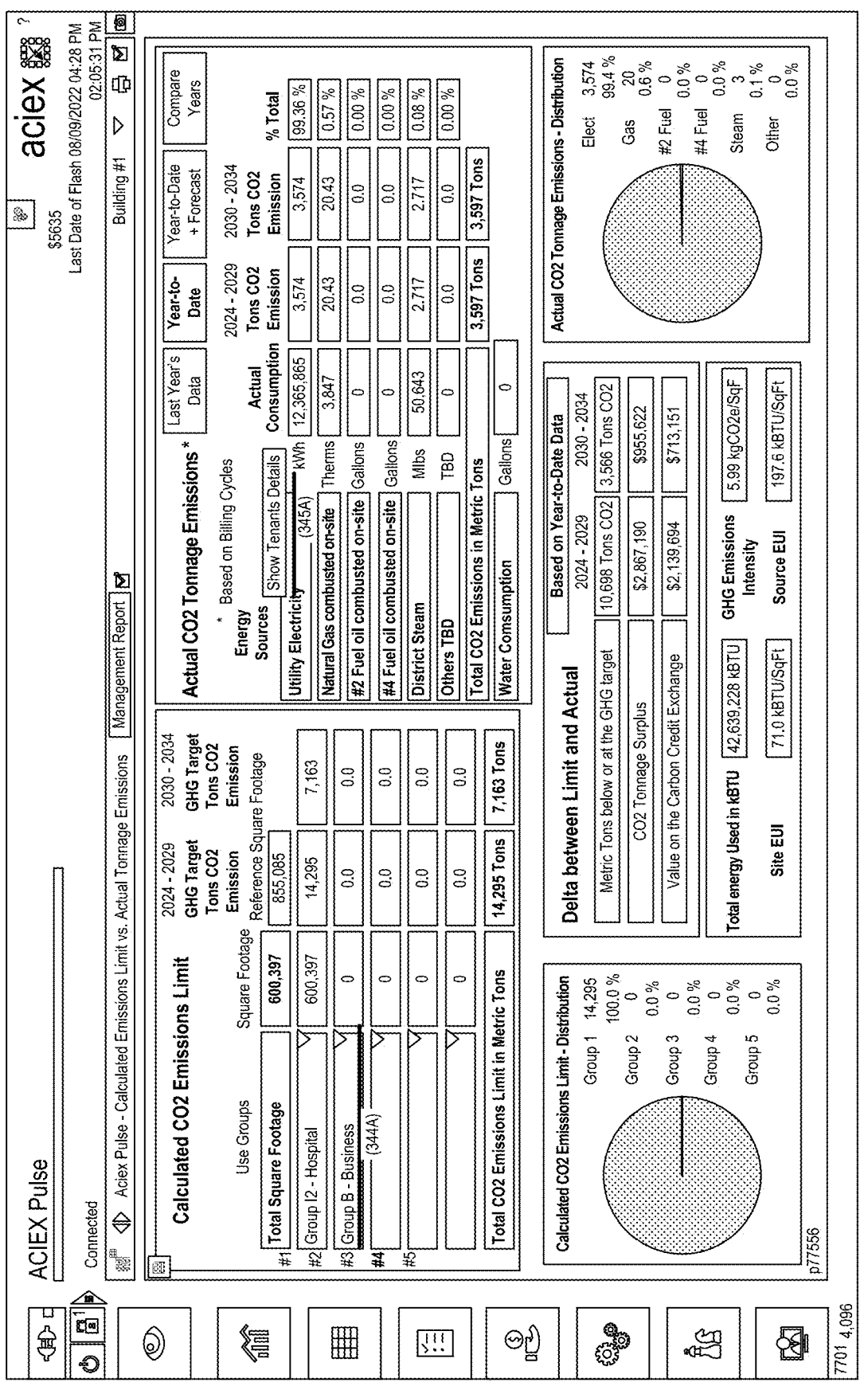
Figure 7L:
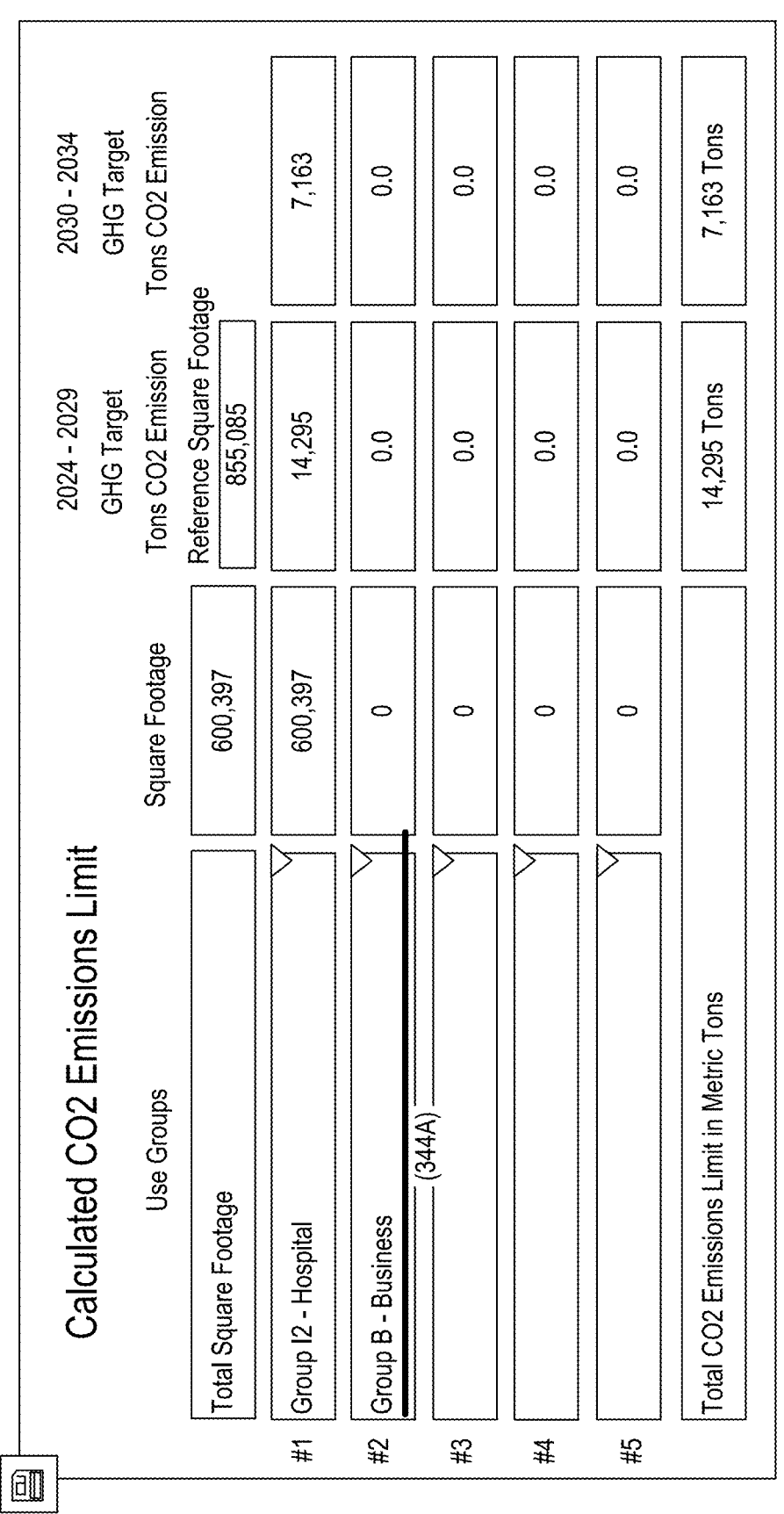
Figure 8A:
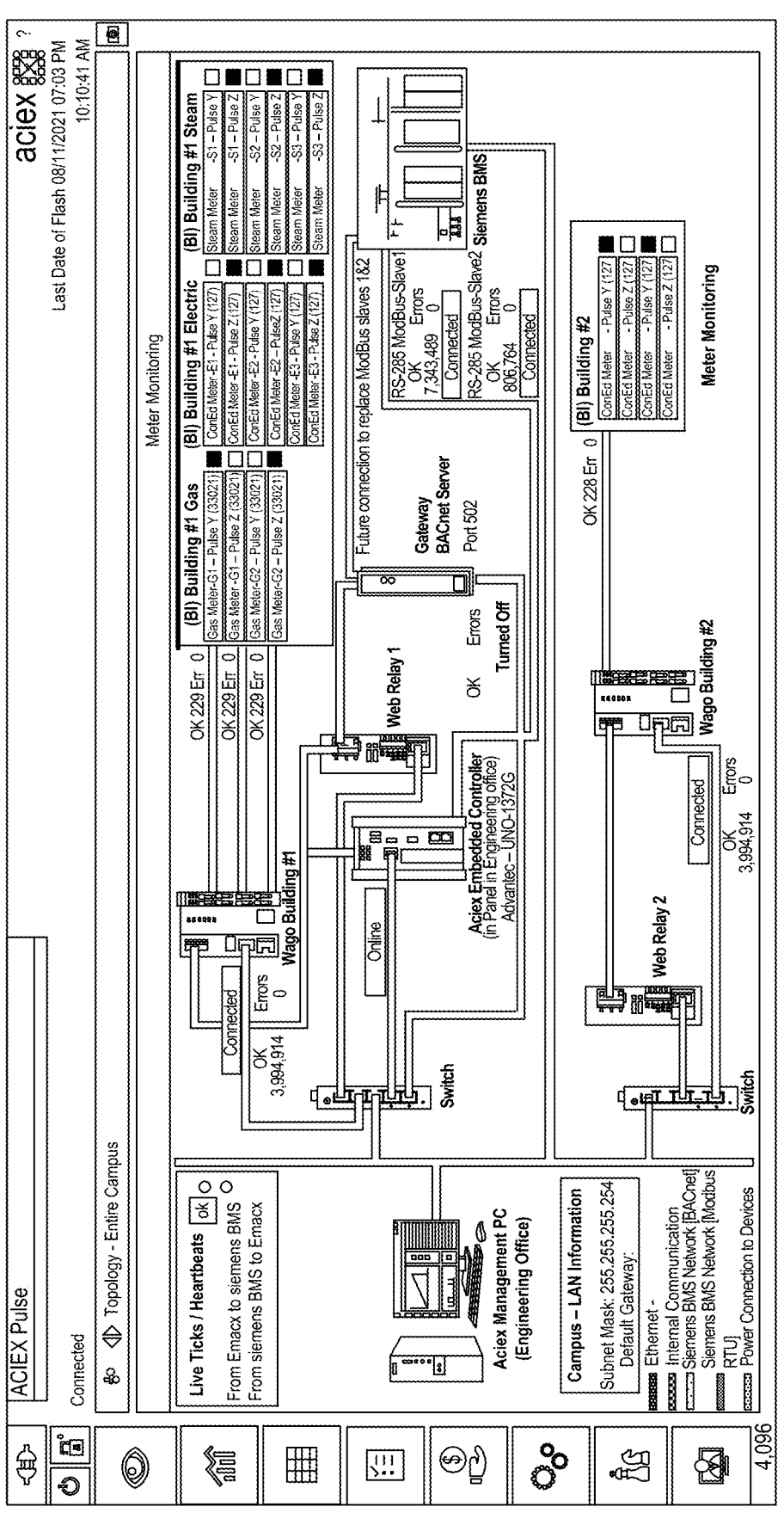
FIGS. 8A-9F are screenshots showing exemplary topologies of example campus environments, consistent with the disclosed embodiments.
Figures 8B, 8C:
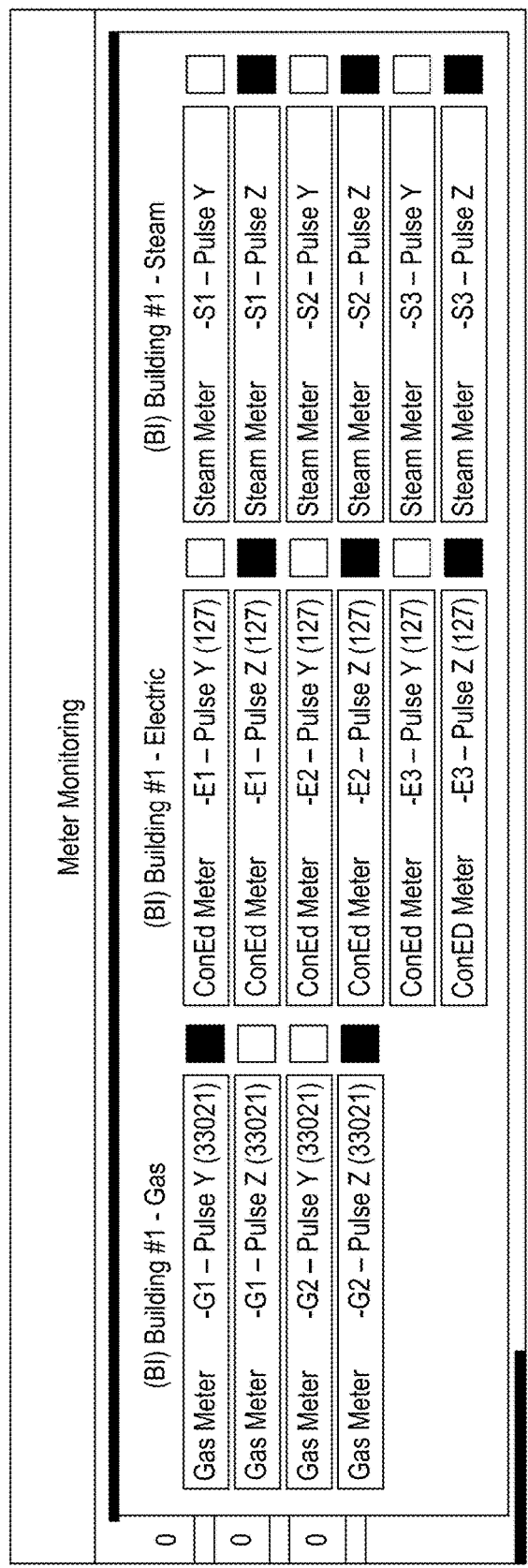
Figure 8D:
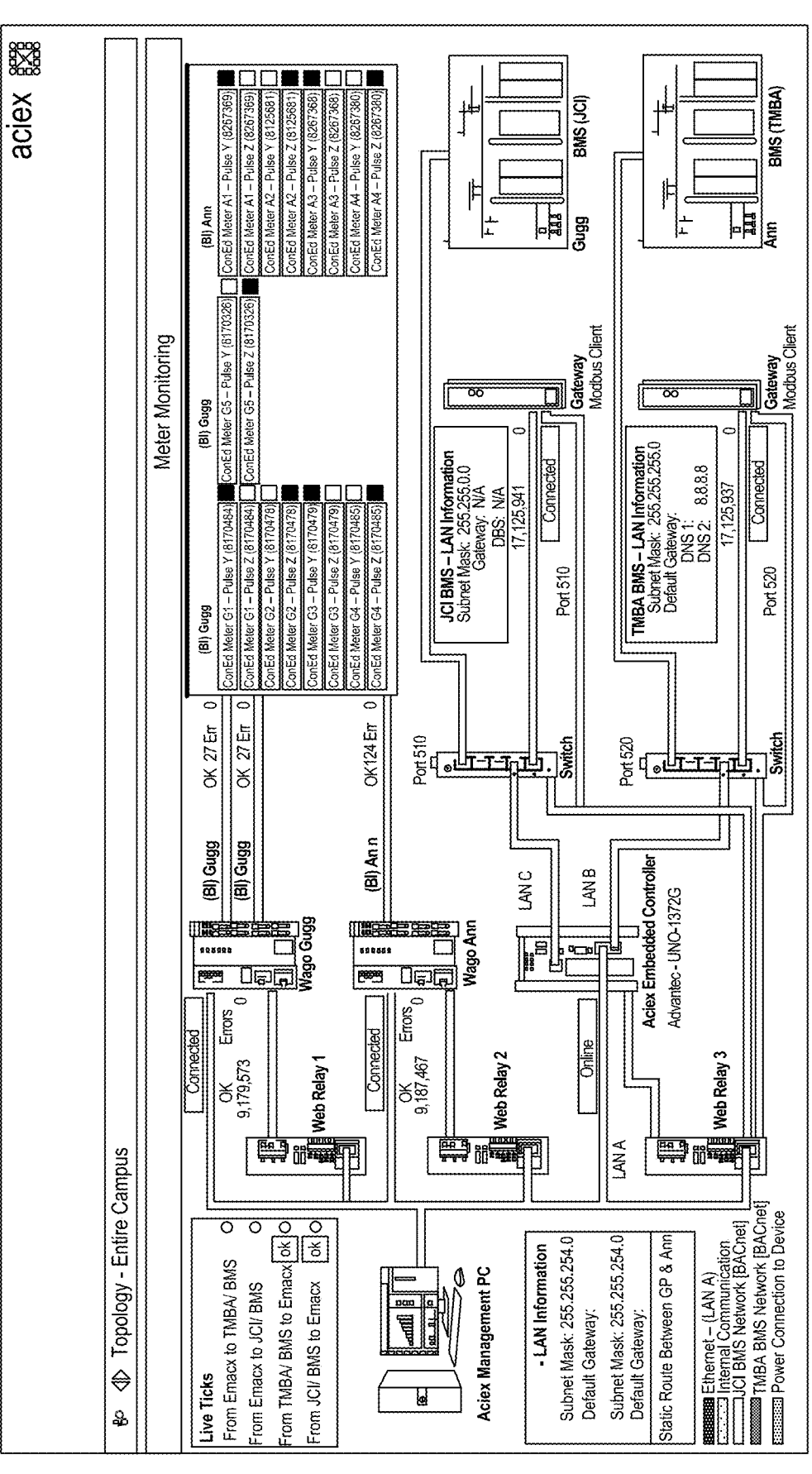
Figure 8E:
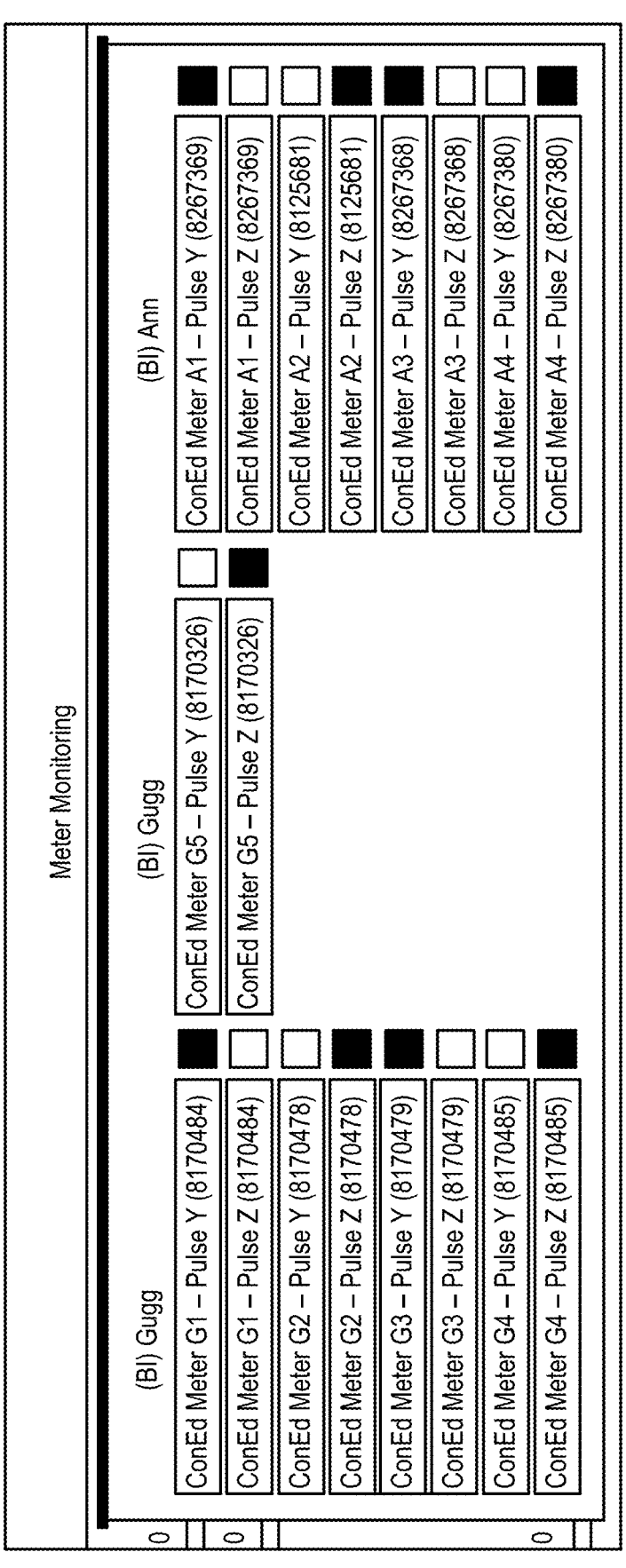
Figure 8F:
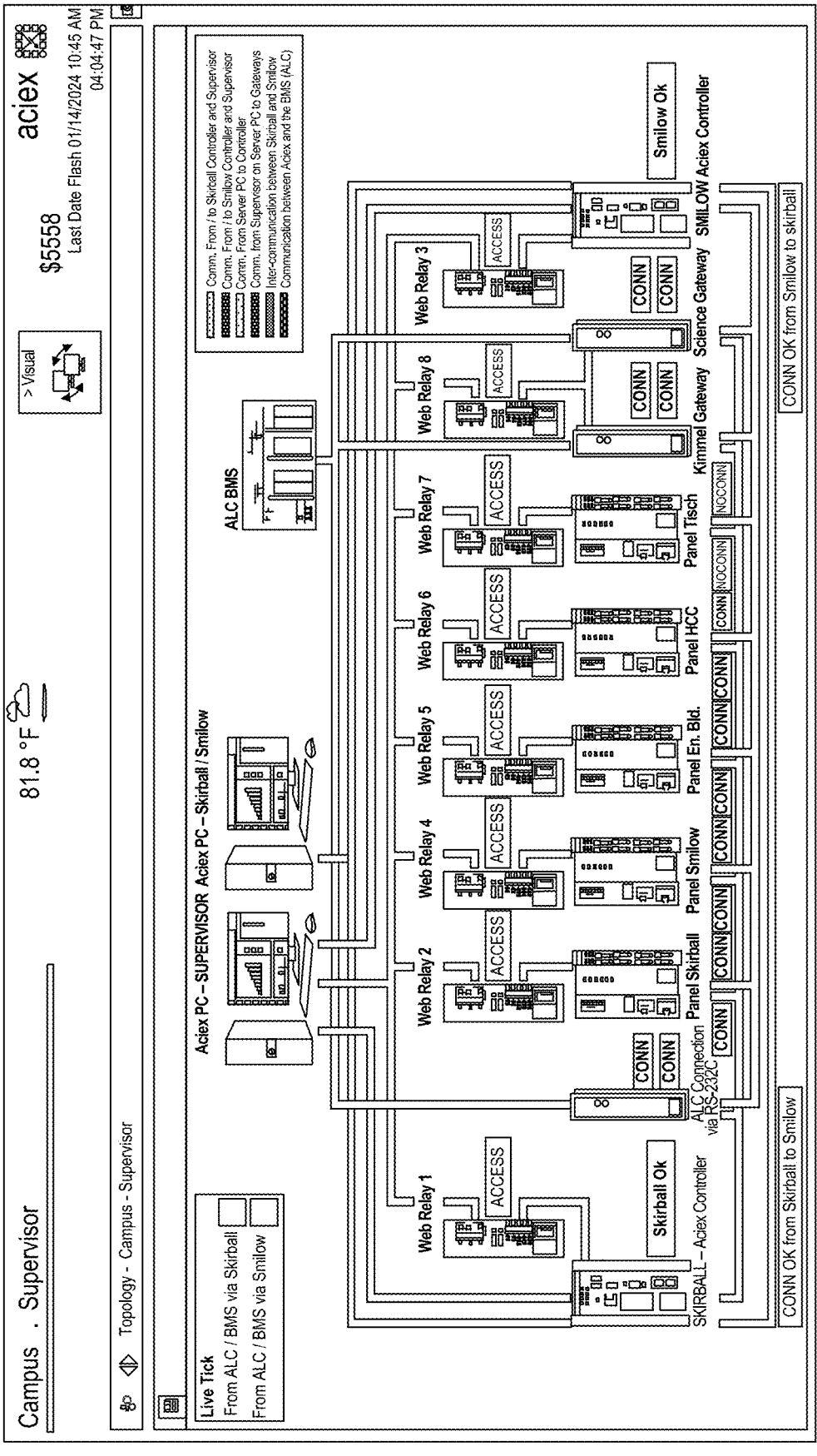
Figure 8G:
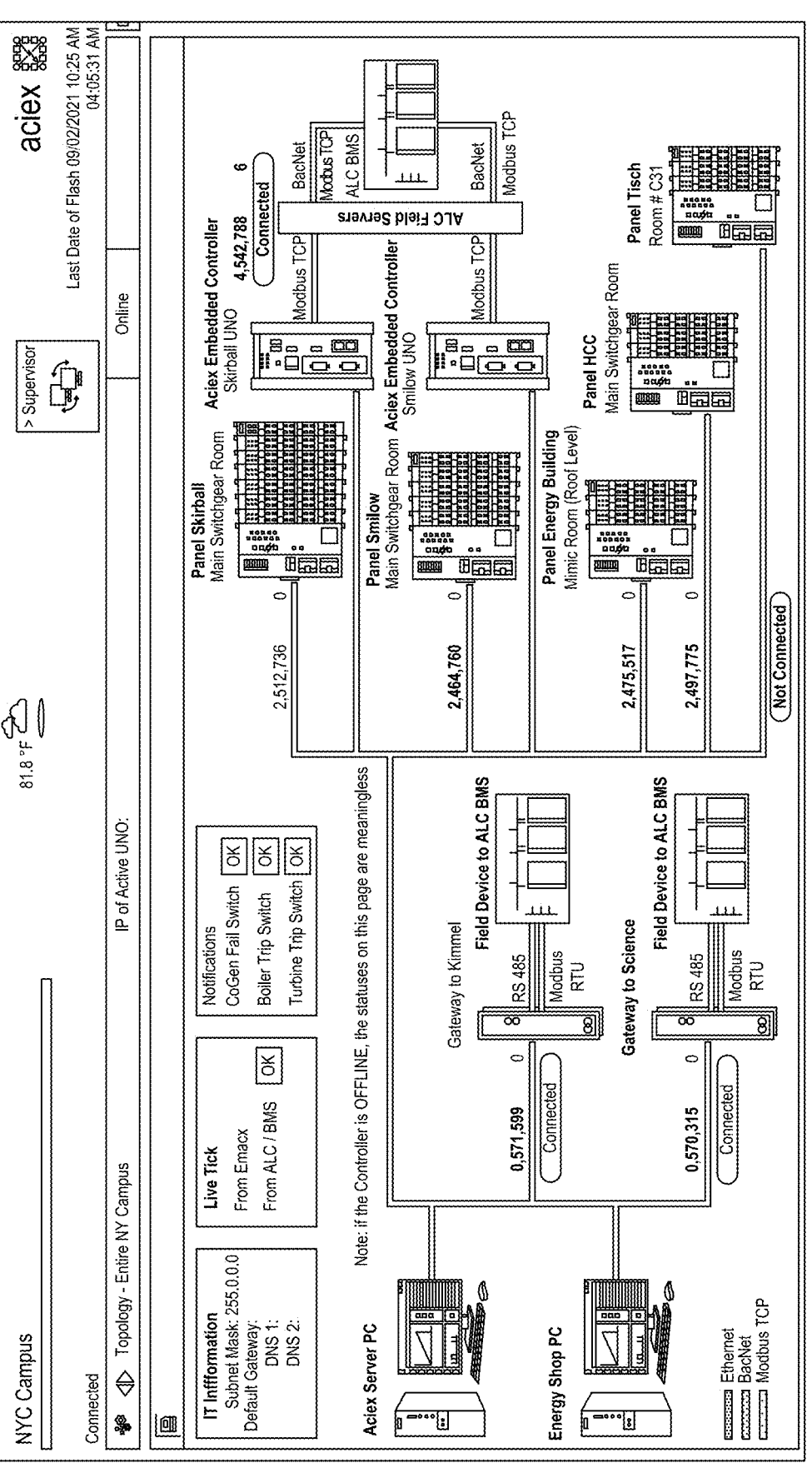
Figure 9A:
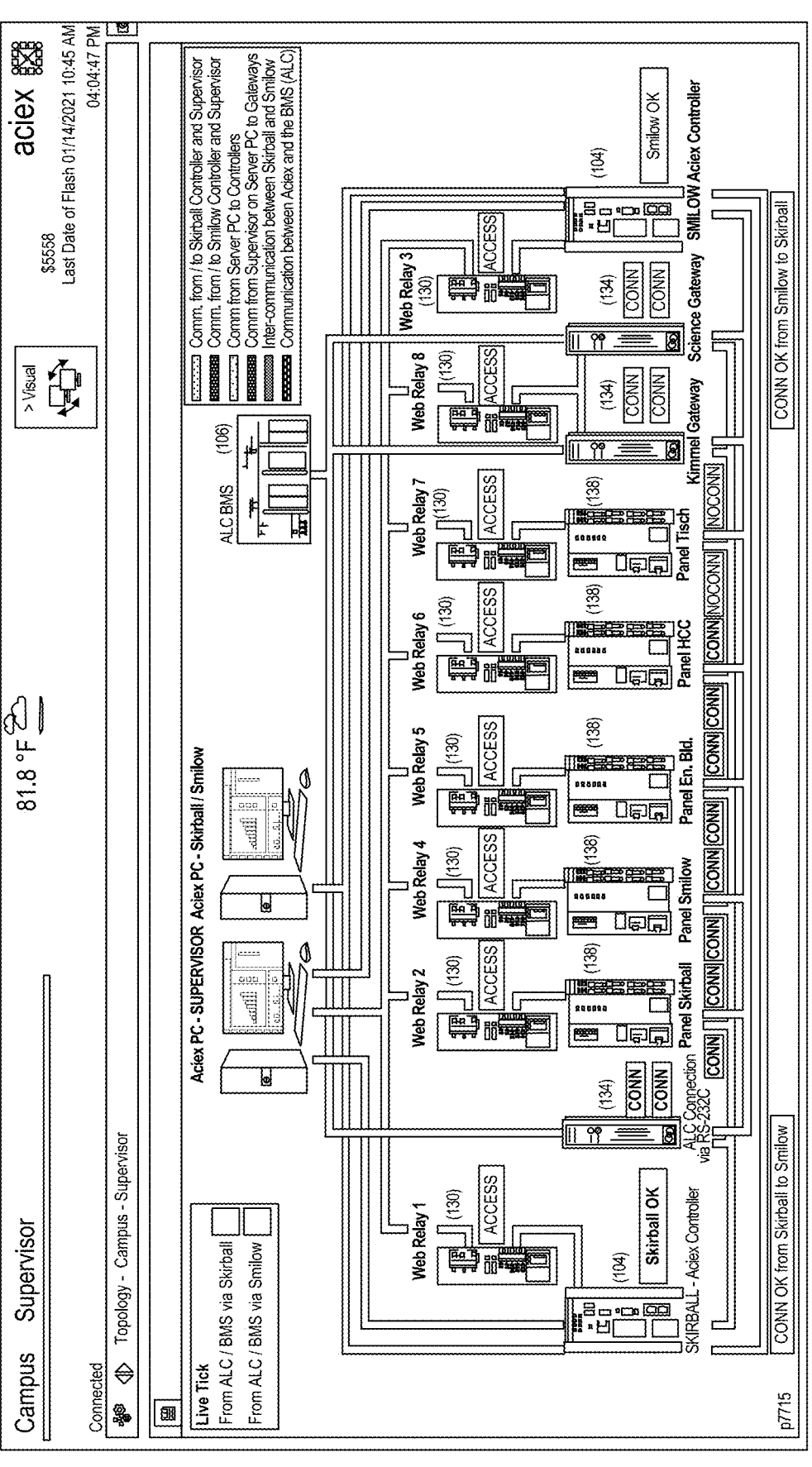
Figure 9B:
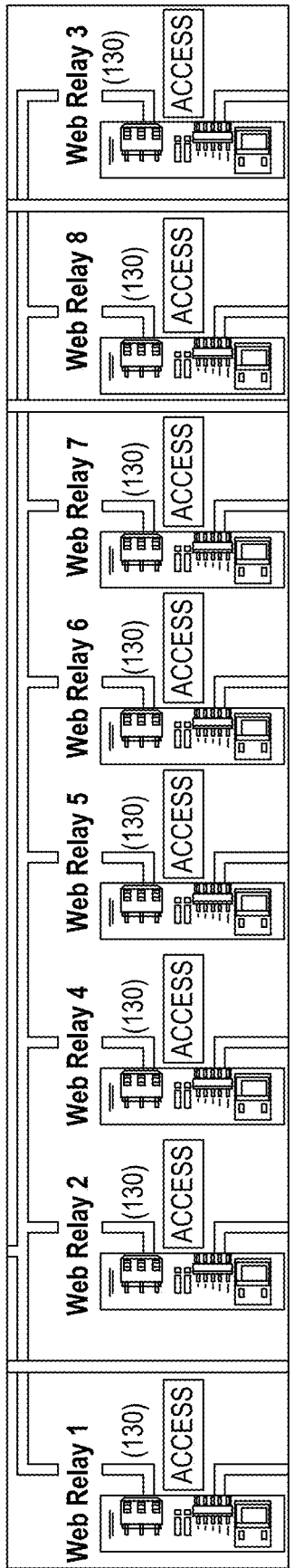
Figure 9C:
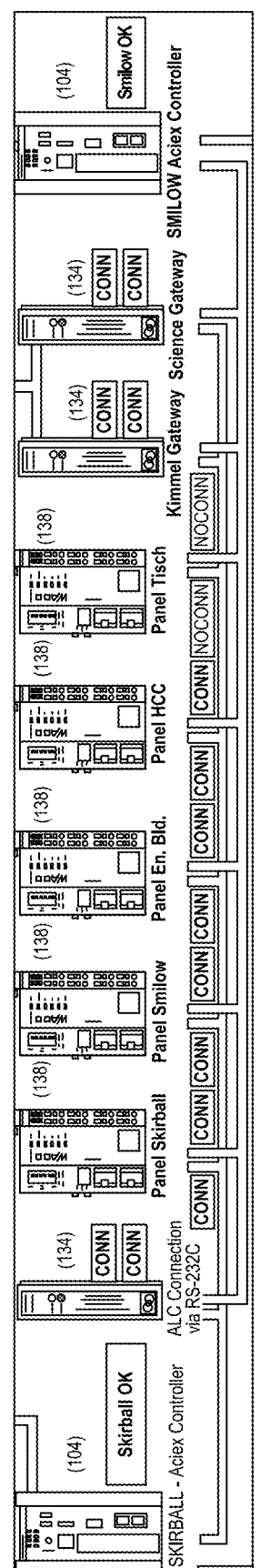
Figure 9D:
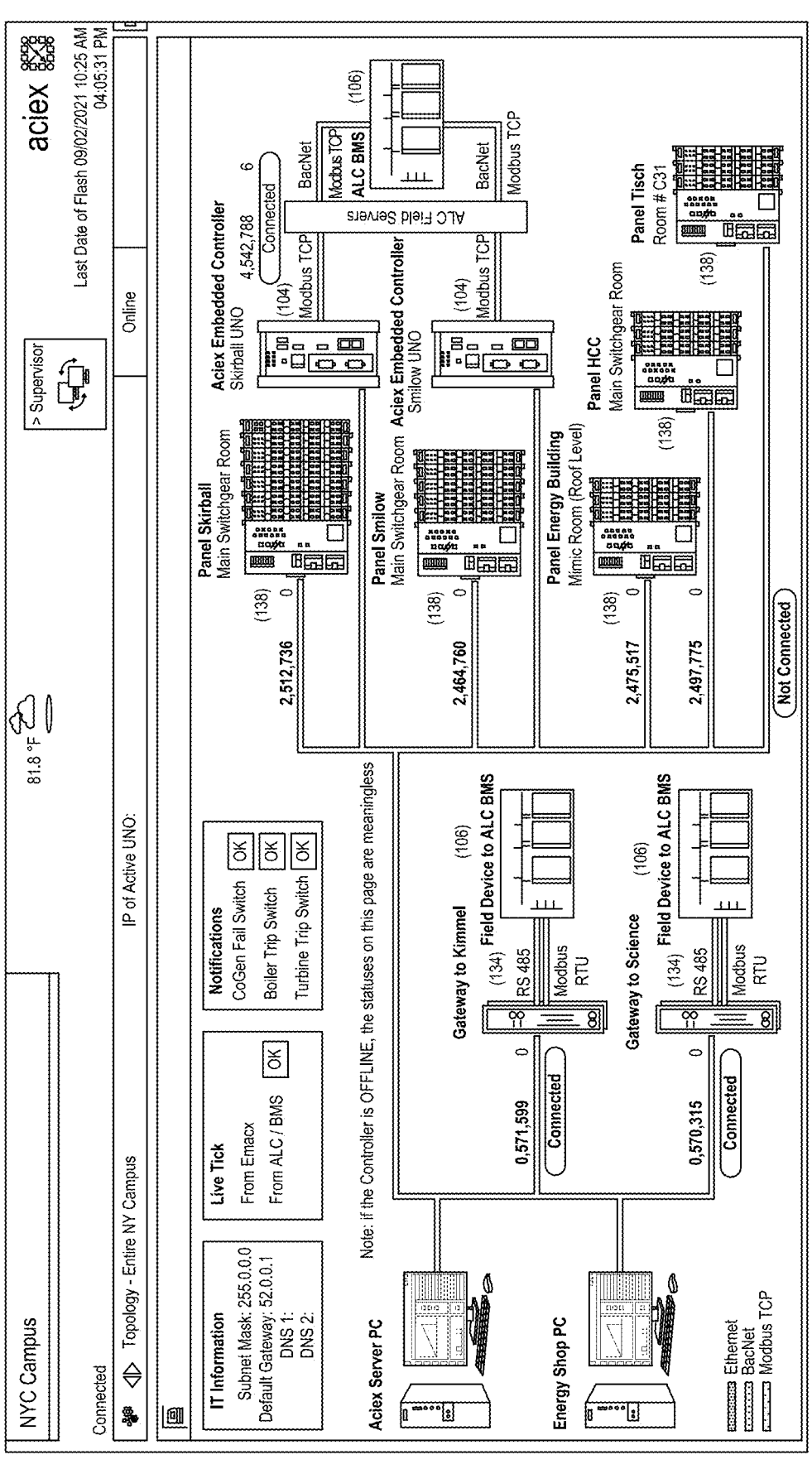
Figure 9E:
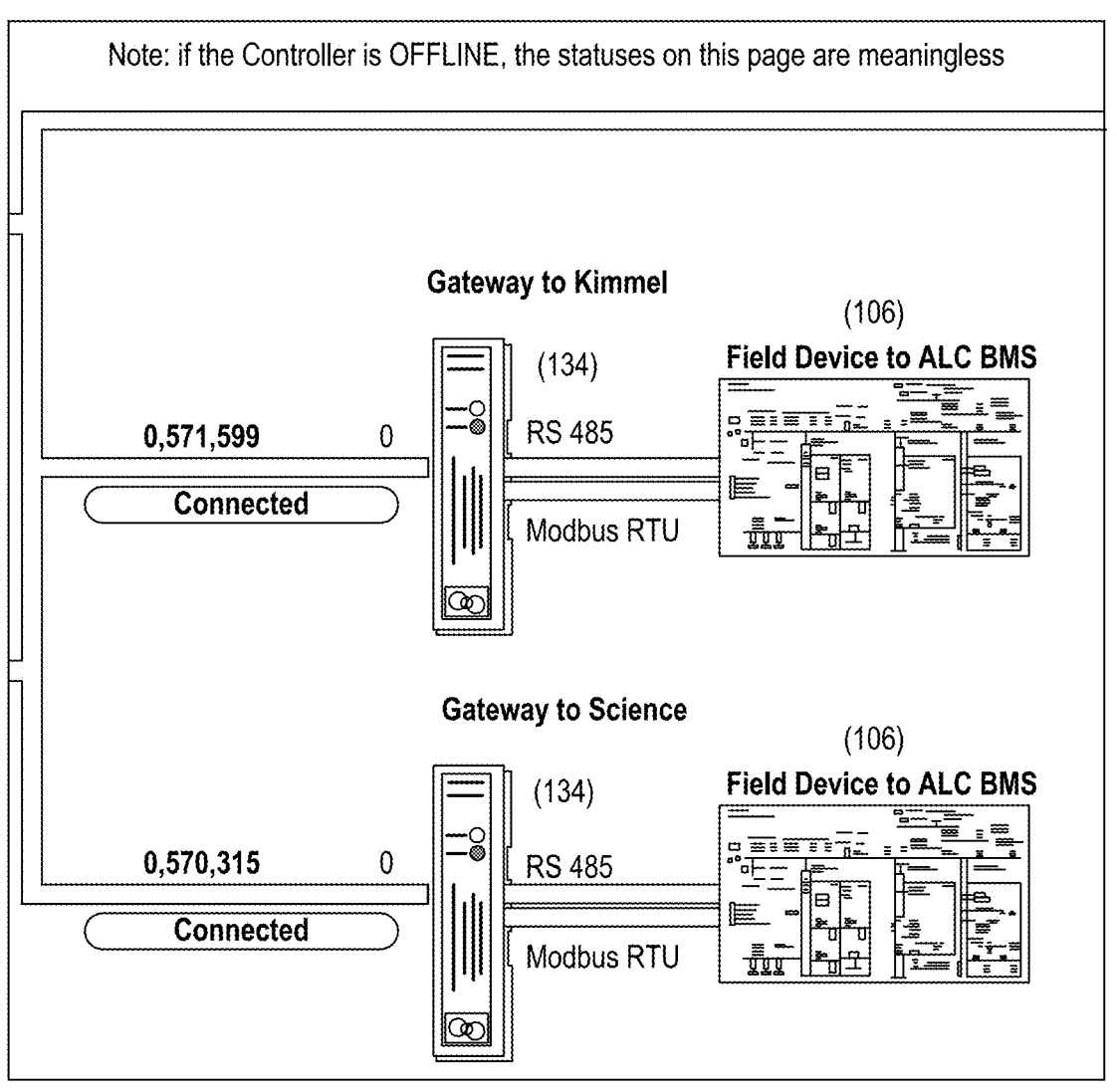
Figure 9F:
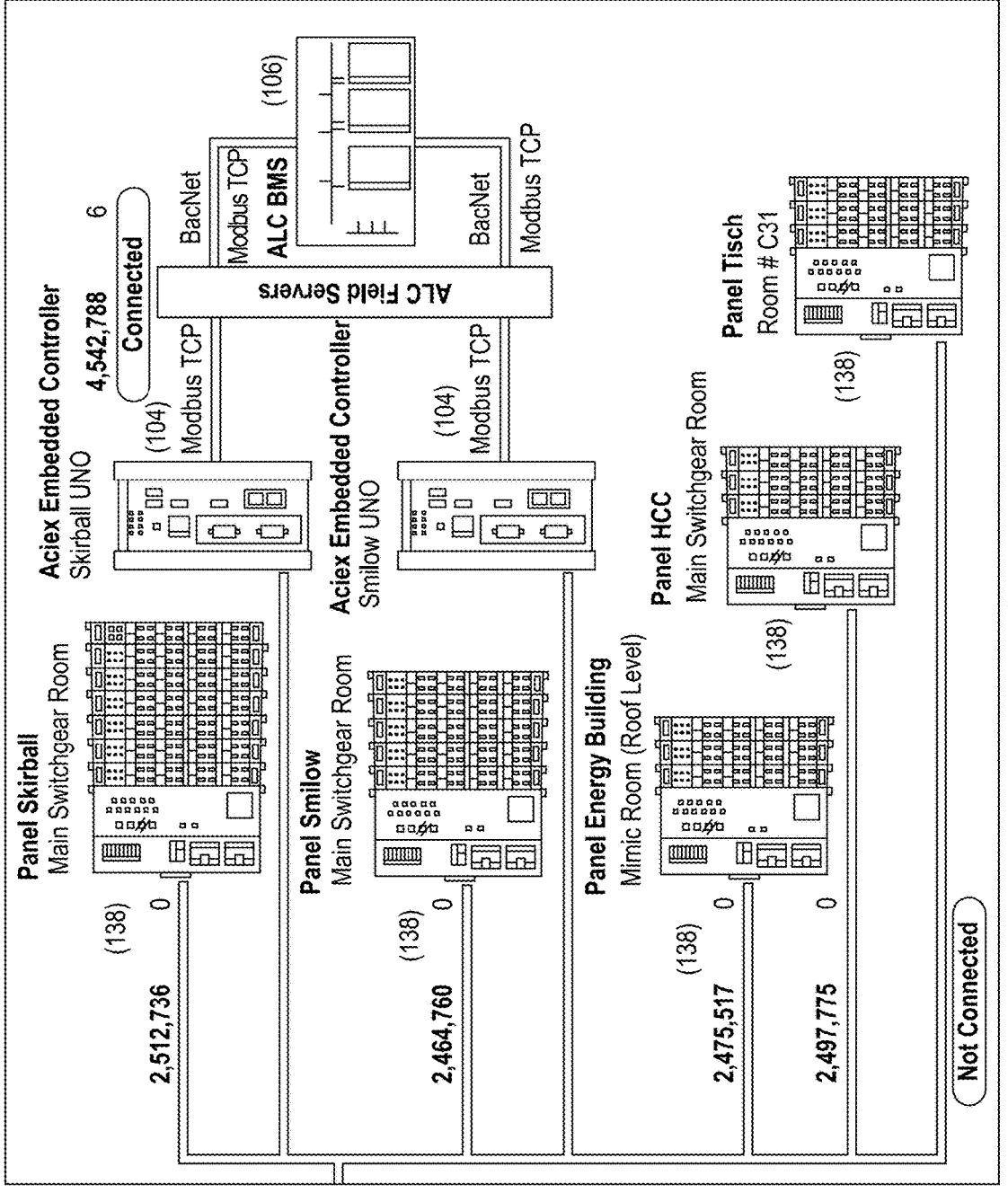

As previously discussed in FIG. 6A, if the use groups/types of occupancy is selected as having multi-tenants in step 344 shown in use group field 344A, then in response a Show Tenants Detail button 345A is displayed on the screen of FIGS. 7K-7M so that the building owner or manager may track their tenants' $CO_2$ allocation and actual usage.

To enable such a detailed tracking requires very little additional set up as indicated on screenshots FIGS. 7I-7J (step 391). Each and every utility meter must be set up (step 390) in our platform anyway. So, the only additional tenant information section 390A in FIGS. 7K-7M required are as follows: the tenant name, the square footage associated with the tenant, the tenant's email address for alert notifications and last, whether the meter is associated with a tenant or is part of the building's common areas.

After the tenant information setup is completed, the user can select tenant detail button 345A to display the screen showing the metrics for all the tenants as shown in FIGS. 7G-7H.

In step 392, the $CO_2$ emissions limits are calculated for each of the tenants along with their percentage of contribution to the entire building and displayed in the $CO_2$ emission limits section 392A.

In step 393, the energy usage for each meter along with key information is pulled and collated by special program SP-747 for the current billing cycle and year-to-date and displayed in the tenant energy usage section 393A. In step 394, the $CO_2$ usage for the current billing cycle as well as year-to-date is then calculated for each of the tenants along with their percentage of contribution to the entire building and displayed in the current billing cycle section 394A.

In step 395, the algorithm calculates the $CO_2$ delta to determine the Metric Tons $CO_2$e surplus or deficit for each tenant and displayed in the $CO_2$ delta section 395A, populates the pie charts and performs some ancillary statistics.

After all the calculations are completed, in step 396, the pop-up screen is displayed with a ranking based on the tenant usage, for example, of the top 16 tenants, as shown in FIGS. 7G-7H. The building owner can also look for a particular tenant's information or rank the list of tenants from an exhaustive list of sort options.

FIGS. 8A-9F depict exemplary topologies of all the equipment and devices that are an integral part of the implemented solution. It is indeed essential for the building managers to understand how all the operate together. The topology also provides comprehensive view on a single screen. In various embodiments, the topology view may differ tremendously from one building to another depending on the complexity of the facility. The system, as well as a user such as a building manager and engineers, may monitor all the meters and pinpoint rapidly any problem that may arise using automated and/or visual cues. Alerts may also be provided by SMS and/or emails to various recipients.

The importance of Environmental, Social and Governance (ESG) is rising because the financial performance of many companies is increasingly being linked to corporate sustainability and societal impact. One important ESG target is decarbonization, which refers to reducing emission of greenhouse gases (GHG). Thus, it is becoming of vital importance to ensure that the kWh Harvesting methodology is delivering the promised kWh savings since a loss may or might result in financial penalties. The goal is to shift the burden of carbon emission related damage through monetarization back to those who are responsible for it, and who can reduce or compensate for it.

The exemplary topologies in FIGS. 8A-8E and 9A-9F provides examples of the layout of the meters, how they communicate with the industrial computers via IOT devices such as WAGO PLCs and how in turn, the industrial computer communicates kWh Harvesting commands to the BMS. The example topologies of FIGS. 8A-8E and 9A-9F are not limiting on the embodiments, and any operating systems consistent with the present embodiments can include any number of components not depicted in FIGS. 8A-8E and 9A-9F.

Figure 10:
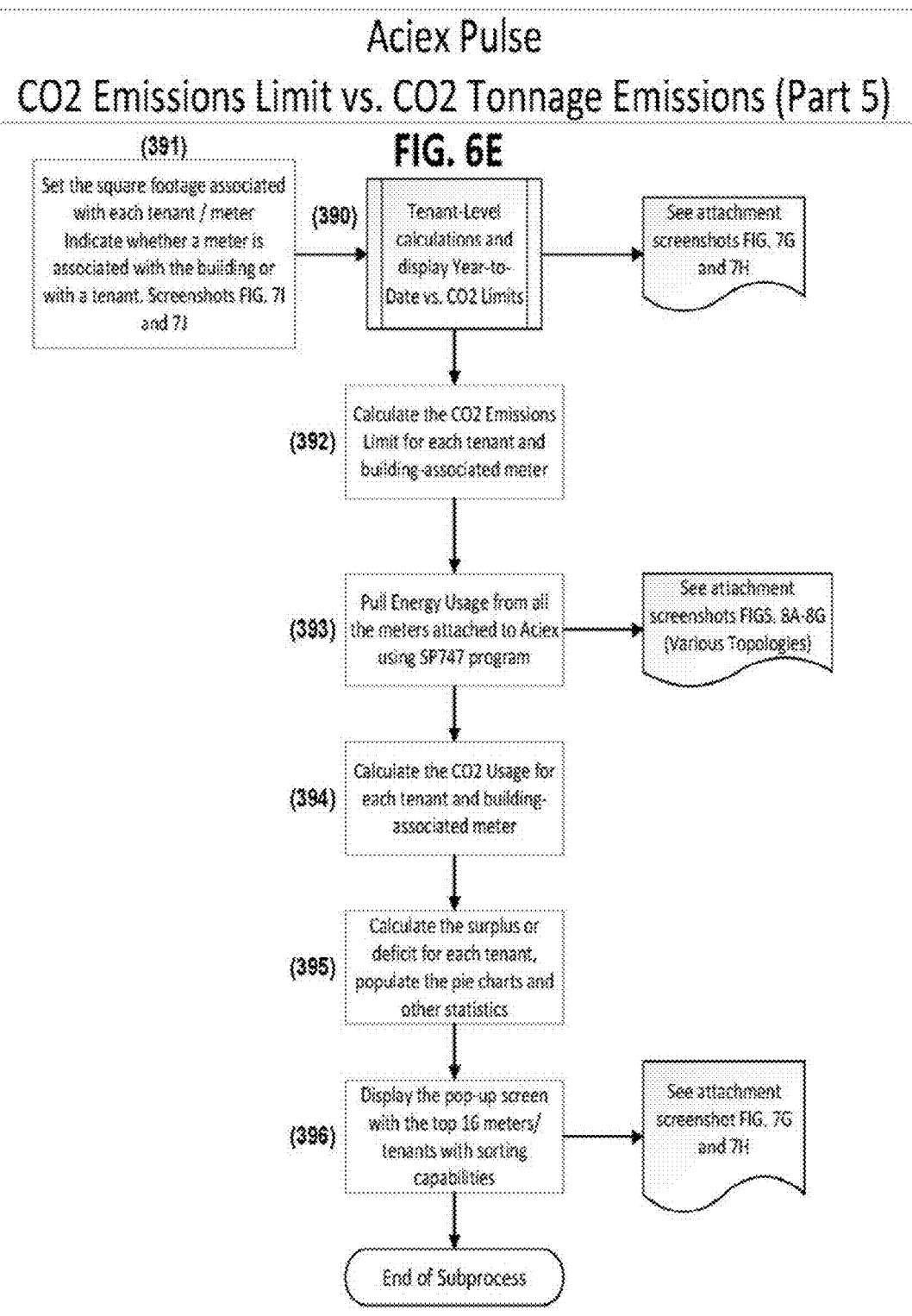
FIG. 10 is a flowchart of a process for mitigation measures and strategies, consistent with the disclosed embodiments.
Figure 11A:
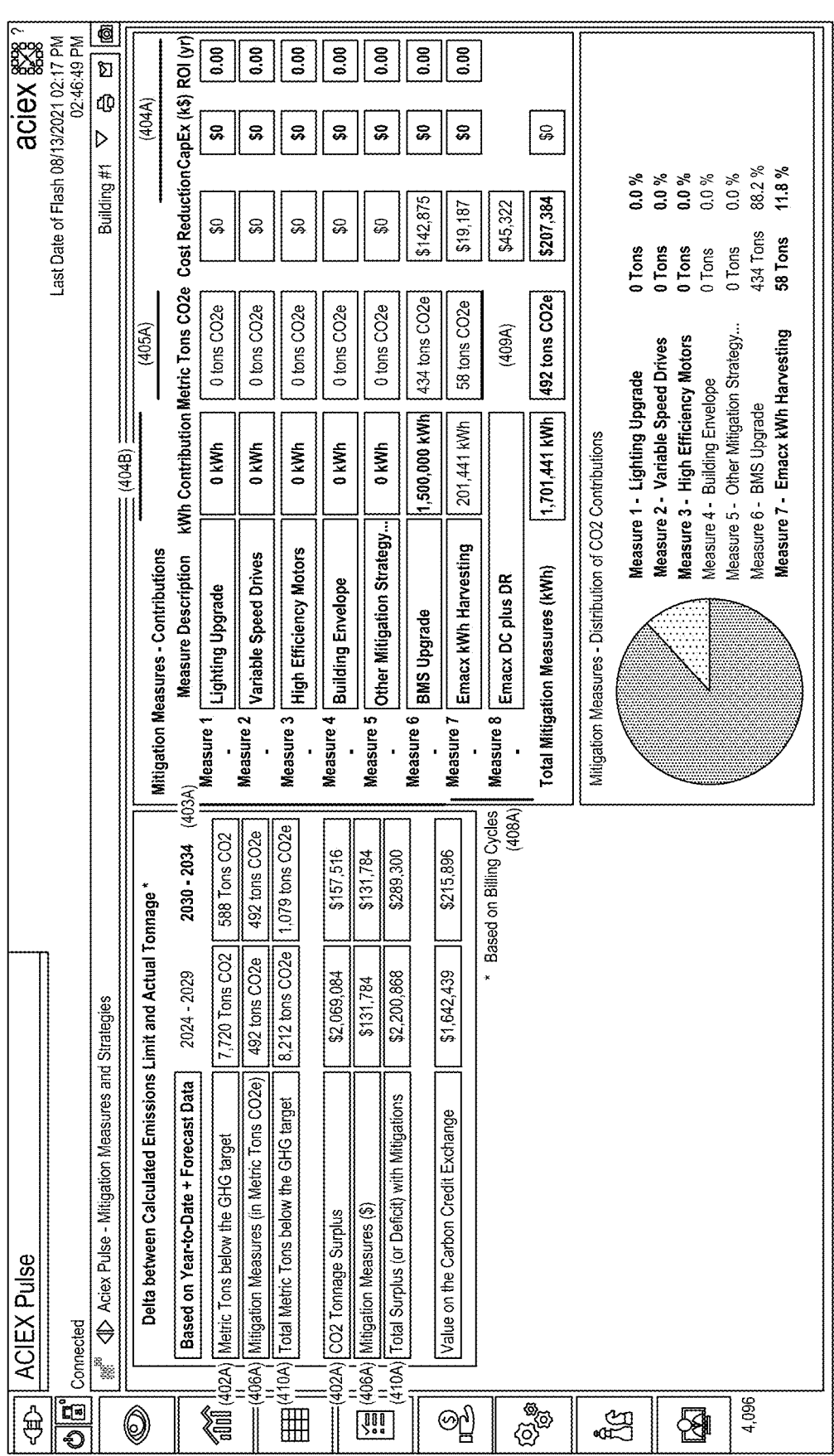

FIG. 10 is a flowchart of a process for mitigation measures and strategies. FIGS. 11A-11C are screenshots depicting the mitigation measures and strategies in FIG. 10. The system can be configured to decide whether a kWh mitigation is necessary. If mitigation is necessary, the method performs the steps shown in the mitigation measures and strategies flowchart in FIG. 10 and FIGS. 11A-11C to take advantage of the kWh harvesting capabilities.

In various embodiments, the kWh Harvesting methodology and associated algorithms provides the user (e.g., a building owner or manager) with not only with a building's carbon footprint but also with strategies to mitigate their potential environment and financial exposure.

FIGS. 11A-11C are screenshots that illustrate such mitigation strategies. In FIGS. 11A-11C, the exemplary screenshot shows, on the left-side, the status of the carbon emissions of the building t and, on the right side, potential mitigation measures. In step 400, the system can implement mitigation measures that not only include the real-time contribution of the kWh Harvesting strategy and its corollary, namely contribution of intelligent Demand Control (iDC) and intelligent Demand Response (iDR), but also incorporates external contributions of mitigations initiated, for example, by the building owner or manager such as a lightning upgrade, the installation of variable speed/frequency drives, etc.

In step 401, activation of a navigation button can enable the building owner or manager to display the status of the building either year-to-date format (in step 355) or extrapolated to the end of the year format (in step 356) as described on FIG. 6B.

In step 402, he status information can be presented divided, for example, in three blocks 402A, 406A, and 410A, namely the $CO_2$ status, the $CO_2$ tonnage surplus or deficit expressed in a dollar value, and finally if relevant, the potential value of a surplus on a future carbon credit exchange.

In step 403, the user can enter any mitigation project into the mitigation measures section 403A that may have been invested in to mitigate the user's exposure, if any. Several typical types of projects may be preformatted into the system with the possibility for the user to provide their own. In step 404, if there is a capital investment project, the user can enter the expected kWh contribution into the kWh Contribution column 404A from the external study. In addition, in step 404, the user can enter the associated CAPEX$ into CAPEX$ column and the ROI into the ROI column of section 404A. In step 405, the program will then automatically calculate the Metric Tons of $CO_2e$ and associated $Cost reduction associated with that investment and populate the information into Metric Tons of $CO_2e$ column 405A.

In step 406, the algorithm applies the total CO2e reduction to the left panel into the Metric Tons of $CO_2e$ column 406A and recalculate the building's exposure, either a surplus or a deficit.

In step 407, the user may enter any number of mitigation measures. In this example, the user may enter up to six mitigation measures.

Independently from the mitigation measures provided by outside consultants as aforementioned, in step 408, the outcome of the kWh Harvesting methodology is summarized as measure 7 and the ancillary contribution of the iDC and iDR as measure 8 and presented in section 408A. The value of the kWh Harvesting contribution is re-calculated in real-time and annualized.

Then, in step 409, similarly as with the outside mitigation measures, the associated Metric Tons of $CO_2e$ and $Cost reduction are calculated and entered in section 409A; their values are reflected in the left panel into the Metric Tons of $CO_2e$ column 406A and the surplus or deficit recalculated in step 410 and displayed in section 410, as well.

Finally, if there is a surplus, its value on a future carbon credit exchange will be calculated and displayed.

FIGS. 12A-12F are flowcharts of the process using the software platform, which can be interfaced with the components of the BMS to connect directly to the load assets and hence enable kWh harvesting.

A load study or a detailed analysis identifies all the load assets that meet any of the following criteria:

Capture kWh stemming from inherent system overdesign

Capitalize on recalibration of operations during non-peak conditions

Figure 12A:
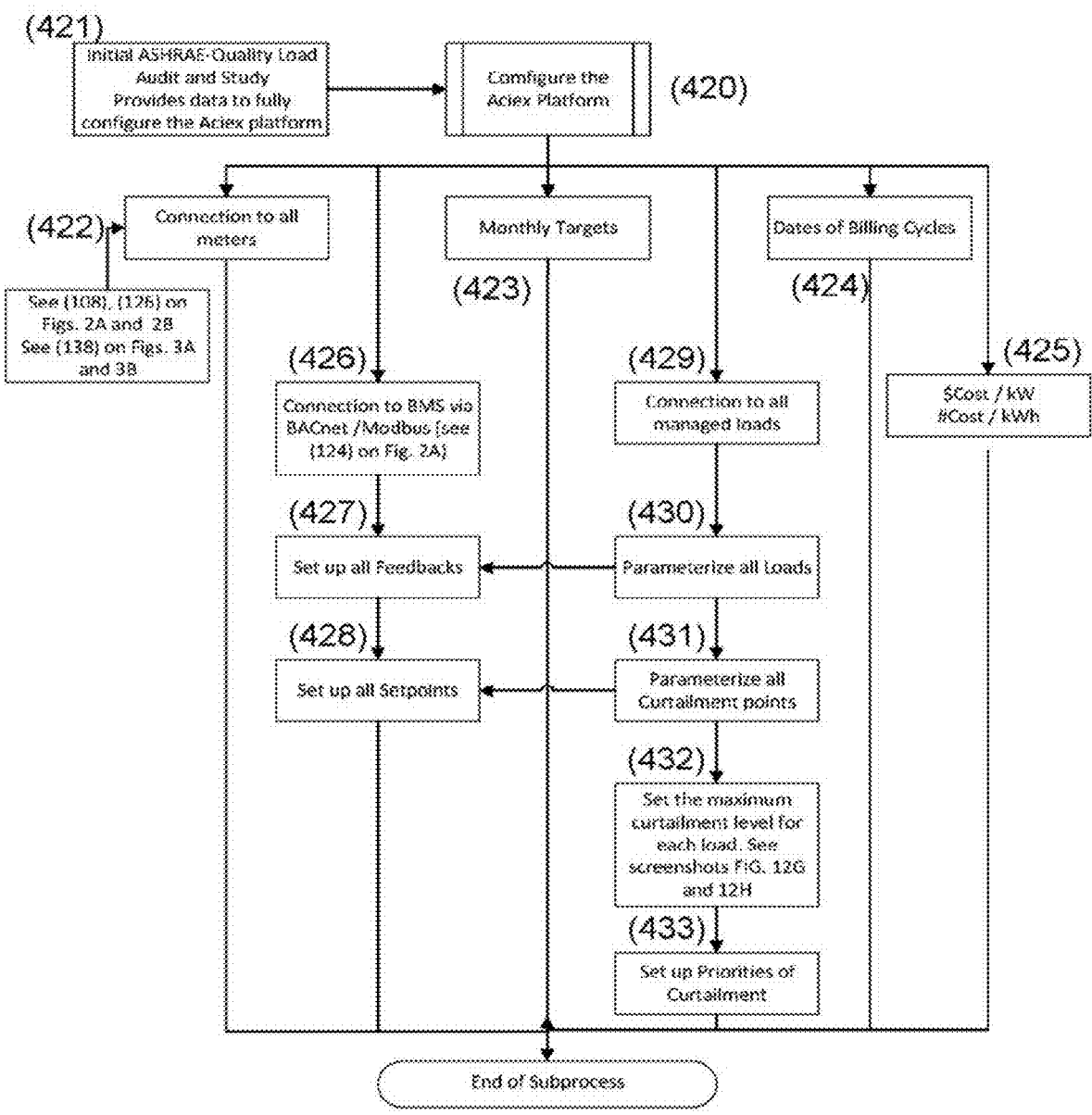

Optimize energy assets that are needlessly running 100% capacity 24 hours for 7 days a week Enhance efficiencies of energy consuming load assets with additional controls Load shifting and scheduling possible Taking advantage of seasonal and hourly weather variations Referring to FIG. 12A, a flowchart for establishing the prerequisites for the process for configuring the software platform to interface with the components of the BMS to connect directly to the load assets and hence enable kWh harvesting is shown. The process is shown to include configure the software platform (step 420); initial ASHRAE-Quality Load Audit and Study provides data to fully configure the software platform (step 421); connection to all meters (step 422); monthly targets (step 423); dates of billing cycles (step 424); $cost/kW and #Cost/kWh (step 425); connection to BMS via BACnet/Modbus (step 426); set up feedbacks (step 427); set up all setpoints (step 428); connection to all managed loads (step 429); parameterize all loads (step 430); parameterize all curtailment points (step 431); set the maximum curtailment level for each load (step 432); and set up priorities of curtailment (433).

Figure 12B:
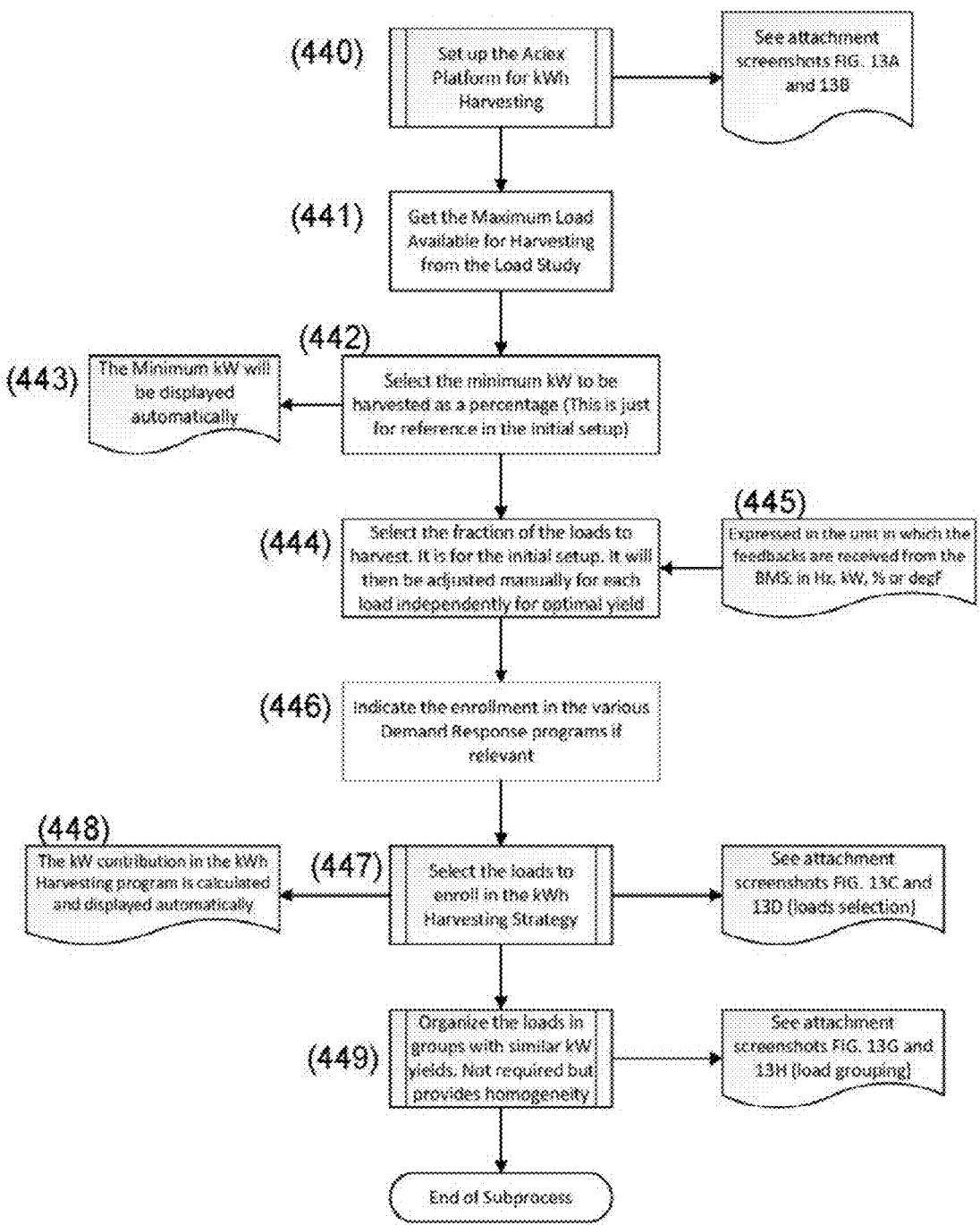
Figure 13A:
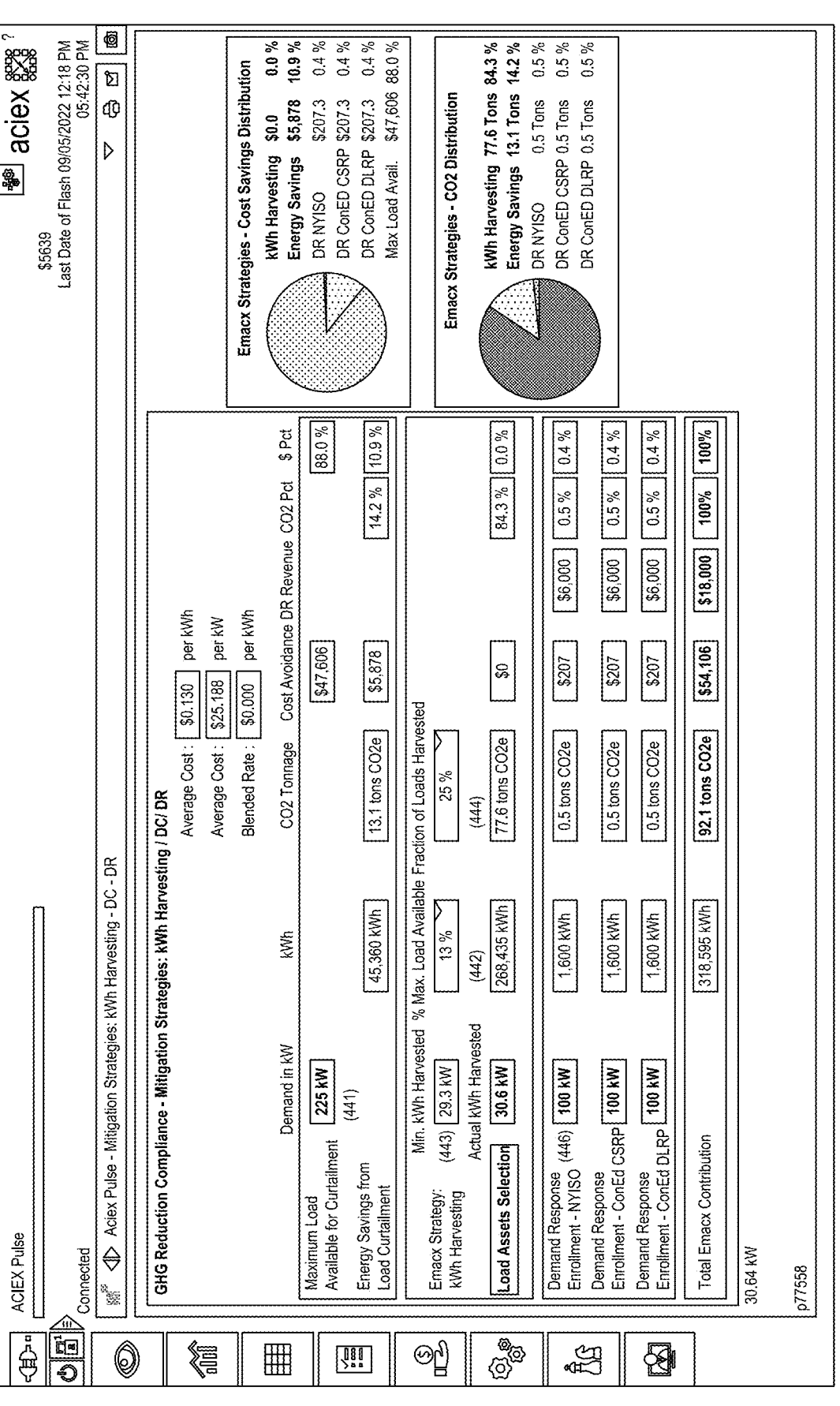
Figure 13C:
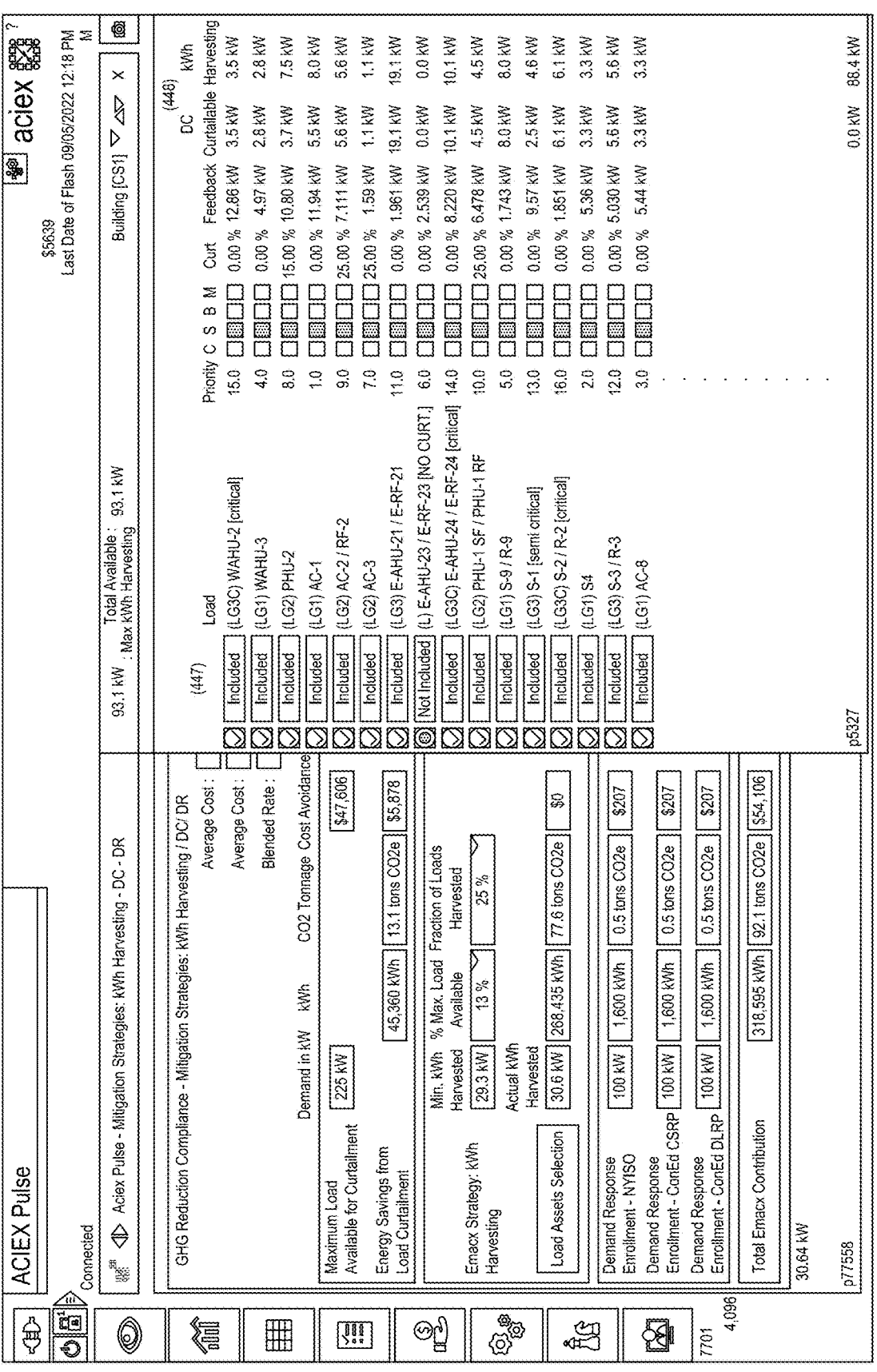
Figure 13E:
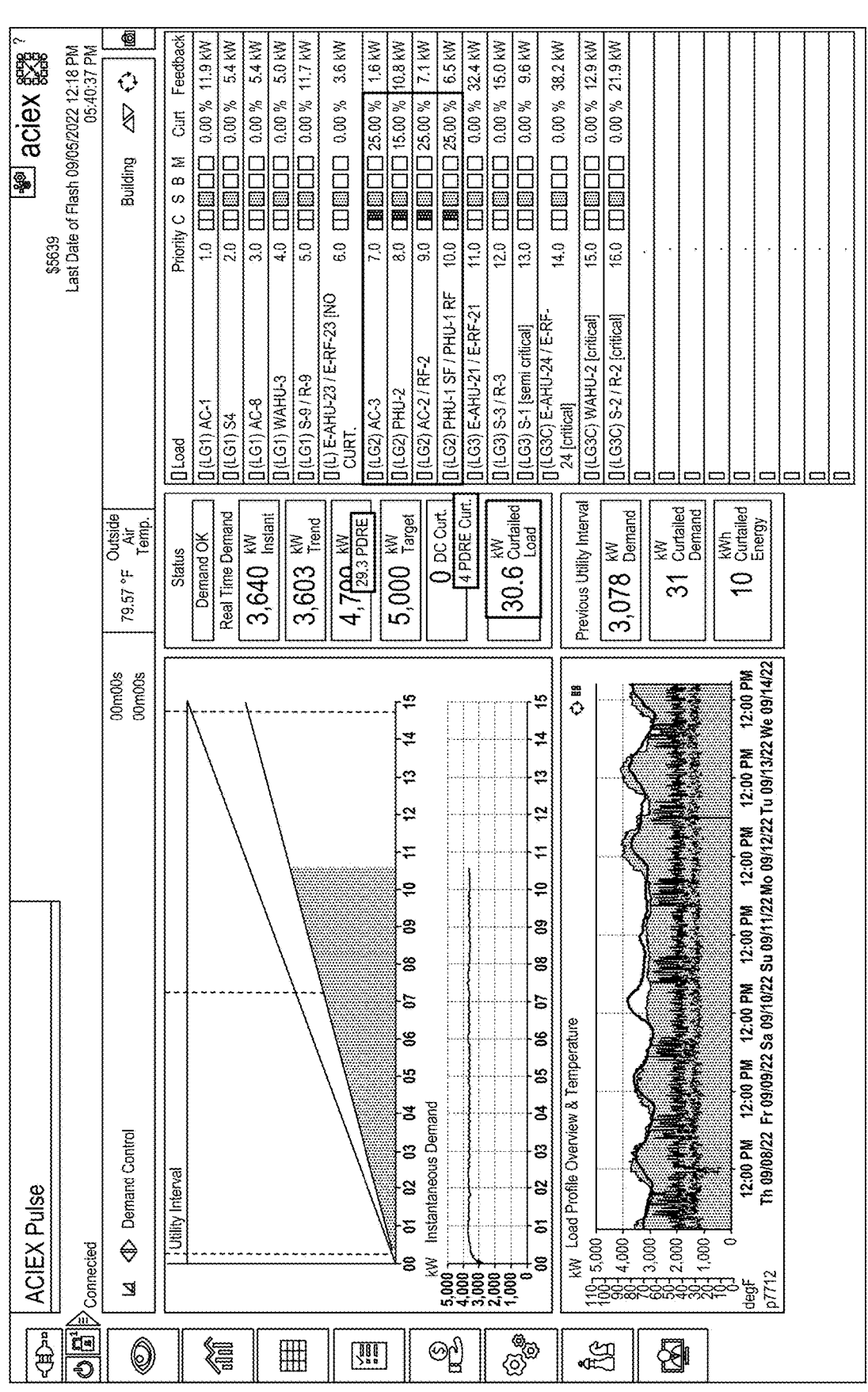
Figure 13G:
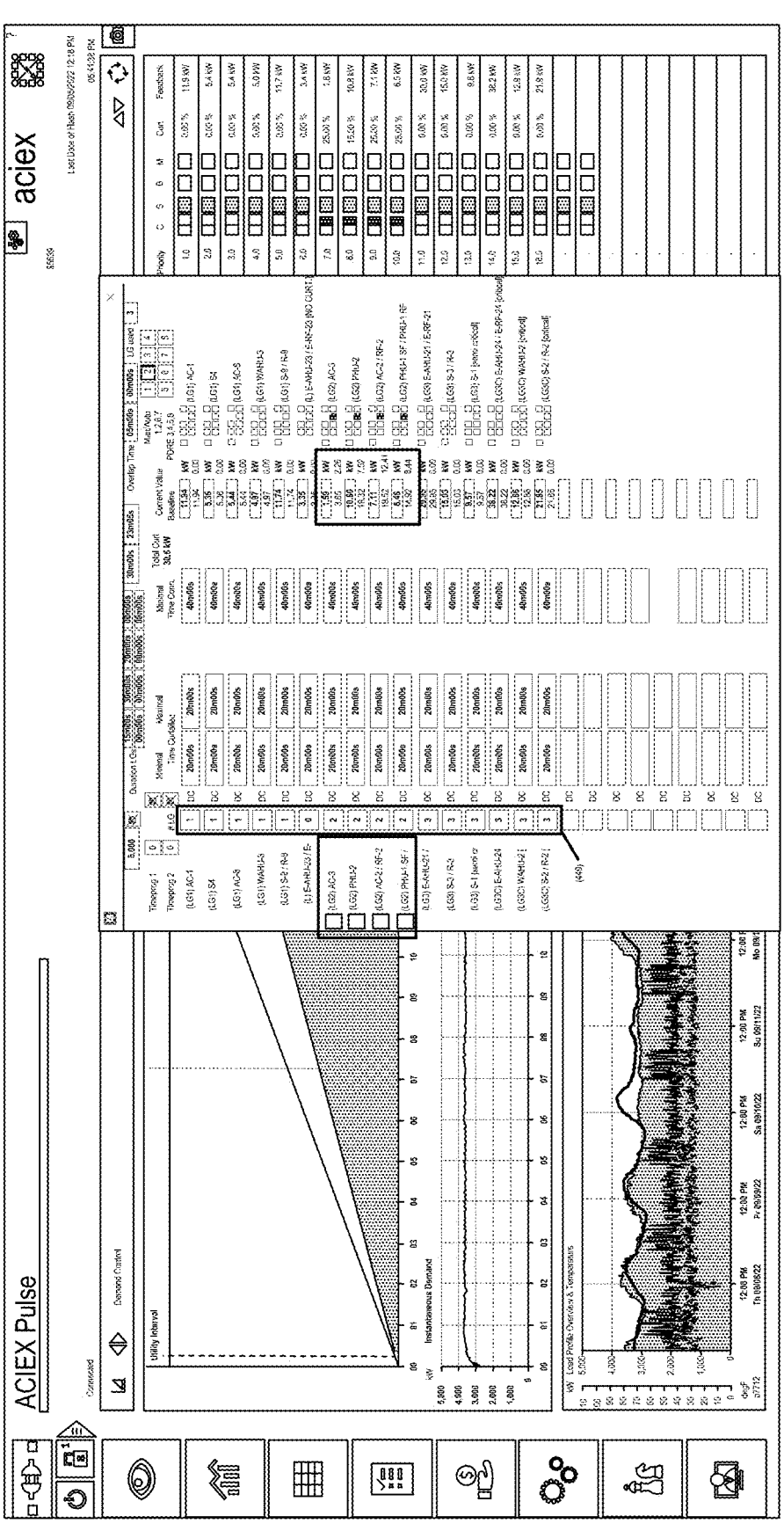
Figure 13H:
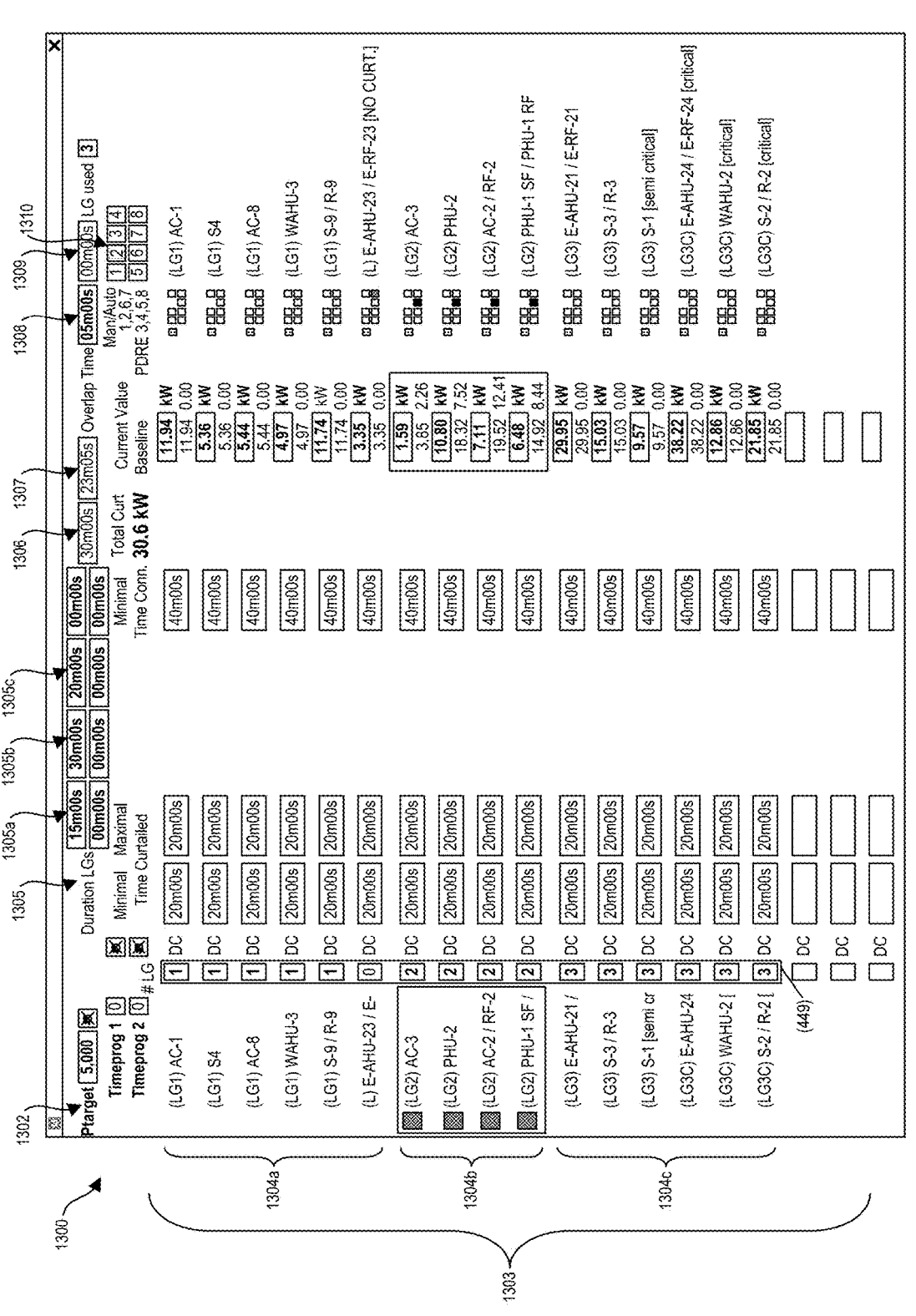
Figure 14A:
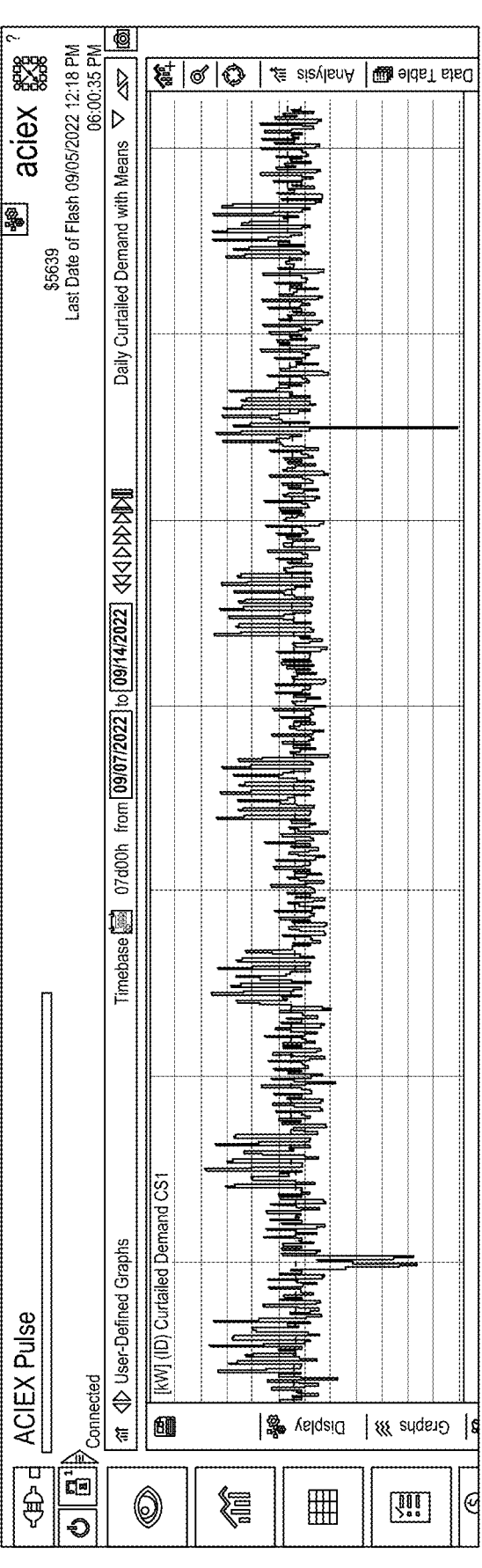
FIGS. 14A-14D are screenshots that provide a visual representation of the daily harvested energy as well as of the $CO_2$ reduction, consistent with the disclosed embodiments.
Figure 14B:
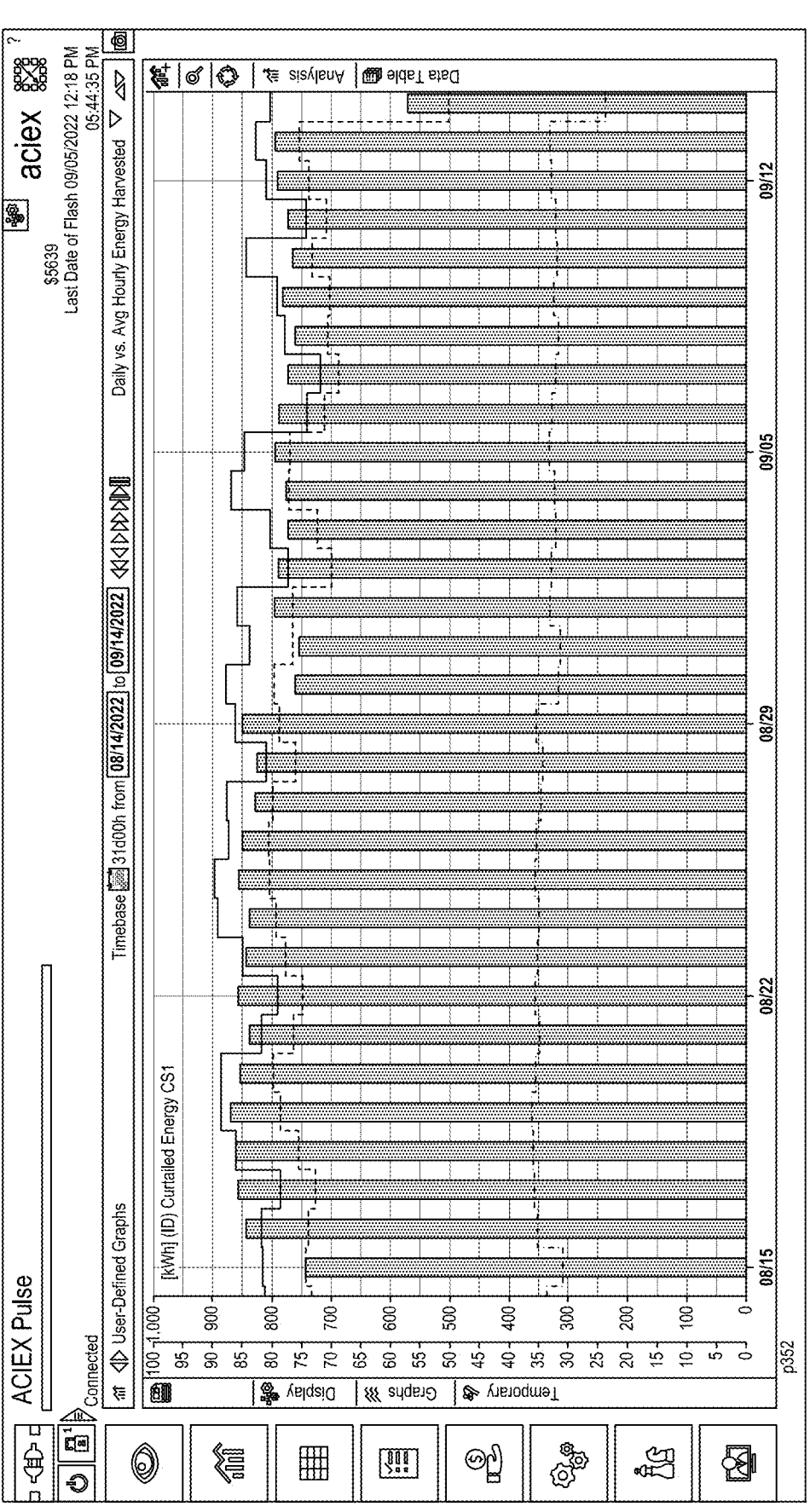
Figure 14C:
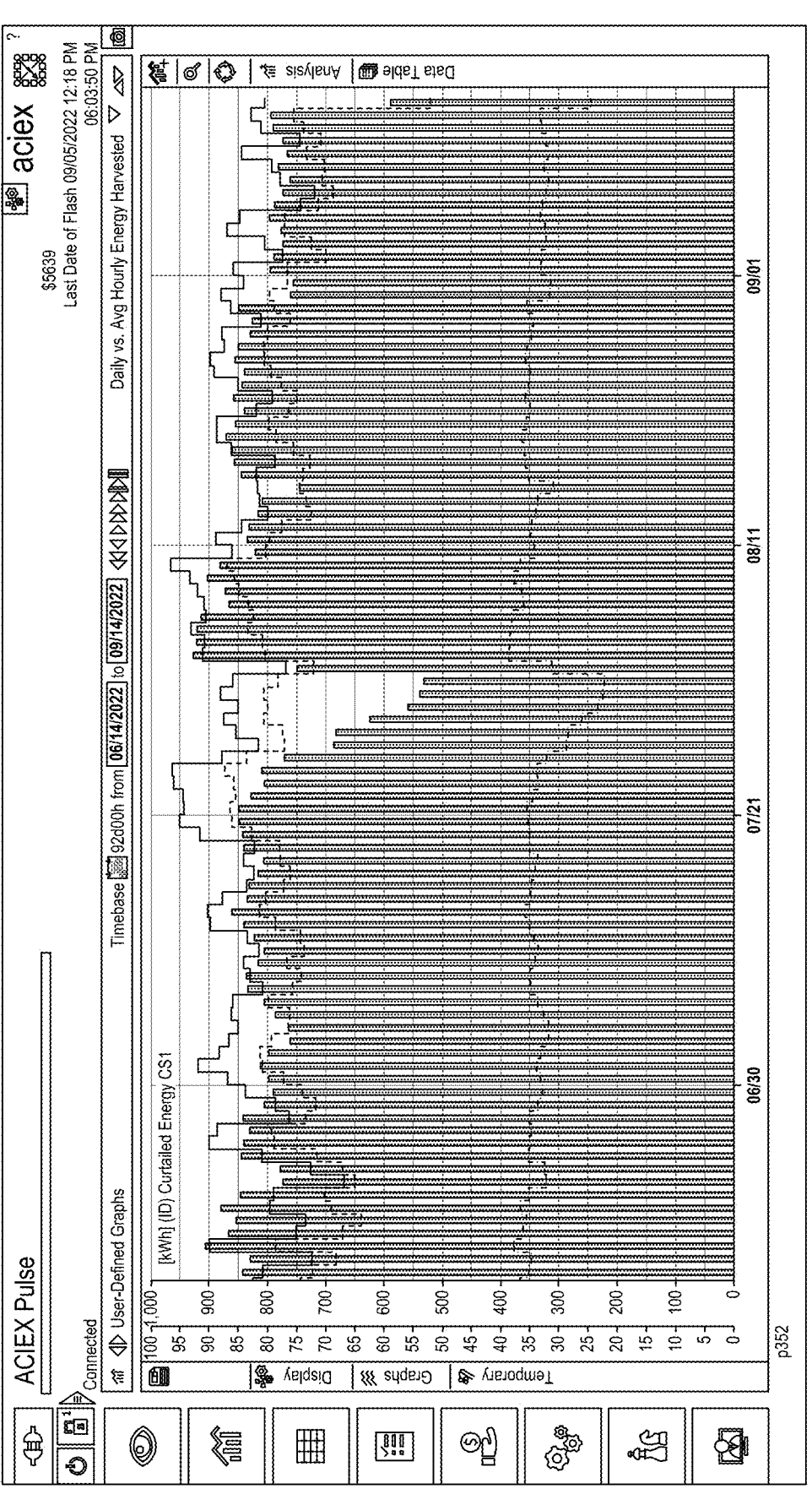
Figure 14D:
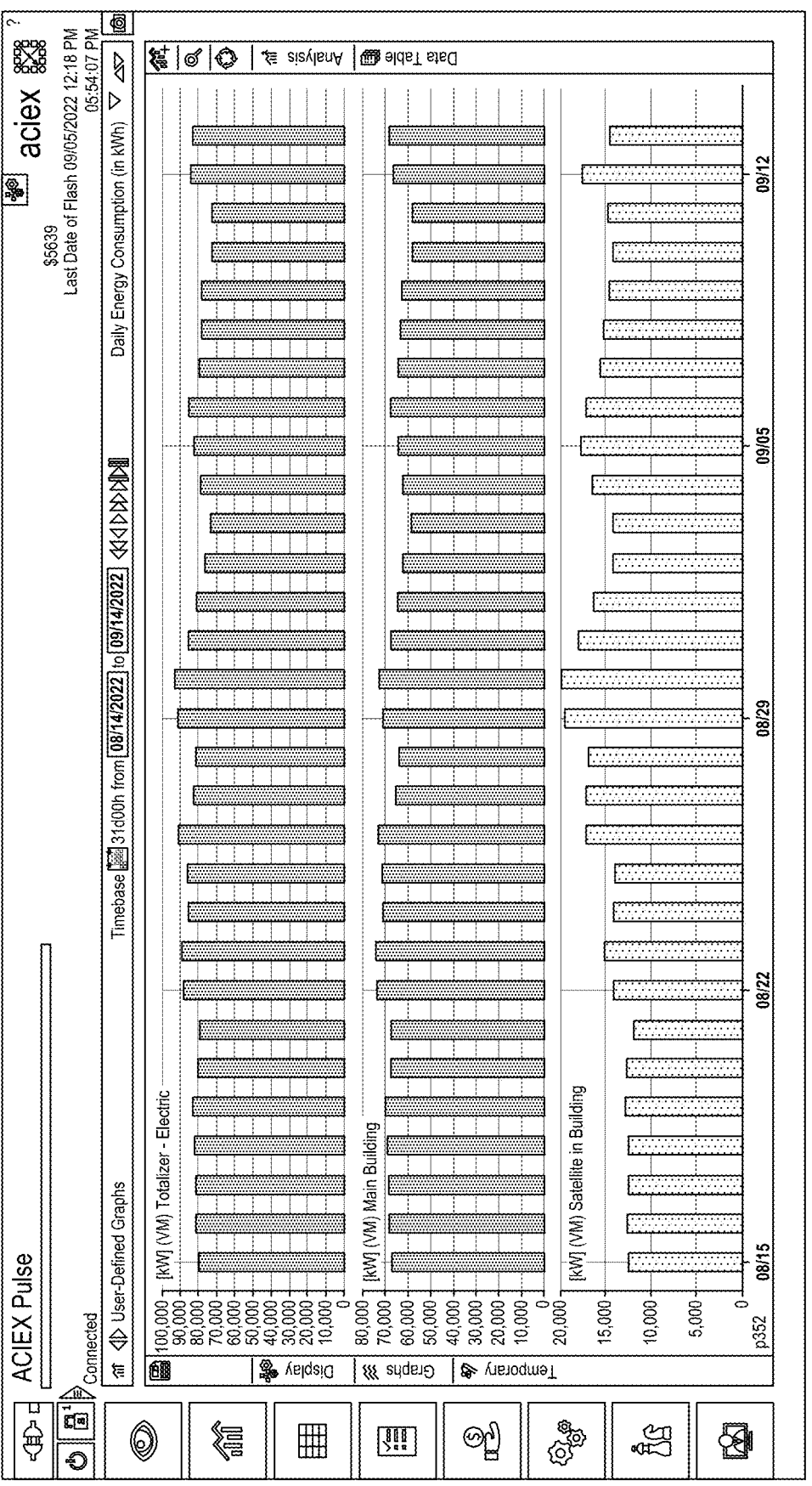
Figure 15A:
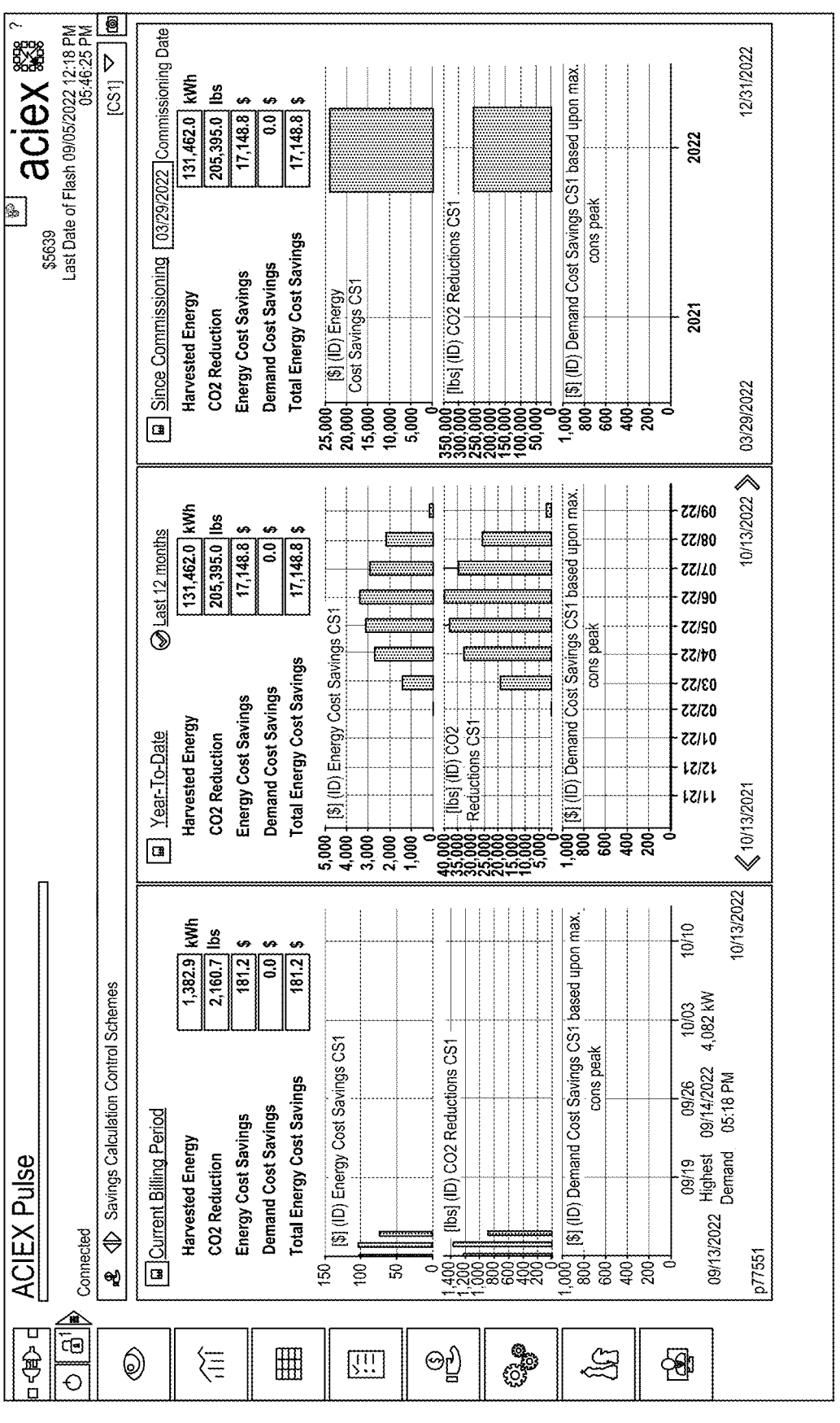
FIGS. 15A-15D are screenshots of a savings dashboard that present a summary of the harvested energy and the $CO_2$ reduction, consistent with the disclosed embodiments.
Figure 15B:
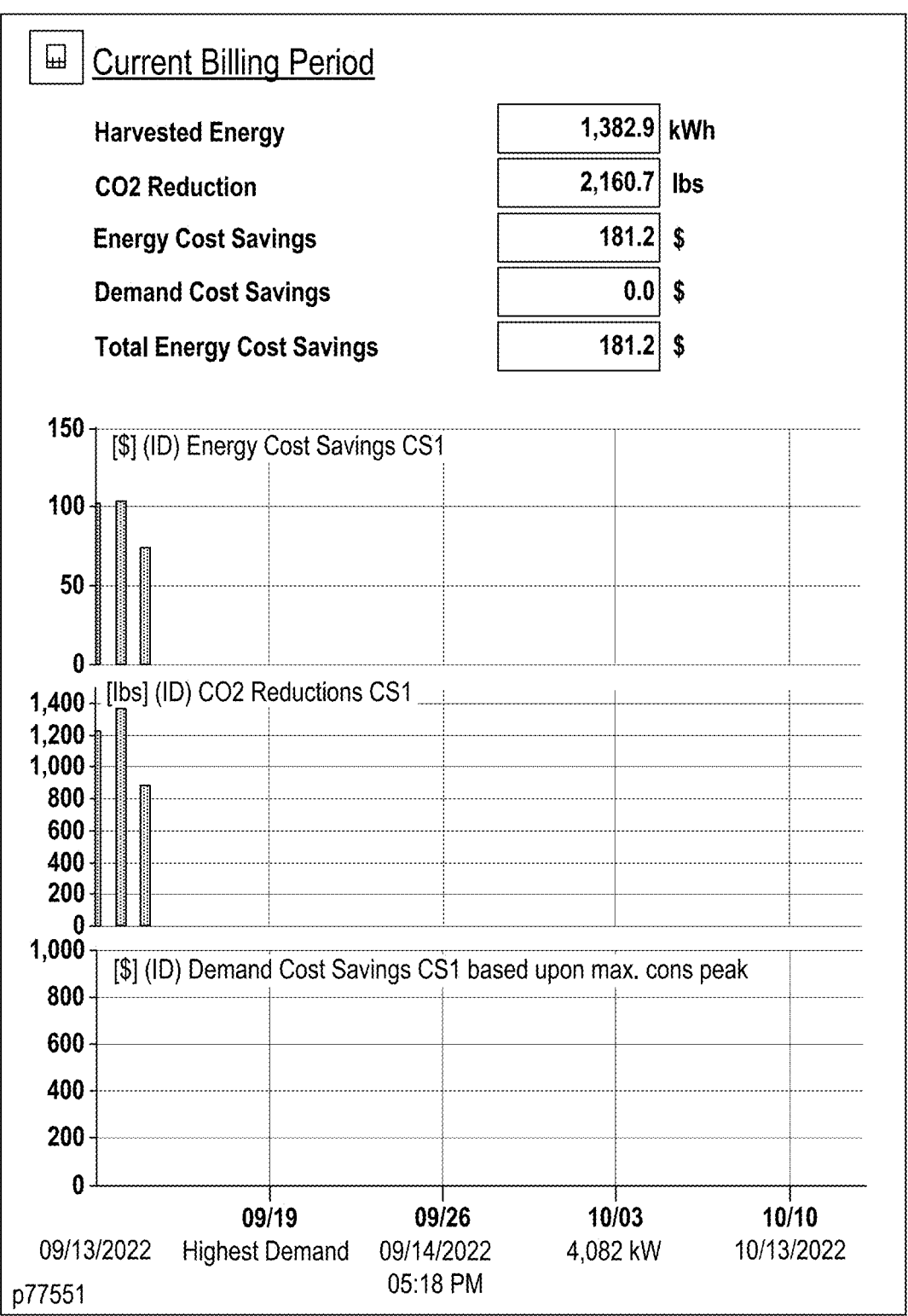
Figure 15C:
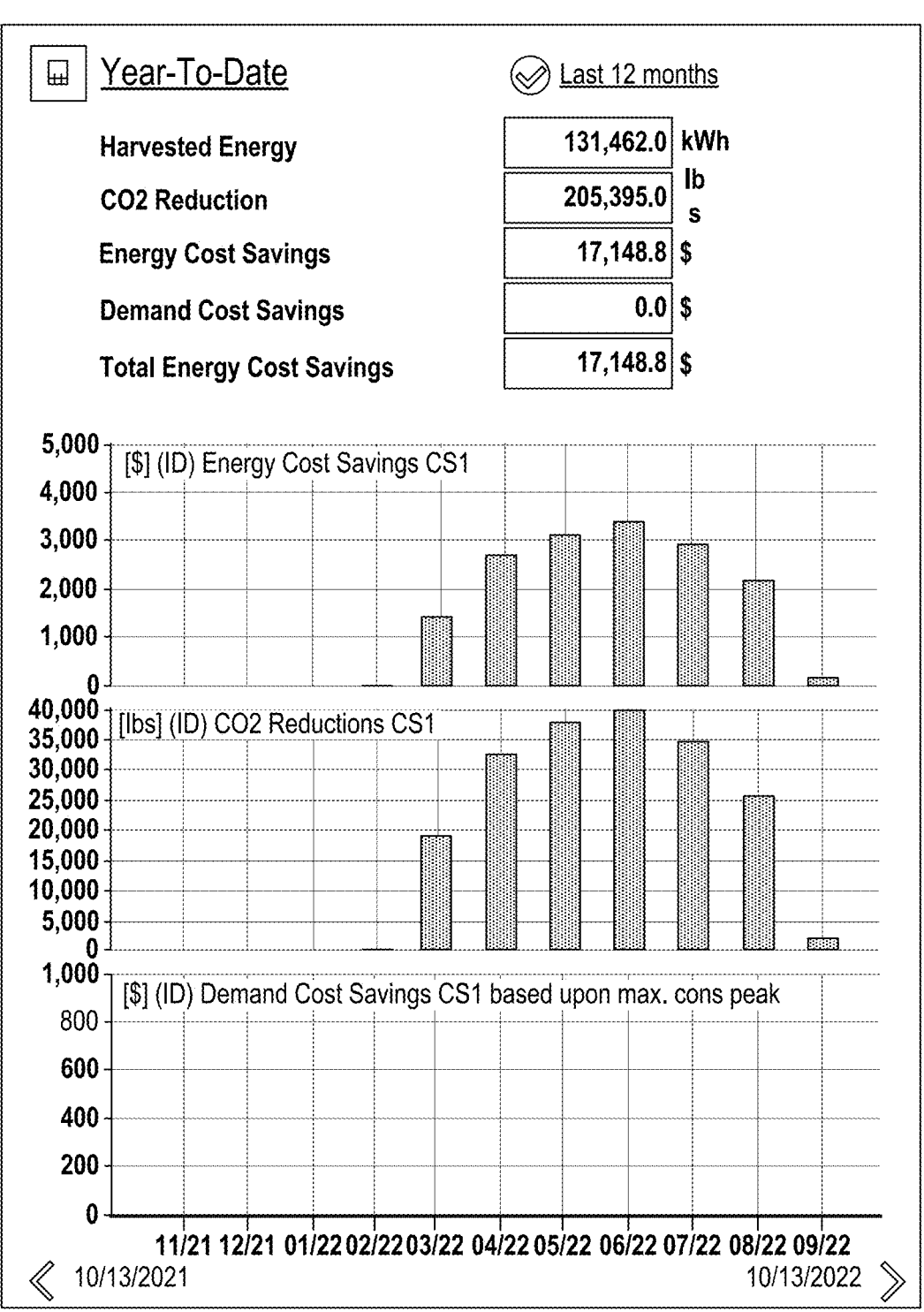
Figure 15D:
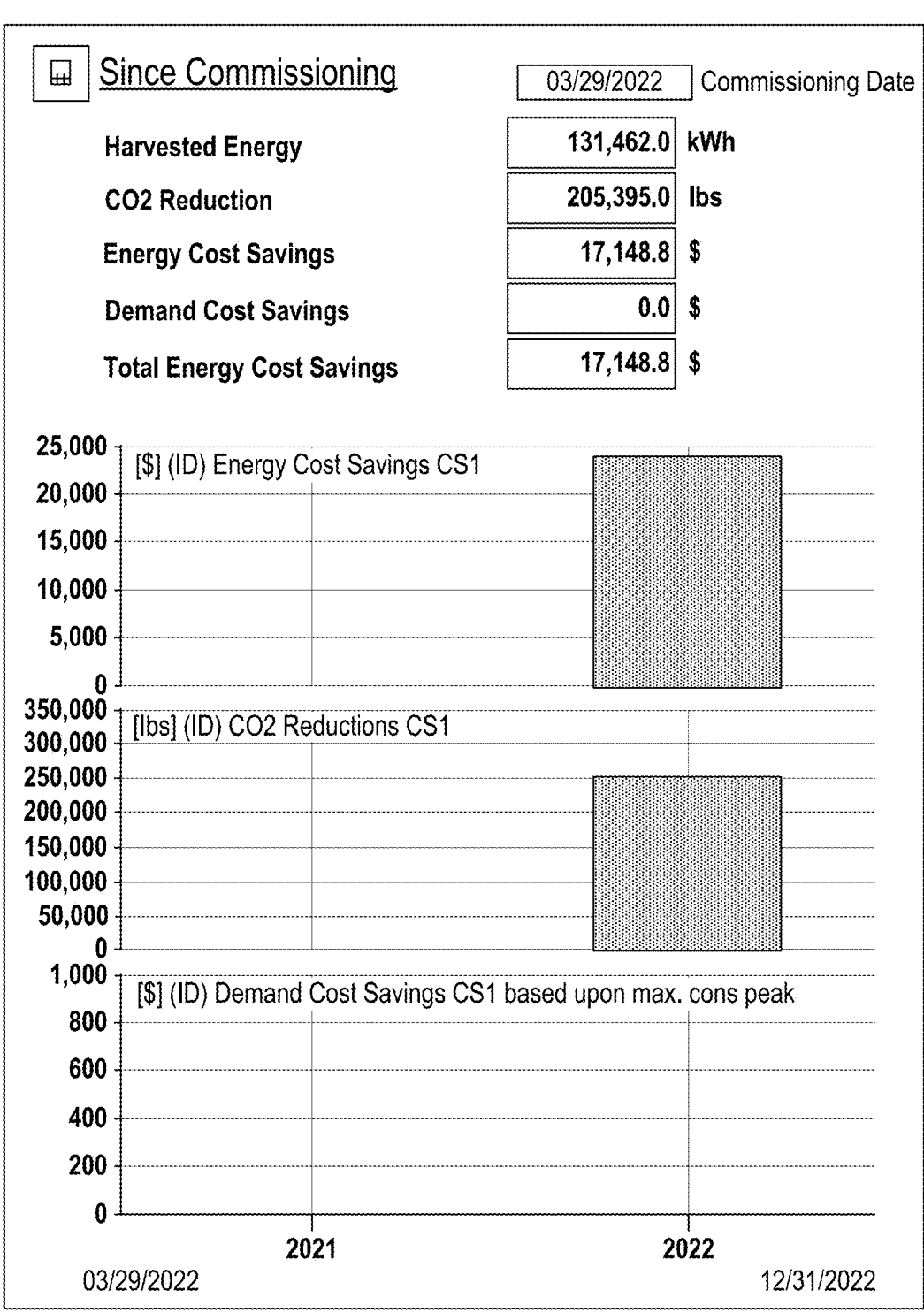
Figure 16A:
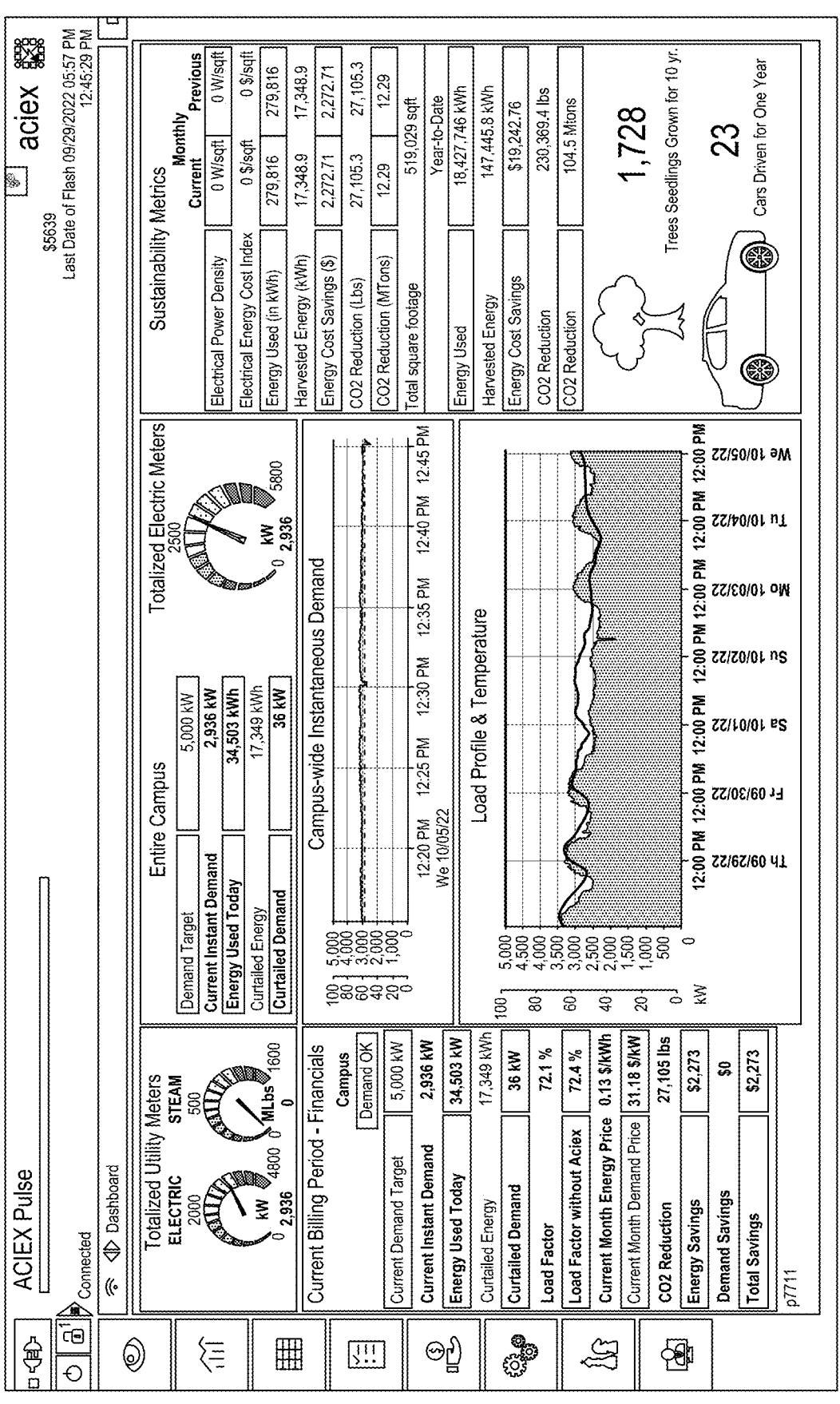
Figure 16B:
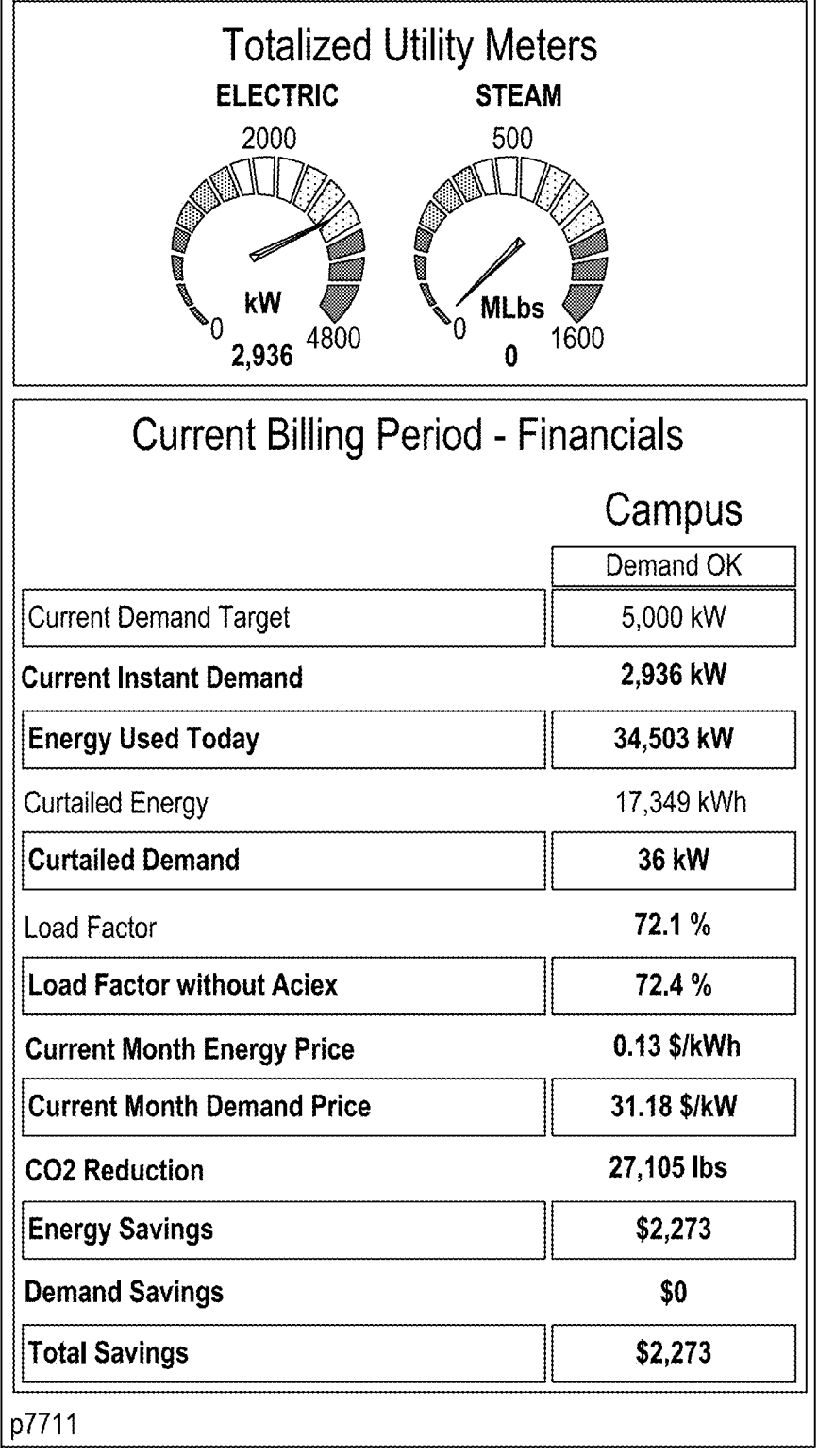

Referring to FIG. 12B, a flowchart for performing the setup for the process for configuring the software platform.to interface with the components of the BMS to connect directly to the load assets and hence enable kWh harvesting is shown. The process is shown to include set up the software platform for kWh Harvesting (step 440); get the maximum load available for Harvesting from the Load Study (step 441); select the minimum kW to be harvested as a percentage (step 442); select the fraction of the loads to harvest (step 444); expressed in the unit in which the feedbacks are received from the BMS (step 445); indicate the enrollment in the various Demand Response programs, if relevant (step 446); select the loads to enroll the kWh Harvesting strategy (step 447); the kW contribution in the kWh Harvesting program is calculated and displayed automatically (step 448); for load selection, see attachment screenshots FIGS. 13C-13D; organize the loads in groups with similar kW yields (steps 449); and for load grouping, see attachment screenshots FIGS. 13G-13H. FIG. 13H illustrates a screenshot 1300 that depicts various elements as shown by indicators 1302-1310. For example, FIG. 13H depicts a plurality of load groups 1303. The plurality of load groups 1303 are organized according to (step 449) into groups, for example, a load group LG1 1340a, a load group LG2 1340b, and a load group LG3 1340c. FIG. 13H also includes indicators for a duration of the load groups 1305 and an overlap time 1308.

Referring to FIG. 12C, a flowchart that continues the setup for the process for configuring the software platform to interface with the components of the BMS to connect directly to the load assets and hence enable kWh harvesting is shown. The process is shown to include select the loads to include the kWh Harvesting strategy (step 447); get the calculated kW that can be harvested for all the selected loads (step 448); group them in groups with similar kW harvesting potential (step 450); change the priorities and/or change the size of the groups (step 451); able to create coherent groups (step 452); determine do the groups' kW yield approximate the minimum kW calculated (step 453); set the load groups' duration and overlap time (step 454); and curtailment time (455).

Figure 12D:
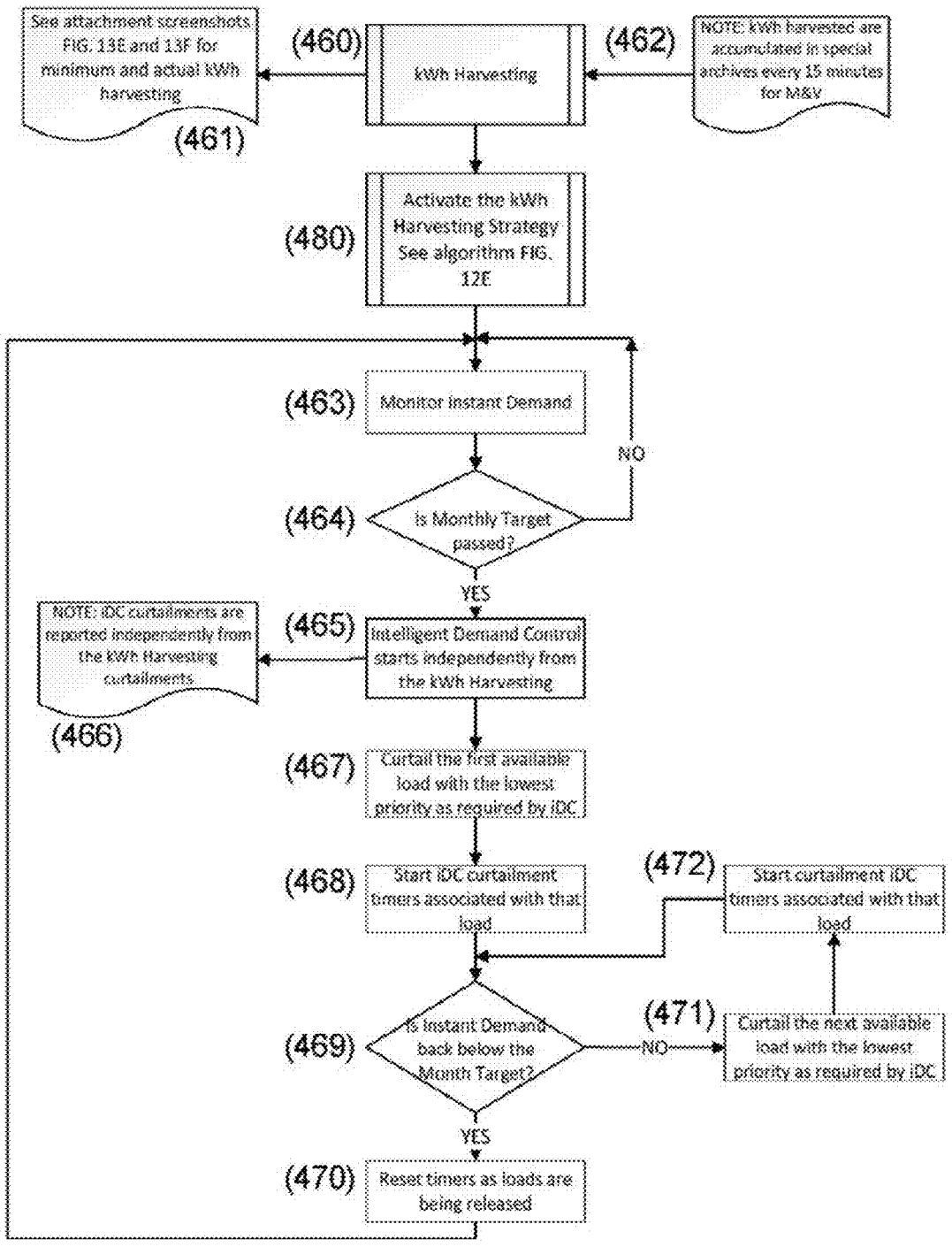

Referring to FIG. 12D, a flowchart that implements the process for configuring the software platform to interface with the components of the BMS to connect directly to the load assets and hence enable kWh harvesting is shown. The process is shown to include kWh Harvesting (step 460); minimum and actual kWh harvesting (step 461); activate the kWh Harvesting Strategy (step 480); monitor instant demand (step 463); determine whether the monthly target has passed (step 464); Intelligent Demand Control starts independently from the kWh Harvesting (step 465); report iDC curtailments from the kWh Harvesting curtailments (steps 466); curtail the first available load with the lowest priority as required by iDC (step 467); start iDC curtailment timers associated with the specific load (step 468); determine if the Instant Demand is below the monthly target (step 469); reset timers as loads are being released (step 470); curtail the next available load with the lowest priority as required by iDC (step 471); and start curtailment iDC timers associated with the specific load (step 472).

Referring to FIG. 12E, a flowchart that continues the implementation for the process for configuring the software platform to interface with the components of the BMS to connect directly to the load assets and hence enable kWh harvesting is shown. The process is shown to include select the loads to include the kWh Harvesting strategy (step 480); minimum and actual kWh harvesting shown in screenshots FIGS. 13E-13F; accumulate kWh harvest in a predetermined time interval, e.g., 15 minute intervals) (step 482); activate first load group for kWh Harvesting (step 483); activate curtailment timers for the load group (step 484); monitor the curtailment timers of the active load group (step 485); determine whether the current load group's curtailment timers have reached the cutoff time (step 486); keep on harvesting kWh from the current load group (step 487); activate the overlap timer (step 488); activate the next load group for kWh harvesting (step 489); activate curtailment timers for the next load group (step 490); determine whether the overlap timer has elapsed (step 491); release the loads in the previous load group (step 492); and reset the curtailment timers for all the loads in the group.

Figure 12F:
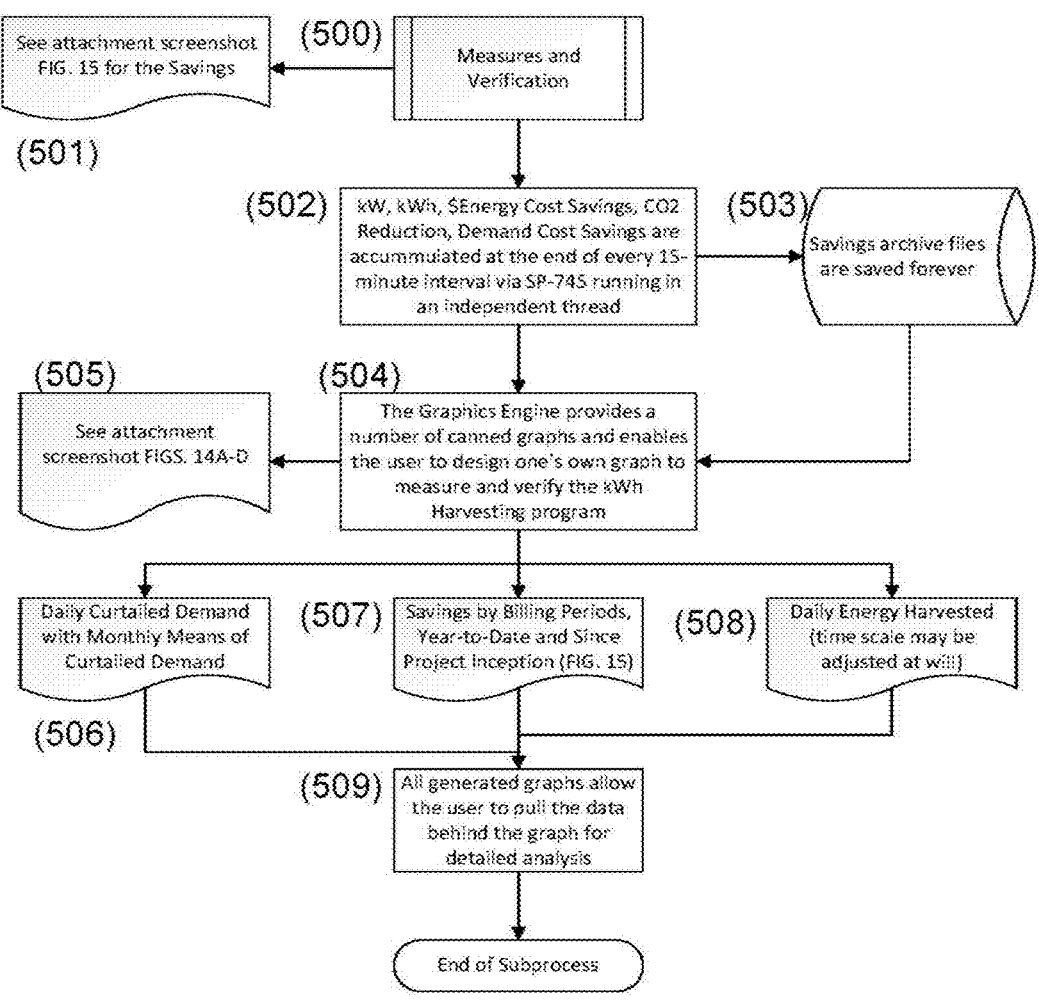
Figure 12H:
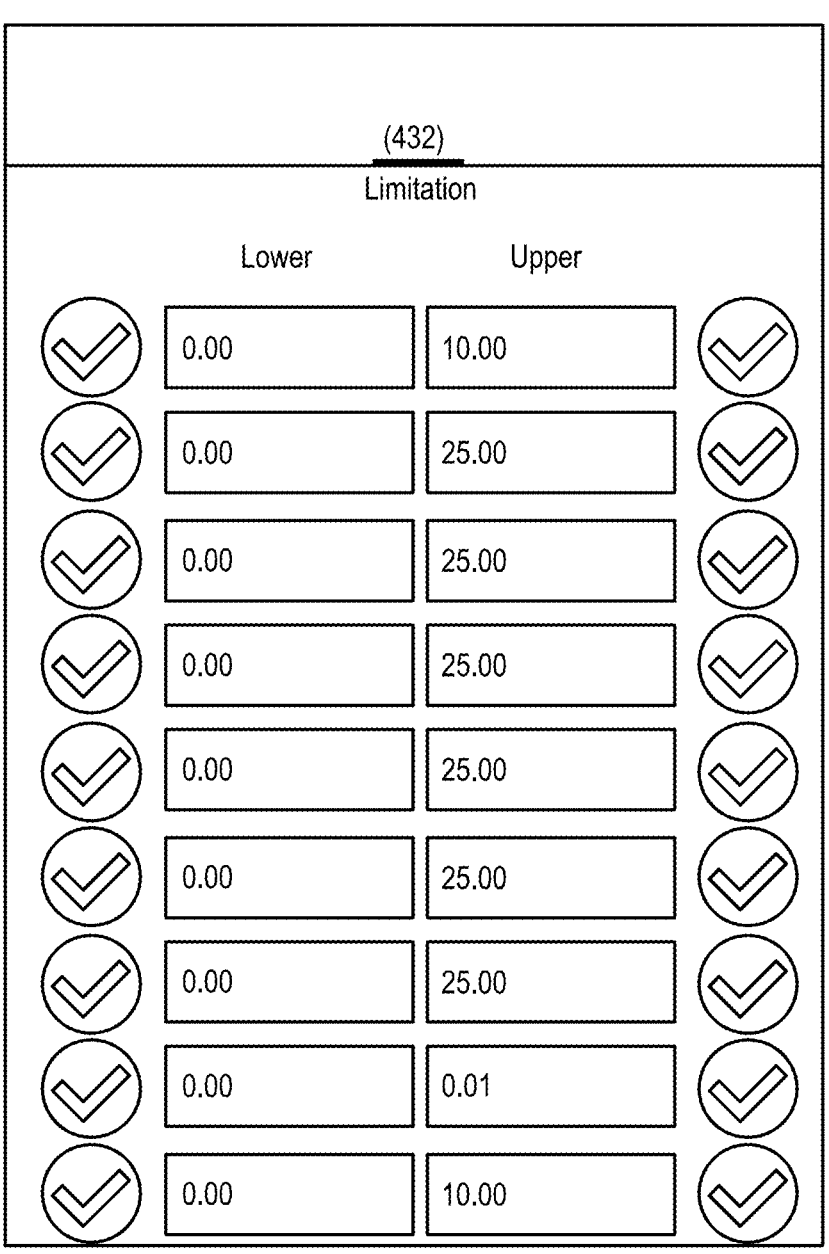
Figure 12K:
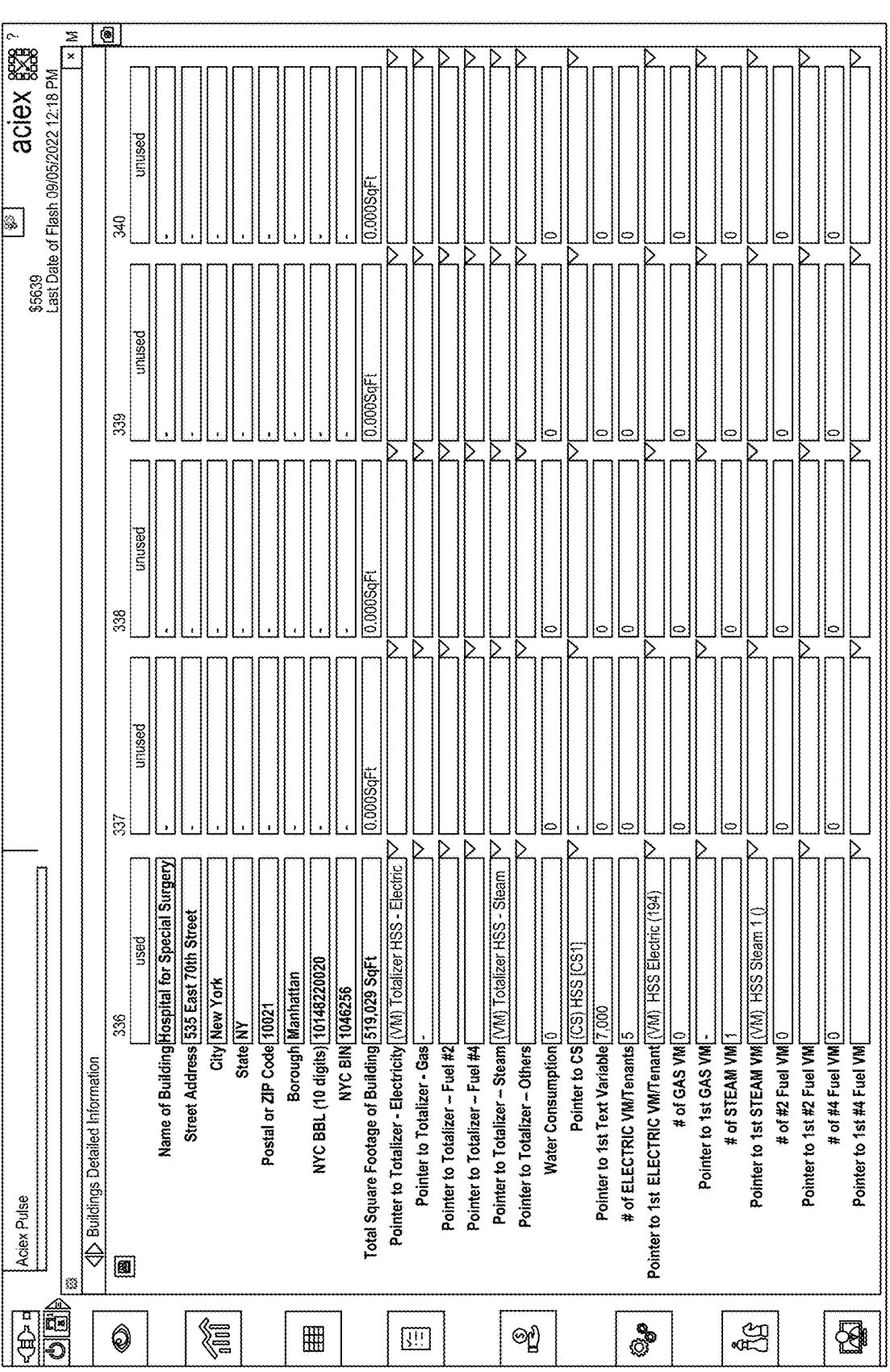

Referring to FIG. 12F, a flowchart that performs the measure and verification (M&V) for the process for configuring the software platform to interface with the components of the BMS to connect directly to the load assets and hence enable kWh harvesting is shown. The process is shown to include measures and verification subprocess (step 500); for the savings proceed to screenshots FIGS. 15A-15D (step 501); kW, kWh, $Energy Cost Savings, $CO_2$ Reduction, Demand Cost Savings are accumulated at the end of the predefined time interval (e.g., 15 minutes) via the computer program (SP-745) running in an independent thread (step 502); savings archive files are saved (step 503); the graphic engine provides a number of canned graphics and enables the user to design one's own graph to measure and verify the kWh Harvesting program (step 504); see screenshots FIGS. 14A-14D (step 505); daily curtailed demand with monthly means of curtailed demand (step 506); savings by billing periods, year-to-date, and since project inception (step 507); daily energy harvested (step 508); and all generated graphs allow the user to pull the data behind the graph for detailed analysis.

According to the kWh harvesting flowcharts FIGS. 12A-12E, screenshot FIGS. 12G-12H and FIGS. 13A-16D, once the loads that qualify for kWh Harvesting are identified the sustainable kW reduction from each individual load without compromising operations at any given time is determined. The aggregation of all the kW amounts from each load multiplied by 8,760 (hours in a year) will determine the kWh harvesting amount. (E=∫P∂t [kWh])

Since all the loads are connected to the BMS and software platform is fully integrated into the BMS the reduction typically is achieved via percentage of speed, or Hertz, degree Fahrenheit, or kW (HP).

In FIGS. 13A-13J, once the kWh harvesting goal is set and the amount to harvest from each load determined, the loads are prioritized and organized in groups. The priority indicates the order in which the loads are activated for kWh harvesting. The lower the priority, the earlier the load will be harvested. The groups are formed with loads to create homogeneous entities that will provide comparable amounts of kWh that can be harvested.

In order to "guarantee" the determined kWh harvesting amount, each load group has more kW available for harvesting than actually required. That is furthermore of importance should a single load or multiple loads within a load group not be available, or running on a reduced power output level for whatever reason.

Each group of loads is on a rotating schedule activated for shedding, for example, for 15 minutes (the time is adjustable) and then reconnected, for example, for 15 minutes. If there are more than two load groups, each load group is activated less often for kWh Harvesting. Each group can be assigned with a different time duration for kWh harvesting and reconnection. For instance, with 3 groups:

Group 1 (loads with the lowest priority such as a lobby AHU): Harvesting for 30' every 30'

Group 2 (non-critical loads with higher priorities): Harvesting for 20' every 40'

Group 3 (critical managed loads with the highest priorities): Harvesting for 10' every 50'

In general, the more individual loads available for kWh harvesting, the higher the total energy reclaimed. Additionally, the more individual loads available, the more load groups can be formed and consequently the less often each load group is activated due to the rotation schedule.

As shown in FIGS. 14A-15D, to guarantee persistent performance and target delivery, the system also provides very robust Measures and Verifications (M&V) capability available in real time and aggregated granular histories. The software platform provides an exhaustive set of data that ensure that the amount of kWh harvested coincides with or exceeds the kWh harvesting goal that was established. That data can be displayed in various graphs and data tables for M&V.

Screens and graphs, as depicted in FIGS. 14A-14D, provide a visual representation of the daily harvested energy as well as of the $CO_2$ reduction. In FIGS. 15A-15D, a savings dashboard presents a summary of both the harvested energy and the $CO_2$ reduction by billing periods, year-to-date and since the inception of the project.

The system, method and software encompass both peak load control and kWh harvesting. In various embodiments, these two strategies can be distinct and complementary.

While kWh harvesting can be implemented to work in the background affecting loads on a rotating basis and in a very subtle and imperceptible way, peak load control is configured to only take place when the trend of the instant demand exceeds the set monthly target. However, when it takes place, it may affect only some of the loads, based on the aforementioned priorities, or all the loads if the calculated trend warrants it.

Peak load control works in conjunction with the kWh harvesting rather than replacing it. While the peak load control is disengaged after the demand surge subsides, the kWh harvesting will continue to operate unhindered.

FIGS. 16A-16D illustrate an aggregate summary view of the kWh harvesting operations which can be displayed on a data interface dashboard in real-time to users. Embodiments of the present disclosure present technological improvements as solutions to proactively and incrementally adjust equipment operations and inputs/outputs to perform the ongoing capture of kilowatt hours (kWhs) being unnecessarily consumed while maintaining the strictest environmental conditions. This tool optimizes operations by responding to inherent systems overdesign and capitalizing on non-peak conditions to identify reduction potentials, the system relies on integrated, proactive protocols, including the rotation of grouped loads identified and retained for kWh reduction. Correcting and capturing these building inefficiencies is one of the main principles in delivering high performance sustainable building operations. With this unique kWh harvesting, technique building operators will be able to achieve persistent real-time performance optimization.

In various embodiments, the software is configured to run on an IoT Gateway, such as Supermicro's Fanless SYS-E100-9W-IA-E IoT Gateway, to provide seamless integration with any existing Building Management System (BMS) on the market. The integrated platform provides operators of commercial buildings, hospitals, universities, and other facilities with the means to monitor their posture regarding any laws or regulations and to take a proactive approach to reduce emissions. Enterprises can comply with the strict greenhouse gas emissions laws and achieve significant cost savings through kWh Harvesting and demand control. The system's energy management solutions empowers users to intelligently manage their energy consumption, adjusting both the timing and the quantity of their electricity use in real-time, without degrading mission critical operations.

The application of the carbon footprint management platform and control software provides ownerships and property managers extraordinary capabilities absolutely necessary when addressing the complexity and financial impacts of mandated carbon footprint allowances whether legislated or corporate social mandate.

The system, at a keystroke, delivers these mandatory and crucial high-performance facility deliverables:

At-Will Recognition of facility or portfolio Carbon Footprint Position

Immediate time-stamped consumption data and associated carbon footprint implications.

Projected Carbon Emissions at Year-End including multi-year historical baseline carbon profiling for facility operations evaluation.

Elimination of current practice labor-intensive data preparation and manual report preparation.

Real-world predictions base on application-proven forward-looking algorithms.

Provide programmed dynamic mitigation strategies.

Illustrate the impact of mitigation strategies formulated or employed.

Allow multi-facility comparison with aggregated performance matrix.

Provide the ability to partition discrete carbon footprint contributors such as processes or tenancies.

Delivers forecasting for anticipated below allowance carbon cap and trade market.

Eliminate the complexity of generating analysis and partitioning for multi-tenant building and penalty allocation for portfolio owners.

Technical Advantages

Prediction Forward Looking Algorithm

Real Time Data

Illustrates impact of mitigation strategies formulated or employed

Allows complex multi-facility comparison with performance matrix

Allows cloud compilation and access

Provides for programmed dynamic mitigation strategies

Transition to capstone of true intelligent EMS

Capitalize on recalibration of operations during non-peak conditions

Optimize energy assets that are needlessly running 100% capacity 24/7

Enhance efficiencies of energy consuming load assets with additional controls

Taking advantage of seasonal and hourly weather variations

16 Controls scheme per building/campus

64 Buildings per campus

Unlimited number of campuses

For example, 400 energy monitoring meters per campus (can be increased with minimal additional programming)

Cloud computing

Commercial Advantages

Eliminates labor-intensive data preparation

Automates definitive and descriptive reports needed for compliance submission

Ability to partition discrete contributors

Forecasting for anticipated carbon cap and trade market

Eliminates complexity of generating LL97 analysis for multi-tenant building and penalty allocation for portfolio owners Substantial kWh and cost savings (carbon footprint reduction)

Key Benefits

Quantify and assess building GHG emissions relative to legal limits in real time, and by sources of energy Gain full transparency from the building level down to individual meter levels, across billing cycle, year and compliance periods Calculate and forecast building penalties or surpluses across compliance periods Identify high-energy-consumption meters/tenants for targeted reduction Facilitate noncompliance gap closure scenarios Enable carbon emissions reporting & audit requirements Maximize demand response revenue earnings capabilities Improved risk management Improved tracking and performance reporting Reliable and durable industrial grade computer to ensure peak performance for mission critical deployments Key Features: for example, 8 USB Ports, up to 4 GbE LAN, 3 M.2 Slots, up to 64 GB DDR4 2400 MHz SODIMM, and dual displays. These listed features are merely exemplary. The system can have more or less components configured having various configurations depending on the industry.

Management computer, which is configured to manage, monitor and trouble shoot the software platform, can accommodate up to, for example, 8 monitor displays. The management computer can be a physical machine or a resource that resides within a cloud computing network. The one or more resources within various cloud-based services can be a plurality of different virtual machines and/or computing devices that are configured into clusters and/or reside in differing geographic locations.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, DVD, magnetic disk (HDD and SSD), flash drive, bubble memory, and semiconductor memory (e.g., various types of USB flash drive).

Moreover, aspects of the present disclosure may be practiced with a variety of computer-system and computer-network configurations, including multiprocessor systems, microprocessor-based or programmable-consumer electronics, minicomputers, mainframe computers, and the like. For example, the present invention may be practiced on any Intel-based microprocessor computer system running on a Microsoft 32-bit/64-bit Windows Architecture. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive disk (HDD/SSD), a digital video disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and sub-combinations of the preceding elements and features.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes that come within the meaning and range of equivalency of the claims are to be embraced within their scope.

What is claimed is:

1. A method comprising:

receiving sensor data from sensors of a plurality of load asset equipment connected to a building management system of a building;

wherein each load asset equipment of the plurality of load asset equipment is identified for kilowatt hour (kWh) harvesting in a load study due to:

an energy consumption amount of the load asset equipment connected to the building management system; and the load asset equipment is a variable frequency drive (VFD)-controlled equipment, a resistive load asset equipment, or a load asset equipment designated based on a type of operation that the load asset equipment performs in the building;

registering, by the computing device in communication with the building management system, each of the load asset equipment with the computing device;

collecting energy consumption data from the load asset equipment and using the collected energy consumption data, by the computing device, to predict for a predetermined time energy consumption for the building based on an analysis of energy usage data collected by monitoring energy sources connected to the building management system;

determining, by the computing device, CO2 tonnage emissions for the building by converting the energy usage data of all the energy sources to kBTU and then into metric tons of CO2e using respective conversion factors for each energy source;

calculating, by the computing device, a carbon surplus or a carbon penalty by comparing the CO2 tonnage emissions against a CO2e emissions limit;

determining, by the computing device, a carbon footprint for the building by calculating a greenhouse gas (GHG) emissions using respective GHG coefficients for each energy source based on the energy usage data collected by monitoring the energy sources;

reducing, by the computing device, the carbon footprint for the building by performing kWh harvesting to reduce the energy consumption amount of the plurality of load asset equipment identified in the load study;

wherein a reduction of the carbon footprint reduces the carbon penalty;

prioritizing and organizing the plurality of load asset equipment into groups, wherein the organizing is based on a comparative kWh harvesting yield of each of the groups; and performing kWh-harvesting to generate a cost-saving amount corresponding to the reduction of the carbon footprint for the building, via the computing device, by sending a kWh harvesting command to the building management system to implement load curtailment of the plurality of load asset equipment, to:

rotate activation of each group of the plurality of load asset equipment to implement load shedding to reduce the energy consumption amount of the plurality of load asset equipment identified in the load study; and control, by activation of an overlap timer, overlapping of the kWh harvesting for multiple groups having different predetermined kWh harvesting operating times.

2. A system comprising:

a memory operable to store sensor data;

a processor of a computing device operably coupled to the memory, configured to:

receive, at the computing device, the sensor data from sensors of a plurality of load asset equipment connected to a building management system of a building;

wherein each load asset equipment of the plurality of load asset equipment is identified for kilowatt hour (kWh) harvesting in a load study due to: an energy consumption amount of the load asset equipment connected to the building management system; and the load asset equipment is a variable frequency drive (VFD)-controlled equipment, a resistive load asset equipment, or a load asset equipment designated based on a type of operation that the load asset equipment performs in the building;

register, by the computing device in communication with the building management system, each of the load asset equipment with the computing device;

collect energy consumption data from the load asset equipment and use the collected energy consumption data, by the computing device, to predict for a pre-determined time energy consumption for the building based on an analysis of energy usage data collected by monitoring energy sources connected to the building management system;

determine, by the computing device, CO2 tonnage emissions for the building by converting the energy usage of all data of the energy sources to kBTU and then into metric tons of CO2e using respective conversion factors for each energy source;

calculate, by the computing device, a carbon surplus or a carbon penalty by comparing the CO2 tonnage emissions against a CO2e emissions limit; determine, by the computing device, a carbon footprint for the building by calculating a greenhouse gas (GHG) emissions using respective GHG coefficients for each energy source based on the energy usage data collected by monitoring the energy sources;

reduce, by the computing device, the carbon footprint for the building by performing kWh harvesting to reduce the energy consumption amount of the plurality of load asset equipment identified in the load study;

wherein a reduction of the carbon footprint reduces the carbon penalty;

prioritize and organize, by the computing device, the plurality of load asset equipment into groups, wherein organizing the plurality of load asset equipment into groups is based on a comparative kWh harvesting yield of each of the groups; and perform kWh-harvesting to generate a cost-saving amount corresponding to the reduction of the carbon footprint for the building, via the computing device, by sending a kWh harvesting command to the building management system to implement load curtailment of the plurality of load asset equipment, to:

rotate, by the computing device, activation of each group of the plurality of load asset equipment to implement load shedding to reduce the energy consumption amount of the plurality of load asset equipment identified in the load study; and control, by activation of an overlap timer, overlapping of the kWh harvesting for multiple groups having different predetermined kWh harvesting operating times.

3. A non-transitory computer readable medium configured to store instructions for implementing to cause a processor to perform operations comprising:

receiving sensor data from sensors of a plurality of load asset equipment connected to a building management system of a building;

wherein each load asset equipment of the plurality of load asset equipment is identified for kilowatt hour (kWh) harvesting in a load study due to:

an energy consumption amount of the load asset equipment connected to the building management system; and the load asset equipment is a variable frequency drive (VFD)-controlled equipment, a resistive load asset equipment, or a load asset equipment designated based on a type of operation that the load asset equipment performs in the building;

registering, by the processor in communication with the building management system, each of the load asset equipment with the processor;

collecting energy consumption data from the load asset equipment and using the collected energy consumption data to predict for a pre-determined time energy consumption for the building based on an analysis of energy usage data collected by monitoring energy sources connected to the building management system;

determining CO2 tonnage emissions for the building by converting the energy usage data of all the energy sources to kBTU and then into metric tons of CO2e using respective conversion factors for each energy source;

calculating a carbon surplus or a carbon penalty by comparing the CO2 tonnage emissions against a CO2e emissions limit;

determining a carbon footprint for the building by calculating a greenhouse gas (GHG) emissions using respective GHG coefficients for each energy source based on the energy usage data collected by monitoring the energy sources;

reducing the carbon footprint for the building by performing kWh harvesting to reduce the energy consumption amount of the plurality of load asset equipment identified in the load study;

wherein a reduction of the carbon footprint reduces the carbon penalty;

prioritizing and organizing the plurality of load asset equipment into groups, wherein the organizing is based on a comparative kWh harvesting yield of each of the groups; and performing kWh-harvesting to generate a cost-saving amount corresponding to the reduction of the carbon footprint for the building by sending a kWh harvesting command to the building management system to implement load curtailment of the plurality of load asset equipment, to:

rotate activation of each group of the plurality of load asset equipment to implement load shedding to reduce the energy consumption amount of the plurality of load asset equipment identified in the load study; and control, by activation of an overlap timer, overlapping of the kWh harvesting for multiple groups having different predetermined kWh harvesting operating times.

* * * * *